US012347277B2

(12) United States Patent
Joao

(10) Patent No.: US 12,347,277 B2
(45) Date of Patent: Jul. 1, 2025

(54) SPORTS BETTING APPARATUS AND METHOD

(71) Applicant: Raymond Anthony Joao, Yonkers, NY (US)

(72) Inventor: Raymond Anthony Joao, Yonkers, NY (US)

( * ) Notice: Subject to any disclaimer, the term of this patent is extended or adjusted under 35 U.S.C. 154(b) by 0 days.

(21) Appl. No.: 16/510,878

(22) Filed: Jul. 13, 2019

(65) Prior Publication Data

US 2020/0043296 A1 Feb. 6, 2020

Related U.S. Application Data

(60) Provisional application No. 62/713,004, filed on Aug. 1, 2018.

(51) Int. Cl.
*G07F 17/32* (2006.01)

(52) U.S. Cl.
CPC ...... *G07F 17/3288* (2013.01); *G07F 17/3211* (2013.01); *G07F 17/3223* (2013.01); *G07F 17/3251* (2013.01); *G07F 17/3281* (2013.01)

(58) Field of Classification Search
None
See application file for complete search history.

(56) References Cited

U.S. PATENT DOCUMENTS 4,339,798 A 7/1982 Hedges et al.
4,592,546 A 6/1986 Fascenda et al.
4,759,549 A 7/1988 Beckwith
5,042,809 A 8/1991 Richardson
5,221,838 A 6/1993 Gutman et al.
5,283,734 A 2/1994 Von Kohorn
5,397,133 A 3/1995 Penzias
5,524,272 A 6/1996 Podowski et al.
(Continued)

FOREIGN PATENT DOCUMENTS

AU 751533 9/1999
CA 2552062 A1 1/2007
(Continued)

OTHER PUBLICATIONS

U.S. Appl. No. 62/035,387.
(Continued)

*Primary Examiner* — Ronald Laneau
(74) *Attorney, Agent, or Firm* — Raymond A. Joao, Esq.

(57) ABSTRACT

A sports betting apparatus, including a processor programmed to provide an electronic forum capable of providing a video or audio broadcast of a first sporting event to users, wherein the electronic forum is capable of allowing at least some of the users to communicate with one another, place a bet on an outcome or an event which occurs during the first sporting event, and purchase a ticket or ticket option for the first sporting event or a second sporting event; a transmitter which transmits the electronic forum to a first user communication device associated with a user of the users; and a receiver which receives a ticket purchase request or a ticket option purchase request transmitted from the first user communication device. The sports betting computer processes information regarding a purchase of a ticket or ticket option for the first sporting event or for the second sporting event.

21 Claims, 17 Drawing Sheets

(56) References Cited

U.S. PATENT DOCUMENTS

| | | | |
|---|---|---|---|
| 5,537,143 | A | 7/1996 | Steingold et al. |
| 5,575,474 | A | 11/1996 | Rossides |
| 5,600,368 | A | 2/1997 | Matthews, III et al. |
| 5,697,844 | A | 12/1997 | Von Kohorn |
| 5,779,549 | A | 7/1998 | Walker et al. |
| 5,871,398 | A | 2/1999 | Schneier et al. |
| 5,878,337 | A | 3/1999 | Joao et al. |
| 5,903,830 | A | 5/1999 | Joao et al. |
| 6,007,426 | A | 12/1999 | Kelly et al. |
| 6,047,270 | A | 4/2000 | Joao et al. |
| 6,104,815 | A | 8/2000 | Alcorn et al. |
| 6,113,493 | A | 9/2000 | Walker et al. |
| 6,142,876 | A | 11/2000 | Cumbers |
| 6,236,900 | B1 | 5/2001 | Geiger |
| 6,277,026 | B1 | 8/2001 | Archer |
| 6,287,199 | B1 | 9/2001 | McKeown et al. |
| 6,288,753 | B1 | 9/2001 | Denicola et al. |
| 6,304,855 | B1 | 10/2001 | Burke |
| 6,425,131 | B2 | 7/2002 | Crandall et al. |
| 6,443,841 | B1 | 9/2002 | Rossides |
| 6,464,583 | B1 | 10/2002 | Kidron |
| 6,508,709 | B1 | 1/2003 | Karmarkar |
| 6,508,710 | B1 | 1/2003 | Paravia et al. |
| 6,529,725 | B1 | 3/2003 | Joao et al. |
| 6,601,048 | B1 | 7/2003 | Gavan et al. |
| 6,607,439 | B2 | 8/2003 | Schneier et al. |
| 6,628,939 | B2 | 9/2003 | Paulsen |
| 6,662,194 | B1 | 12/2003 | Joao |
| 6,774,926 | B1 | 8/2004 | Ellis |
| 6,910,965 | B2 | 6/2005 | Downes |
| 7,035,626 | B1 | 4/2006 | Luciano, Jr. |
| 7,096,003 | B2 | 8/2006 | Joao et al. |
| 7,172,508 | B2 | 2/2007 | Simon et al. |
| 7,306,514 | B2 | 12/2007 | Amaitis et al. |
| 7,435,179 | B1 | 10/2008 | Ford |
| 7,490,086 | B2 | 2/2009 | Joao |
| 7,749,078 | B2 | 7/2010 | Vlazny et al. |
| 7,899,717 | B2 | 3/2011 | Joao |
| 8,088,000 | B2 | 1/2012 | Ginsberg et al. |
| 8,128,485 | B2 | 3/2012 | Vlazny et al. |
| 8,162,756 | B2 | 4/2012 | Amaitis et al. |
| 8,241,100 | B2 | 8/2012 | Katz et al. |
| 8,342,946 | B2 | 1/2013 | Amaitis et al. |
| 8,342,966 | B2 | 1/2013 | Storm et al. |
| 8,380,177 | B2 | 2/2013 | Laracey |
| 8,627,399 | B2 | 1/2014 | White et al. |
| 8,690,657 | B2 | 4/2014 | D'Angelo |
| 8,727,892 | B1 | 5/2014 | Chun |
| 8,776,149 | B1 | 7/2014 | Koch et al. |
| 8,956,231 | B2 | 2/2015 | Amaitis et al. |
| 9,005,016 | B2 | 4/2015 | Amaitis et al. |
| 9,152,943 | B2 | 10/2015 | Joao |
| 9,159,184 | B2 | 10/2015 | Okada |
| 9,235,841 | B2 | 1/2016 | Joao |
| 9,245,270 | B2 | 1/2016 | Joao |
| 9,349,246 | B1 | 5/2016 | Paradise et al. |
| 9,430,909 | B2 | 8/2016 | Shore et al. |
| 9,483,908 | B2 | 11/2016 | Shore et al. |
| 9,489,793 | B2 | 11/2016 | Williams et al. |
| 9,524,077 | B1 | 12/2016 | Pattan et al. |
| 9,547,995 | B1 | 1/2017 | Murray |
| 9,697,512 | B2 | 7/2017 | Pitroda et al. |
| 9,706,241 | B2 | 7/2017 | Felt et al. |
| 9,760,864 | B2 | 9/2017 | Joao |
| 9,870,674 | B2 | 1/2018 | Hayon |
| 9,911,124 | B2 | 3/2018 | Joao |
| 9,965,920 | B2 | 5/2018 | Joao |
| 10,043,341 | B1 | 8/2018 | Joao |
| 10,078,839 | B1 | 9/2018 | Mullins et al. |
| 10,096,000 | B2 | 10/2018 | Joao |
| 10,147,266 | B2 | 12/2018 | Joao |
| 10,157,385 | B2 | 12/2018 | Joao |
| 10,185,918 | B2 | 1/2019 | Joao |
| 10,255,755 | B2 | 4/2019 | Joao |
| 10,354,622 | B2 | 7/2019 | Khinchuk |
| 10,504,123 | B2 | 12/2019 | Joao |
| 10,515,516 | B1 | 12/2019 | Eckman et al. |
| 10,726,470 | B1 | 7/2020 | Traina et al. |
| 10,741,018 | B2 | 8/2020 | Joao |
| 10,885,746 | B2 | 1/2021 | Joac |
| 10,990,928 | B1 | 4/2021 | Wong et al. |
| 11,017,630 | B2 | 5/2021 | Williams et al. |
| 11,069,195 | B2 | 7/2021 | Joao |
| 11,087,596 | B2 | 8/2021 | Nelson et al. |
| 11,398,133 | B2 | 7/2022 | Joao |
| 2001/0003099 | A1 | 6/2001 | Von Kohorn |
| 2001/0031663 | A1 | 10/2001 | Johnson |
| 2001/0036622 | A1 | 11/2001 | Richter et al. |
| 2001/0036853 | A1 | 11/2001 | Thomas |
| 2001/0037211 | A1 | 11/2001 | McNutt et al. |
| 2001/0044751 | A1 | 11/2001 | Pugliese et al. |
| 2001/0047291 | A1 | 11/2001 | Garahi et al. |
| 2001/0049087 | A1 | 12/2001 | Hale |
| 2001/0051920 | A1 | 12/2001 | Joao et al. |
| 2002/0002075 | A1 | 1/2002 | Rowe |
| 2002/0025797 | A1 | 2/2002 | Joao et al. |
| 2002/0037767 | A1 | 3/2002 | Ebin |
| 2002/0039921 | A1 | 4/2002 | Rowe et al. |
| 2002/0054088 | A1 | 5/2002 | Tanskanen et al. |
| 2002/0065890 | A1 | 5/2002 | Barron |
| 2002/0068633 | A1 | 6/2002 | Schlaifer |
| 2002/0069105 | A1 | 6/2002 | do Rosario Botelho et al. |
| 2002/0077178 | A1 | 6/2002 | Oberberger et al. |
| 2002/0082085 | A1 | 6/2002 | Osterer |
| 2002/0098829 | A1 | 7/2002 | Tendler |
| 2002/0100040 | A1 | 7/2002 | Bull |
| 2002/0108125 | A1 | 8/2002 | Joao |
| 2002/0147049 | A1 | 10/2002 | Carter, Sr. |
| 2002/0155885 | A1 | 10/2002 | Shvili |
| 2002/0169835 | A1 | 11/2002 | Paul, Jr. et al. |
| 2002/0183105 | A1 | 12/2002 | Cannon et al. |
| 2002/0196342 | A1 | 12/2002 | Walker et al. |
| 2003/0060262 | A1 | 3/2003 | Yeend |
| 2003/0088878 | A1 | 5/2003 | Rogers et al. |
| 2003/0096651 | A1 | 5/2003 | Black |
| 2003/0110215 | A1 | 6/2003 | Joao |
| 2003/0157976 | A1 | 8/2003 | Simon et al. |
| 2003/0175676 | A1 | 9/2003 | Theilmann et al. |
| 2003/0224854 | A1 | 12/2003 | Joao |
| 2004/0029627 | A1 | 2/2004 | Hannan et al. |
| 2004/0128157 | A1 | 7/2004 | Aquilino et al. |
| 2004/0178880 | A1 | 9/2004 | Meyer et al. |
| 2004/0185830 | A1 | 9/2004 | Joao et al. |
| 2005/0064926 | A1 | 3/2005 | Walker et al. |
| 2005/0082750 | A1 | 4/2005 | Grauzer et al. |
| 2005/0096124 | A1 | 5/2005 | Stronach |
| 2005/0170814 | A1 | 8/2005 | Joao et al. |
| 2005/0181870 | A1 | 8/2005 | Nguyen et al. |
| 2005/0227757 | A1 | 10/2005 | Simon |
| 2006/0035707 | A1 | 2/2006 | Nguyen et al. |
| 2006/0036482 | A1 | 2/2006 | Huang et al. |
| 2006/0094506 | A1 | 5/2006 | Tarter et al. |
| 2006/0183547 | A1 | 8/2006 | McMonigle |
| 2006/0206586 | A1 | 9/2006 | Ling et al. |
| 2006/0259942 | A1 | 11/2006 | Toyama |
| 2006/0277564 | A1 | 12/2006 | Jarman |
| 2006/0287068 | A1 | 12/2006 | Walker et al. |
| 2007/0004509 | A1 | 1/2007 | Banton |
| 2007/0017974 | A1 | 1/2007 | Joao |
| 2007/0043608 | A1 | 2/2007 | May et al. |
| 2007/0054739 | A1 | 3/2007 | Amaitis et al. |
| 2007/0060380 | A1 | 3/2007 | McMonigle et al. |
| 2007/0072679 | A1 | 3/2007 | Kerns et al. |
| 2007/0087834 | A1 | 4/2007 | Moser et al. |
| 2007/0094705 | A1 | 4/2007 | Crowley et al. |
| 2007/0143130 | A1 | 6/2007 | Hearn |
| 2007/0197247 | A1 | 8/2007 | Inselberg |
| 2007/0232398 | A1 | 10/2007 | Aikin et al. |
| 2007/0237330 | A1 | 10/2007 | Srivastava |
| 2007/0276521 | A1 | 11/2007 | Harris et al. |
| 2008/0004107 | A1 | 1/2008 | Nguyen et al. |
| 2008/0010215 | A1 | 1/2008 | Rackley, III et al. |
| 2008/0039192 | A1 | 2/2008 | Laut |
| 2008/0064490 | A1 | 3/2008 | Ellis |

(56) References Cited

U.S. PATENT DOCUMENTS

2008/0102956 A1 5/2008 Burman et al.
2008/0120190 A1 5/2008 Joao et al.
2008/0140719 A1 6/2008 Chaney et al.
2008/0180250 A1 7/2008 Steil
2008/0214300 A1 9/2008 Williams et al.
2008/0220840 A1 9/2008 Katz et al.
2008/0274802 A1 11/2008 Joao
2008/0275820 A1 11/2008 Joao et al.
2009/0042631 A1 2/2009 Randhawa
2009/0061978 A1* 3/2009 Ahlin .................... G06Q 30/02 463/16
2009/0093292 A1 4/2009 Randhawa
2009/0098923 A1 4/2009 Randhawa
2009/0143128 A1 6/2009 Cautley et al.
2009/0181353 A1 7/2009 Dasgupta
2009/0292376 A1 11/2009 Kazem
2009/0293088 A1 11/2009 Mukerji
2009/0319379 A1 12/2009 Joao
2010/0021877 A1 1/2010 Butler
2010/0048302 A1 2/2010 Lutnick et al.
2010/0081116 A1 4/2010 Barasch et al.
2010/0105464 A1 4/2010 Storm et al.
2010/0145737 A1 6/2010 Joao
2010/0151930 A1 6/2010 Oram
2010/0160012 A1 6/2010 Amaitis et al.
2010/0281152 A1 11/2010 Istavan et al.
2010/0306103 A1 12/2010 Hankins et al.
2011/0034252 A1 2/2011 Morrison et al.
2011/0035240 A1 2/2011 Joao
2011/0055862 A1 3/2011 Harp et al.
2011/0065490 A1 3/2011 Lutnick
2011/0098096 A1 4/2011 Odom et al.
2011/0123972 A1 5/2011 Friedman
2011/0128382 A1 6/2011 Pennington et al.
2011/0145865 A1 6/2011 Simpson
2011/0177863 A1 7/2011 Davidson et al.
2011/0223989 A1 9/2011 Owen et al.
2011/0251892 A1 10/2011 Laracey
2011/0275432 A1 11/2011 Lutnick et al.
2011/0306399 A1 12/2011 Erickson
2012/0058813 A1 3/2012 Amaitis et al.
2012/0094737 A1 4/2012 Barclay et al.
2012/0101952 A1 4/2012 Raleigh et al.
2012/0115554 A1 5/2012 Cairns et al.
2012/0166295 A1 6/2012 Loevenguth et al.
2012/0214575 A1 8/2012 Amaitis et al.
2012/0215637 A1 8/2012 Hermann
2012/0236210 A1 9/2012 Matsubayashi
2012/0264099 A1 10/2012 Craft
2012/0264503 A1 10/2012 Lisenbee
2012/0330787 A1 12/2012 Hanson et al.
2013/0031175 A1 1/2013 Patel et al.
2013/0079094 A1 3/2013 Odom et al.
2013/0097093 A1 4/2013 Kolber et al.
2013/0116032 A1 5/2013 Lutnick
2013/0122475 A1 5/2013 Schoenfeldt
2013/0132727 A1 5/2013 Petrovic
2013/0132908 A1 5/2013 Lee
2013/0203483 A1 8/2013 Joshi et al.
2013/0204781 A1 8/2013 Flitcroft et al.
2013/0204784 A1 8/2013 Ogden
2013/0225282 A1 8/2013 Williams et al.
2013/0244768 A1* 9/2013 Oiwa .................... G06Q 50/34 463/25
2013/0303268 A1 11/2013 Miller
2013/0316322 A1 11/2013 Roschelle et al.
2014/0081667 A1 3/2014 Joao
2014/0081855 A1 3/2014 Hankins et al.
2014/0148238 A1 5/2014 D'Angelo
2014/0157298 A1 6/2014 Murphy
2014/0165094 A1 6/2014 Hardy
2014/0231499 A1 8/2014 Simmons, Jr.
2014/0232863 A1 8/2014 Paliga et al.
2014/0237500 A1 8/2014 Joao
2014/0258198 A1 9/2014 Spivack et al.
2014/0267555 A1 9/2014 Shane
2014/0274311 A1 9/2014 Aronowitz
2014/0368601 A1 12/2014 Decharms
2015/0012417 A1 1/2015 Joao et al.
2015/0026012 A1 1/2015 Gura et al.
2015/0032572 A1 1/2015 Spano et al.
2015/0038235 A1 2/2015 Kamekawa
2015/0087371 A1 3/2015 Hill
2015/0088744 A1 3/2015 Raduchel
2015/0157947 A1 6/2015 Amaitis et al.
2015/0170112 A1 6/2015 Decastro
2015/0170309 A1 6/2015 Diamond
2015/0170457 A1 6/2015 Veverka
2015/0228148 A1 8/2015 Barnes
2015/0249813 A1 9/2015 Cole et al.
2015/0287285 A1 10/2015 Shore et al.
2015/0304435 A1 10/2015 Bravo et al.
2015/0310434 A1 10/2015 Cheung
2015/0324764 A1 11/2015 Van Rooyen et al.
2015/0332256 A1 11/2015 Minor
2015/0379815 A1 12/2015 Hayon
2015/0379816 A1 12/2015 Hayon
2016/0028736 A1 1/2016 Gehring
2016/0042651 A1 2/2016 Joac
2016/0104347 A1 4/2016 Yang
2016/0140802 A1 5/2016 Joao
2016/0150365 A1 5/2016 Brown et al.
2016/0189158 A1 6/2016 Eramian et al.
2016/0225230 A1 8/2016 Hill
2016/0247359 A1 8/2016 De Knijff et al.
2016/0267747 A1 9/2016 Dengler et al.
2016/0300431 A1 10/2016 Ortiz et al.
2016/0307395 A1 10/2016 Frenkel et al.
2017/0026683 A1 1/2017 Joao
2017/0039523 A1 2/2017 Rotimi
2017/0041296 A1 2/2017 Ford et al.
2017/0046905 A1* 2/2017 Ramos ............... G07F 17/3244
2017/0076306 A1 3/2017 Snider et al.
2017/0084118 A1 3/2017 Robinson et al.
2017/0116870 A1 4/2017 Brem et al.
2017/0171216 A1 6/2017 Chhabra et al.
2017/0232340 A1 8/2017 Lockton
2017/0243438 A1 8/2017 Merati
2017/0287593 A1 10/2017 Ovalle
2017/0294070 A1 10/2017 Groetken
2017/0358173 A1 12/2017 McCafferty
2018/0005492 A1 1/2018 Hall
2018/0096752 A1 4/2018 Ovalle
2018/0102018 A1 4/2018 Cage et al.
2018/0144580 A1 5/2018 Frenkel et al.
2018/0158067 A1 6/2018 Joao
2018/0190077 A1 7/2018 Hall et al.
2018/0190136 A1 7/2018 Joao
2018/0232828 A1 8/2018 Joao
2018/0293834 A1 10/2018 Cage et al.
2018/0316939 A1 11/2018 Todd
2018/0330385 A1 11/2018 Johnson et al.
2018/0375845 A1 12/2018 Burns et al.
2019/0020696 A1 1/2019 Winawer et al.
2019/0035208 A1 1/2019 Simons et al.
2019/0035209 A1 1/2019 Simons et al.
2019/0046863 A1 2/2019 Eurlings et al.
2019/0051103 A1 2/2019 Russ et al.
2019/0051116 A1 2/2019 Joao
2019/0051117 A1 2/2019 Acres
2019/0096191 A1 3/2019 Stuehling et al.
2019/0102726 A1 4/2019 Ushiki et al.
2019/0122500 A1 4/2019 Joao
2019/0130698 A1 5/2019 Simons
2019/0130701 A1 5/2019 Simons
2019/0164081 A1 5/2019 Deluca et al.
2019/0172310 A1 6/2019 Joao
2019/0180558 A1 6/2019 Merati
2019/0208251 A1 7/2019 Joao
2019/0272504 A1 9/2019 Pande
2019/0281066 A1 9/2019 Simons
2019/0281359 A1 9/2019 Johnson et al.
2019/0304253 A1 10/2019 Dabrowski
2019/0304259 A1 10/2019 Joao

(56) References Cited

U.S. PATENT DOCUMENTS

| | | | |
|---|---|---|---|
| 2019/0362601 | A1 | 11/2019 | Kline et al. |
| 2019/0371129 | A1 | 12/2019 | Hall |
| 2019/0392684 | A1 | 12/2019 | McDonald et al. |
| 2020/0027315 | A1 | 1/2020 | Cotton |
| 2020/0043296 | A1 | 2/2020 | Joao |
| 2020/0051366 | A1 | 2/2020 | Crist et al. |
| 2020/0051397 | A1 | 2/2020 | Jones |
| 2020/0126363 | A1 | 4/2020 | Trepp et al. |
| 2020/0143329 | A1 | 5/2020 | Gamaliel |
| 2020/0175818 | A1 | 6/2020 | Joao |
| 2020/0176095 | A1 | 6/2020 | Ansari et al. |
| 2020/0213329 | A1 | 7/2020 | Simons |
| 2020/0234544 | A1 | 7/2020 | Joao |
| 2020/0242561 | A1 | 7/2020 | Kulkarni et al. |
| 2020/0250918 | A1 | 8/2020 | Joao |
| 2020/0294354 | A1 | 9/2020 | Joao |
| 2020/0302745 | A1 | 9/2020 | Merati |
| 2020/0312089 | A1 | 10/2020 | Joao |
| 2020/0357246 | A1 | 11/2020 | Nelson et al. |
| 2020/0372763 | A1 | 11/2020 | Greiner, Jr. et al. |
| 2021/0004807 | A1 | 1/2021 | Joao |
| 2021/0019982 | A1 | 1/2021 | Todd |
| 2021/0019987 | A1 | 1/2021 | Cohen |
| 2021/0049865 | A1 | 2/2021 | Burns et al. |
| 2021/0065516 | A1 | 3/2021 | Warren |
| 2021/0090406 | A1 | 3/2021 | Joao |
| 2021/0118265 | A1 | 4/2021 | Joao |
| 2021/0150447 | A1 | 5/2021 | Badra |
| 2021/0217126 | A1 | 7/2021 | Hayon |
| 2021/0256478 | A1 | 8/2021 | Hood |
| 2021/0264735 | A1 | 8/2021 | Joao |
| 2021/0383489 | A1 | 12/2021 | Hutchinson |
| 2022/0028017 | A1 | 1/2022 | Joao |
| 2022/0343451 | A1 | 10/2022 | Fowler et al. |

FOREIGN PATENT DOCUMENTS

| | | | |
|---|---|---|---|
| CN | 101268639 | A | 9/2008 |
| GB | 0113169 | | 7/2001 |
| GB | 2458981 | A | 10/2009 |
| JP | 2005018448 | A | 1/2005 |
| KR | 20020063080 | A | 8/2002 |
| KR | 100529221 | B1 | 11/2005 |
| WO | WO 01/55941 | A2 | 8/2001 |
| WO | WO 2004/015544 | A2 | 2/2004 |
| WO | WO-2007010055 | A1 | 1/2007 |
| WO | WO-2011024030 | A1 | 3/2011 |
| WO | WO-2013166456 | A2 | 11/2013 |
| WO | WO-2014118777 | A1 | 8/2014 |
| WO | WO-2017156054 | A1 | 9/2017 |
| WO | WO-2019244129 | A2 | 12/2019 |

OTHER PUBLICATIONS

Office Action, mailed Nov. 15, 2019, U.S. Appl. No. 15/905,858.
Office Action, mailed Jul. 29, 2019, U.S. Appl. No. 15/905,858.
Office Action, mailed Nov. 5, 2017, U.S. Appl. No. 14/714,365.
Office Action, mailed May 15, 2017, U.S. Appl. No. 14/714,365.
PCT/US03/25122, Feb. 19, 2004, Hannan, et al.
Office Action, mailed Feb. 12, 2020, U.S. Appl. No. 16/219,984.
U.S. Appl. No. 10/392,138, Hannan, et al.
U.S. Appl. No. 60/443,360, Hannan, et al.
U.S. Appl. No. 60/402,814, Hannan, et al.
PCT/US2018/043257—International Preliminary Report On Patentability.
PCT/US 18/43257—Written Opinion of the International Searching Authority.
U.S. Appl. No. 61/850,602.
Office Action, mailed May 18, 2020, U.S. Appl. No. 16/294,272.
Office Action, mailed Mar. 16, 2020, U.S. Appl. No. 16/294,272.
Office Action, mailed Dec. 10, 2018, U.S. Appl. No. 15/287,436.
Office Action, mailed Jun. 29, 2018, U.S. Appl. No. 15/287,436.
Office Action, mailed Mar. 15, 2018, U.S. Appl. No. 15/287,436.
Office Action, mailed Sep. 26, 2017, U.S. Appl. No. 15/287,436.
Office Action, mailed Jul. 7, 2016, U.S. Appl. No. 14/161,726.
Office Action, mailed Feb. 2, 2016, U.S. Appl. No. 14/161,726.
Office Action, mailed Oct. 14, 2015, U.S. Appl. No. 14/161,726.
U.S. Appl. No. 60/267,010.
Office Action, mailed Jul. 10, 2006, U.S. Appl. No. 10/067,655.
Office Action, mailed Apr. 3, 2007, U.S. Appl. No. 10/067,655.
Hannan, et al., U.S. Appl. No. 10/392,138, filed Mar. 19, 2003, Entire Document.
Hannan, et al., U.S. Appl. No. 60/443,360, filed Jan. 29, 2003, Entire Document.
Hannan, et al. U.S. Appl. No. 60/402,814, filed Aug. 12, 2002, Entire Document.
Hannan, et al., PCT/US03/25122, Feb. 19, 2004, Published (International Publication Date) Feb. 19, 2004, Entire Document.
U.S. Appl. No. 61/958,389.
Office Action, mailed Feb. 7, 2017, U.S. Appl. No. 14/308,285.
Office Action, mailed Jun. 19, 2017, 2017, U.S. Appl. No. 14/308,285.
Office Action, mailed Sep. 6, 2017, U.S. Appl. No. 14/308,285.
Office Action, mailed Nov. 28, 2017, 2017, U.S. Appl. No. 14/308,285.
Playstation, "How to report in-game behaviour or user created content", [online], published May 15, 2017 [retrieved on 2018.09. 14]. Retrieved from the Internet <URL:.
Playstation (Continued) https://www.playstation.com/en-GB/get-help/helplibrary/my-account/parental-controls/how-to-report-in-game-behaviour-or-user-created-content/.
Playstation (Continued) >entire document, especially p. 1.
Copy of International Search Report for PCT/US 18/43257.
Office Action, mailed Jun. 7, 2019, U.S. Appl. No. 16/039,491.
Office Action, U.S. Appl. No. 16/939,030, mailed Jun. 29, 2021.
Office Action, U.S. Appl. No. 16/853,188, mailed Apr. 30, 2021.
Office Action, U.S. Appl. No. 16/219,984, mailed Feb. 12, 2020.
Office Action, U.S. Appl. No. 16/039,491, mailed Jun. 7, 2019.
Office Action, U.S. Appl. No. 16/596,842, mailed Dec. 15, 2020.
Office Action, U.S. Appl. No. 16/289,681, mailed Jul. 19, 2021.
Office Action, U.S. Appl. No. 16/840,697, mailed Jun. 23, 2021.
Office Action, U.S. Appl. No. 16/785,713, mailed Apr. 16, 2021.
Office Action, U.S. Appl. No. 16/901,197, mailed Aug. 9, 2021.
Office Action, mailed Jul. 19, 2021, U.S. Appl. No. 16/289,681.
Office Action, mailed Aug. 19, 2021, U.S. Appl. No. 16/510,878.
Office Action, mailed Dec. 15, 2020, U.S. Appl. No. 16/596,842.
Office Action, mailed Jun. 23, 2021, U.S. Appl. No. 16/840,697.
Office Action, mailed Apr. 30, 2021, U.S. Appl. No. 16/853,188.
Office Action, mailed Aug. 9, 2021, U.S. Appl. No. 16/901,197.
Office Action, mailed Jun. 29, 2021, U.S. Appl. No. 16/939,030.
Office Action, mailed Oct. 6, 2021, U.S. Appl. No. 17/035,907.
Office Action, mailed May 18, 2015, U.S. Appl. No. 14/161,726.
Office Action, mailed May 5, 2022, U.S. Appl. No. 16/901,197.
Office Action, mailed Mar. 1, 2022, U.S. Appl. No. 17/117,539.
Office Action, mailed Nov. 2, 2021, U.S. Appl. No. 16/853,188.
Office Action, mailed Dec. 22, 2021, U.S. Appl. No. 16/840,697.
Office Action, mailed Mar. 9, 2022, U.S. Appl. No. 16/903,477.
Office Action, mailed Feb. 7, 2022, U.S. Appl. No. 16/901,197.
Office Action, mailed Mar. 10, 2022, U.S. Appl. No. 17/117,539.
Office Action, mailed Mar. 10, 2022, U.S. Appl. No. 17/035,907.
Office Action, mailed Mar. 1, 2022, U.S. Appl. No. 16/853,188.
Office Action, mailed Aug. 24, 2022, U.S. Appl. No. 17/117,539.
Office Action, mailed Jul. 19, 2022, U.S. Appl. No. 16/840,697.
Petition for Inter Partes Review of U.S. Pat. No. 10,255,755.
Petition for Inter Partes Review of U.S. Pat. No. 10,043,341.
Petition for Inter Partes Review of U.S. Pat. No. 9,965,920.
Petition for Inter Partes Review of U.S. Pat. No. 10,147,266.
Order, *Beteiro, Llc* V. *Betmgm, Llc*, United States District Court District of New Jersey, No. 1:21-cv-20156.
Office Action, mailed Sep. 28, 2022, U.S. Appl. No. 16/903,477.
Inter Partes Review Case No. IPR2023-00092 U.S. Pat. No. 9,965,920, Declaration of Garry Kitchen.
Inter Partes Review Case No. IPR2023-00093 U.S. Pat. No. 10,043,341, Declaration of Garry Kitchen.
Inter Partes Review Case No. IPR2023-00094 U.S. Pat. No. 10,147,266, Declaration of Garry Kitchen.

(56) References Cited

OTHER PUBLICATIONS

Inter Partes Review Case No. IPR2023-00095 U.S. Pat. No. 10,255,755, Declaration of Garry Kitchen.
Aarthi Ravikumar, "History of GPS satellites and commercial GPS tracking," Jun. 23, 2020.
"25 years since the world's first text message," Dec. 4, 2017.
Alexa Lemzy, "When Was Texting Invented: The History of Texting," May 3, 2022.
Microsoft Computer Dictionary, 5 th Edition.
Stephen A. Zorn, "The Federal Income Tax Treatment of Gambling: Fairness or Obsolete Moralism?" The Tax Lawyer, vol. 49, No. 1, 1995, pp. 1-54.
"Fact Sheets: Taxes—History of the U.S. Tax System," (https://web.archive.org/web/20101204034946/http://www.treasury.gov/education/fact-sheets/taxes/ustax.shtml); (2010).
"Transmitter vs. Receiver—difference between transmitter and receiver types," RF Wireless World.
Transmitter vs. Receiver (Cont.) (https://www.rfwireless-world.com/Terminology/difference-between-transmitter-and-receiver-types.html).
Marsha Walton, "High-flying answer to cell phone coverage gaps?" Feb. 22, 2002.
Jane Ann Morrison, Tracking slot players becomes state-of-the-art system, Reno Gazette-Journal, Mar. 11, 1988 (and at 8B).
Ken Miller, Record slot jackpots luring high rollers, Reno Gazette-Journal, Mar. 9, 1987 (and at 1A and 6A).
Gary Thompson, "Harrah's launches customer-loyalty program," Sept. 4, 1997.
Gary Thompson (Cont.) https://lasvegassun.com/news/1997/sep/04/harrahs-launches-customer-loyalty-program/) Retrieved May 23, 2022.
Haidong Liu and Shaoping Zhao, "Harrah's E-Business" (The First International Conference on Electric Business, Dec. 19-21, 2001).
Harry Newton, Newton's Telecom Dictionary (11 th Edition, 1996).
Keith D. Foote, "A Brief History of Database Management," Oct. 25, 2021 (https://www.dataversity.net/brief-history-database-management/).
"E.212: The International Identification Plan for Public Networks and Subscriptions," Nov. 13, 1998.
David G. Schwartz, Roll the Bones The History of Gambling (2006).
Office Action, mailed Feb. 27, 2023, U.S. Appl. No. 17/959,097.
Office Action, mailed Apr. 24, 2023, U.S. Appl. No. 17/991,850.
IPR Institution Decision—IPR2023-00093 U.S. Pat. No. 10,043,341 B1.
IPR Institution Decision—IPR2023-00094 U.S. Pat. No. 10,147,266 B2.
IPR Institution Decision—IPR2023-00095 U.S. Pat. No. 10,255,755 B2.
IPR Institution Decision—IPR2023-00092 U.S. Pat. No. 9,965,920 B2.
Office Action, mailed Aug. 30, 2023, U.S. Appl. No. 16/596,842.
Office Action, mailed Aug. 3, 2023, U.S. Appl. No. 17/035,907.
Office Action, mailed Jul. 27, 2023, U.S. Appl. No. 17/959,097.
U.S. Appl. No. 62/935,959, Badra.
"4 Ways Sports Business Intelligence is Changing the Game," by Sisense Team. Published Sep. 6, 2017.
"4 Ways . . . " (Cont.) Source: https://www.sisense.com/blog/4-ways-analytics-changing-professional-sports/ (Year: 2017).
"An analysis of difference expected goals models," Published Nov. 10, 2017. Source: https://www.pinnacle.com/en/betting-articles/soccer/expected-goals-model-analysis/.
"An analysis . . . " (Cont.) Source (cont.): /mep2n9vmg5ctw99d (Year: 2017).
"How to use standard deviation for betting," by Dominic Cortis, Jan. 22, 2015.
"How to use . . . " (Cont.) Source: https://www.pinnacle.com/en/betting-articles/betting-strategy/how-to-use-standard-deviation-for-betting/p8724ge57fbzwd3f (Year: 2015).
"Raheem Sterling Proves That Everything You Know About Goal-Scoring Is Wrong," by Bobby Gardiner, published Jan. 12, 2018.
"Raheem Sterling . . . " (Cont.) Source: https://www.theringer.com/2018/1/12/16879916/soccer-raheem-sterling-manchester-city-goal-scoring-expected-finishing-skill (Year: 2018).
"STATS Launches AUTOSTSATS . . . " published Mar. 4, 2019. Source: https://www.statsperform.com/press/stats-launches-autostats-the-first-patented-ai-powered-technology-to-capture-.
"STATS . . . " Source (Cont.) /sports-tracking-data-via-broadcast-video/ (Year: 2019).
Office Action, mailed Oct. 20, 2023, U.S. Appl. No. 17/991,850.
Office Action, mailed Oct. 10, 2023, U.S. Appl. No. 16/785,713.
Office Action, mailed Nov. 20, 2023, U.S. Appl. No. 17/959,097.
Office Action, mailed Dec. 18, 2023, U.S. Appl. No. 17/035,907.
CeeDee Lamb,Sep. 3, 2017, 247Sports.com, p. 1,at https://web.archive.org/web/20170903135339/https://247sports.com/player/ceedee-lamb-77892/, (last visited Dec. 15, 2023).(Year:2017).
Office Action, mailed May 21, 2024, U.S. Appl. No. 17/959,097.
Office Action, mailed Jan. 23, 2024, U.S. Appl. No. 17/991,850.
Office Action, mailed Sep. 10, 2024, U.S. Appl. No. 16/289,681.
Office Action, mailed Sep. 17, 2024, U.S. Appl. No. 16/289,681.
Office Action, mailed Sep. 9, 2024, U.S. Appl. No. 16/596,842.

* cited by examiner

80

SPORTS BETTING APPARATUS AND METHOD

RELATED APPLICATIONS

This application claims the benefit of the priority of U.S. Provisional Patent Application Ser. No. 62/713,004, filed Aug. 1, 2018, and entitled "SPORTS BETTING APPARATUS AND METHOD", the subject matter and teachings of which are hereby incorporated by reference herein in their entirety.

FIELD OF THE INVENTION

The present invention pertains to a sports betting apparatus and methods and, in particular, to a sports betting apparatus and methods which provide users with the ability to place one or more sports bets on one or games, matches, competitions, or events, and/or provide users with the ability to purchase a ticket, tickets, a ticket option, or ticket options, for any game(s), match(es), competition(s), or event(s), from any location and using any appropriate device while remote from the venue of the respective game, match, competition, or event, or while at the venue of the respective game, match, competition, or event, provides users with the ability to view or watch a respective game, match, competition, or event, in an electronic forum, chat room, or via a website, with others or while alone, provides users with the ability to interact with others while watching or viewing the respective game, match, competition, or event, provides users with the ability to obtain analytics data and/or information regarding one or more sports bets on one or games, matches, competitions, or events, provides users with the ability to purchase a ticket, tickets, a ticket option, or ticket options, for any game(s), match(es), competition(s), or event(s), and/or provides users with the ability to report, or receive, information regarding instances of match fixing, game-fixing, or cheating, relating to games, matches, competitions, or events.

BACKGROUND OF THE INVENTION

Sports betting and gambling on sporting events, games, matches, and other competitions, is very popular throughout the world and, no doubt, represents a huge global market. It has been estimated that the global sports gambling market could be worth up to $3 Trillion, with this estimate including legal and illegal sports betting or gambling activities.

Sports betting, while legal in some jurisdictions, is illegal in a number of other jurisdictions. Those who engage in sports betting also have obstacles to overcome in finding a level playing field on which to engage in sports betting. Bet facilitators, book makers, and other individuals, may have access to analytics data and/or information which provides them with advantages over those individuals or entities who or which do not have access to the same.

Bets, and especially bets on events which occur during a game, match, competition, or event, must be made within short windows of time, thereby precluding many individuals from participating in such bets. Further, with the high prevalence of game fixing, match fixing, or cheating, which has been known to occur in certain sports internationally, some individuals can be cheated of their money without recourse.

In short, it is submitted that the various sports betting products, services, practices, and technologies currently in use have failed to provide the necessary level, and fair, playing field for all those individuals who desire to engage in, and/or to participate in, sports betting and/or sports betting activities.

It is also submitted that individuals who may place a bet on a game, match, competition, or event, might also be interested in purchasing a ticket or tickets, or an option or options for a ticket or tickets, to the game, match, competition, or event, or to any other game, match, competition, or event, with such purchasing decisions being made on the spur of the moment and/or as the result of information, and/or updated information, regarding the respective game, match, competition, or event, or regarding any other game, match, competition, or event, based on betting information, historical information, statistical information, analytics information, and/or news, regarding the respective game, match, competition, or event, or any team, teams, player, players, athlete, or athletes, participating in the same. As a result, it is submitted that that the various sports betting products, services, practices, and technologies, and that the various ticket selling and/or ticket option selling products, services, practices, and technologies, currently in use, do not provide individuals with the sports betting information and/or ticket sales information or ticket option sales information needed to facilitate ticket sales and/or ticket option sales to individuals via a sports betting platform and/or based on sports betting information.

SUMMARY OF THE INVENTION

The present invention pertains to an apparatus and methods for providing and/or for facilitating sports betting or wagering, and/or other gambling or gaming, activities, on, for, and relating to any types or kinds of sporting or athletic games, matches, events, contests, competitions, or tournaments, on, for, and relating to, any players or participants in or of the same, and/or on, for, and relating to, any plays, events, occurrences, or happenings (hereinafter referred to as "game events", "match events" or "micro-events"), before, during, or after, the same (hereinafter also referred to as "sports betting"), as well as for providing and/or facilitating the sale and/or purchase of a ticket, tickets, a ticket option, or ticket options, for any game(s), match(es), competition(s), or event(s), before, during, or after, the same, which overcomes the shortfalls of the prior art.

The present invention also pertains to an apparatus and methods for providing and/or for facilitating betting, gambling, or gaming, activities on and/or for fantasy sports and e-sports competitions and activities. The present invention also pertains to an apparatus and methods for providing and/or facilitating betting, gambling, or gaming, activities on and/or for any non-sports-related or non-athletic-related activity or event for which a bet or a wager can be placed between individuals, parties, or entities, who or which utilize the present invention. In this regard, while the present invention can be utilized in a preferred embodiment for sports betting, it can also be utilized for any other betting, gambling, or gaming, activity which can the subject of a bet or wager between individuals, parties, or entities.

The present invention also pertains to an apparatus and methods for providing and/or for facilitating the sale and/or purchase of a ticket, tickets, a ticket option, or ticket options, for any game(s), match(es), competition(s), or event(s), described herein.

The present invention provides a platform and a network infrastructure by which sports betting of any nature, type, or kind, can be engaged in by any individuals, parties, or entities. The present invention also provides a system whereby, sports governing bodies, such as the International Olympic Committee (hereinafter the "IOC"), national Olympic committees ("NOCs"), international sports federations ("IFs"), regional sports federations and/or confederations, national sports federations ("NFs"), sports conferences, sports leagues at any level (such as for example, professional, amateur, college or university, semi-professional, high school, grade school, and/or local clubs or organizations), teams in any of the foregoing leagues or clubs, and/or players in any of the foregoing leagues or clubs, governmental regulatory bodies, such as national, state, and/or local, governmental regulatory bodies, gamming or gambling facilities, such as venues where events take place, casinos or betting halls, on-line casinos or on-line betting halls, financial institutions, escrow agents, content providers, television broadcasters, streaming video and/or streaming audio providers, and social networks and social network providers, providers of analytics data and/or information, sports analytics information, news information, and/or any other information, along with the individual parties or entities who engage in sports betting or sports betting activities, can all come together to utilize the apparatus and methods of the present invention.

The present invention also pertains to, and provides, an apparatus and methods which can allow individuals, parties, and entities, who or which place bets or wagers on any of the herein-described games, matches, activities, or events, whether sports-related or non-sports-related, to watch and/or listen to a video and/or audio transmission of the same. Bets or wagers can also be placed during the respective game, match, activity, or event. These bets or wagers can be placed using the same communication device which is being used to watch and/or listen to the respective game, match, activity, or event.

The present invention also pertains to, and provides, an apparatus and methods which can allow individuals, parties, and entities, who or which place bets or wagers on any of the herein-described games, matches, activities, or events, whether sports-related or non-sports-related, to watch and/or listen to a video and/or audio transmission of the same in a group environment, a social networking environment, or in a chat room environment, and to place bets or wagers during the respective game, match, activity, or event, as well as to place bets or wagers on game events, match event, or micro-events, during the respective game, match, activity, or event.

The present invention also pertains to, and provides, an apparatus and methods which can allow individuals, parties, and/or entities, to watch and/or listen to games, matches, activities, or events, in and/or using 360 degree video, virtual reality ("VR"), and/or augmented reality ("AR"), technologies while allowing the individuals, parties, and/or entities to also engage in placing bets or wagers via the respective 360 degree video, VR, or AR, user interface(s).

The present invention also pertains to, and provides, an apparatus and methods which can allow individuals, parties, and/or entities, to engage in social networking activities while watching and/or listening to a game, match, activity, or event, and in discussing or engaging in sports betting and/or sports betting activities. Individuals, parties, and/or entities, can also place bets or wagers during any social networking activities or discussions.

The present invention also pertains to, and provides, an apparatus and methods which can allow individuals, parties, and/or entities, to engage in a chat room discussion prior to, after, or while watching and/or listening to, a sporting event or any other game, match, activity, or event, and can allow users to place bets on the same. The present invention can also be utilized to allow users to place private bets with one another and/or in pools of individuals, parties, and/or entities.

The present invention also pertains to, and provides, an apparatus and methods which can be utilized to provide users with sports analytics data and/or information, analytics information, news information, and/or statistical, probabilistic, or other, information, for use in engaging in sports betting activities.

The present invention also pertains to, and provides, an apparatus and methods which can allow users to engage in selecting or predicting next plays or other activities and/or game events, match events, or micro-events, during a sporting event or any game, match, activity, or event. Users can also place bets game events, match events, or micro-events, and/or users can engage in competitions to predict game events, match events, or micro-events, for betting or wagering purposes, for recreational purposes, such as to engage in competitions with other users, and/or for training purposes such as when an individual may desire to train to be a team coach or manager.

The apparatus of the present invention includes a central processing computer or server computer, which can be a single computer or computer system or can include any number of computers and/or computer systems. The central processing computer is specially programmed and/or specially configured to provide a sports betting, gambling, or gaming, platform which can provide and/or perform all the functionalities described herein as being performed by present invention. The central processing computer is also specially programmed and/or specially configured to perform any and all of the various processing routines and/or functionalities described herein as being performed by the present invention.

The central processing computer can be associated with, and/or can be used by, any sports betting provider or facilitator, a gaming provider, a gaming facility, or a gaming venue, and/or any number of sports betting providers or facilitators, gaming providers, gaming facilities, or gaming venues. The central processing computer can also be associated with, and/or can be used by, the International Olympic Committee, national Olympic committees, international sports federations, regional sports federations and/or confederations, national sports federations, sports conferences, sports leagues, or sports teams or clubs, in providing sports betting. The central processing computer can also have a website or websites associated therewith as an interface for any of the herein-described users of the present invention.

The apparatus also includes any number of user computers or user communication devices which can be utilized by any individual, party, or entity, who or which uses the apparatus of the present invention in order to communicate with the central processing computer and/or with any of the other computers and communication devices described herein as being used in or with the present invention. The user communication device or devices can communicate with, and/or can be linked with, the central processing computer and/or any other computers or communication devices described herein, via a wired communication network, a wireless communication network, or any combination of wired and/or wireless communication networks.

The user communication device can be utilized by any of the herein-described users of the present invention in order to interface with, and/or interact with, the central processing computer and/or with any of the other computers and communication devices described herein. The user communication device can be a computer, a computer terminal, a terminal device connected to, or associated with, the central processing computer, a kiosk, a personal computer, a home computer, a personal communication device, a telephone, an interactive television, a smart phone, a cellular telephone, a wireless telephone, a videophone, a video telephone, a personal digital assistant, a watch, a smart watch, a 360 degree video headset or interface, a VR (virtual reality) headset or interface, an AR (augmented reality) headset or interface, a wearable communication device, glasses equipped with communications equipment, a beeper or a pager, or any other communication device or equipment. The user communication device can also be a server computer, a network computer, or any other computer capable of being utilized in a network.

The user communication device can also include, and/or can be utilized in conjunction with, a network computer, which is defined to be any computer which can be utilized to communicate with any other computer or communication device in any communication network, and which can also be utilized to send and receive text messages and/or e-mail messages to, for, or on behalf of, a user. The network computer can transmit the text messages or e-mail messages to any of the herein-described user communication devices and/or can provide a text message or an e-mail message to the user communication device when so requested by the user. The respective network computer can also automatically transmit or "push" a text message or an e-mail message or multiple text messages or e-mail messages to a user communication device as soon as same are received and/or in real-time.

The respective network computer can also serve as a conventional text message server or as an e-mail server which can allow a user to request or "pull" a text message or an e-mail message or text messages or e-mail messages to a user communication device when requested by the user or other authorized individual.

The apparatus also includes a sport governing body computer or computer system or any number be sport governing body computers which can be used by, and/or which can be associated with, any sports governing body, such as, for example, but not limited to, the International Olympic Committee, a national Olympic committee, an international sports federation, a regional sports federation or confederation, a national sports federation, any sports conference, any sports league (such as, for example, the U.S. Professional leagues such as the National Football League (NFL), the National Basketball Association (NBA), Major League Baseball (MLB), the National Hockey League (NHL), Major League Soccer (MLS), or any other U.S. sports leagues or conferences, or, for example, in Europe, the Premier League, La Liga, or the UEFA Champions League, in soccer (also referred to as "football" outside the U.S.), and/or any sports team or club, and/or any sports governing body, league, conference, team, or club, of or on any level.

The respective sport governing body can utilize its respective sport governing body computer to utilize the present invention for any purpose such as, for example, for monitoring and/or for providing oversight and/or for regulating sports betting activities regarding games, matches, events, or activities, in its sport, league, or conference and/or under its jurisdiction. The sport governing body computer can be utilized to allow the sport governing body, or an employee or agent of same, to communicate with and/or to interact with the central processing computer, the user communication devices, and/or with any of the other computers and communication devices described herein as being used in or with the apparatus. The sport governing body computer can communicate with, and/or can be linked with, the central processing computer and/or any other computers or communication devices described herein, via a wired communication network, a wireless communication network, or any combination of wired and/or wireless communication networks. Each sport governing body computer can include any number of computers, server computers, or computer systems, and can also have a website or websites associated therewith.

The apparatus also includes a governmental entity computer or computer system which can be used by, and/or which can be associated with, a governmental entity which can, for example, be a national government, federal government, regional government, state government, provincial government, local government, municipal government, or any other governmental entity, of any country or political or geographical subdivision. The governmental entity computer can also be used by, and/or can be associated with, a gaming commission, gaming administrator, or other entity, which can regulate, oversee, and/or administer, sports betting activities of any kind or type.

The governmental entity computer can be utilized to allow the governmental entity, or an employee or agent of same, to communicate with and/or interact with the central processing computer, the user communication devices, the sport governing body computer, and/or with any of the other computers and communication devices described herein as being used in or with the apparatus. The governmental entity computer can communicate with, and/or be linked with, the central processing computer and/or with any other computer or communication devices described herein, via a wired communication network, a wireless communication network, or any combination of wired and/or wireless communication networks.

The governmental entity computer can be used by its respective governmental entity for any purpose such as, for example, for monitoring and/or for providing oversight and/or for regulating sports betting activities regarding games, matches, events, or activities, within or under its jurisdiction.

The governmental entity computer can be utilized by any of the herein-described governmental entities in order to interface with, and/or to interact with, the central processing computer and/or any other computers and communication devices described herein as being used with the apparatus. Each governmental entity computer can include any number of computers, server computers, or computer systems, and can also have a website or websites associated therewith.

The apparatus also includes a gaming facility or venue computer or computer system which can be used by, and/or which can be associated with, a gaming facility or venue such as, for example, a casino, a race track, or a betting establishment, or a stadium, an arena, a gambling hall, a gaming outlet, a boat, a ship, a cruise ship, a commercial boat, a passenger boat, a ferry, a marine vehicle, a marine vessel, an aircraft, an airplane, a jet, a passenger aircraft, a shuttle aircraft, a commercial aircraft, a train, a subway train, a bus, and/or an automobile, and/or a website, and/or any other entity or venue, at which or from which a sporting game, match, event, or activity, or sports betting regarding same, can take place.

The gaming facility computer can be utilized to allow the gaming facility or venue, or an employee or agent of same, to communicate with and/or interact with the central processing computer, the user communication devices, the sport governing body computer, the governmental computers, and/or any of the other computers and communication devices described herein as being used in or with the apparatus. The gaming facility computer can communicate with, and/or can be linked with, the central processing computer and/or any other computer or communication devices described herein, via a wired communication network, a wireless communication network, or via any combination of wired and/or wireless communication networks.

The gaming facility computer can be used by its respective gaming facility or venue for any purpose such as, for example, for monitoring and/or for providing oversight and/or for regulating sports betting activities regarding games, matches, events, or activities, within its facility or venue. Each gaming facility computer can include any number of computers, server computers, or computer systems, and can also have a website or websites associated therewith.

The gaming facility computer can also include a kiosk, or any number of kiosks, or a computer terminal or any number of computer terminals, or any other interface(s), for allowing an individual attending the gaming facility or venue, such as to attend a sporting game, match, event, or activity, to access the central processing computer to place a bet on the same or on any other sporting game, match, event, or activity. In this regard, an individual can use the gaming facility computer to place a bet on a sporting event taking place at the gaming facility or venue while at the facility or venue and without using his or her user communication device.

The apparatus also includes a content provider computer or computer system which can be used by, and/or which can be associated with a television broadcasting network or station, a radio broadcasting network or station, an Internet streaming video and/or audio provider, or any other content provider. The content provider computer can be utilized to allow the content provider to broadcast or transmit, whichever the case may be, its respective content to any users of the apparatus as well as to communicate with and/or interact with the central processing computer, the user communication devices, the sport governing body computer, the governmental entity computers, the gaming facility computers, and/or any of the other computers and communication devices described herein as being used in or with the apparatus. The content provider computer can communicate with, and/or be linked with, the central processing computer, any of the user communication devices, and/or any other computers or communication devices described herein.

The content provider computer can communicate with, and/or be linked with, the central processing computer, any of the user communication devices, and/or any other computers or communication devices described herein, via a wired communication network, a wireless communication network, or via any combination of wired and/or wireless communication networks.

The content provider computer can transmit content, such as television broadcasts or Internet streaming broadcasts of video and/or audio of sporting events directly to a user communication device or to the central processing computer for re-transmission to a user communication device. The content provider computer can also transmit content, such as television broadcasts or Internet streaming broadcasts of video and/or audio of sporting events, in or as 360 degree videos, immersive videos, spherical videos, in virtual reality, or in augmented reality, directly to a user communication device or to the central processing computer for re-transmission to a user communication device. In this regard, the content provider computer and the central processing computer can be specially programmed and specially configured to transmit sporting events in or as 360 degree video, immersive video, or spherical video, in virtual reality (VR), and/or in augmented reality (AR).

The apparatus also includes an information/analytics provider computer or computer system which can be used by, and/or which can be associated with, an information provider, such as for example, a news service, a news website, a website associated with a newspaper or other periodical, an analytics company, a sports analytics company, an analytics provider, an analytics service, and/or any other provider of any data and/or information which can be utilized by users of the apparatus in engaging is sports betting of any kind or type. The information/analytics provider computer can be utilized to provide information, news, analytics information, sports analytics data and/or information, or any other statistical, historical, predictive, or forecasting, data and/or information, to any users of the present invention. The information/analytics provider computer can be utilized by the respective information/analytics provider associated with the same in order to communicate with and/or to interact with the central processing computer, the user communication devices, the sport governing body computer, the governmental entity computer, the gaming facility computer, the content provider computer, and/or any of the other computers and communication devices described herein.

The information/analytics provider computer can communicate with, and/or be linked with, the central processing computer, any of the user communication devices, and/or any other computers or communication devices described herein. The information/analytics provider computer can communicate with, and/or be linked with, the central processing computer, any of the user communication devices, and/or any other computers or communication devices described herein, via a wired communication network, a wireless communication network, or via any combination of wired and/or wireless communication networks.

The information/analytics provider computer can transmit information, news, analytics data and/or information, sports analytics information, or any other statistical, historical, predictive, or forecasting, data and/or information, directly to a user communication device or to the central processing computer for re-transmission to a user communication device. Each information/analytics provider computer can include any number of computers, server computers, or computer systems, and can also have a website or websites associated therewith.

The apparatus also includes a social network computer or computer system which can be used by a social networking company or a social networking provider to provide social networks, social networking services, and/or social networking forums, to and/or for any of the users of the present invention. The social network computer can be utilized by the social networking company or a social networking provider associated with the same in order to communicate with and/or to interact with the central processing computer, the user communication devices, the sport governing body computer, the governmental entity computer, the gaming facility computer, the content provider computer, the information/analytics provider computer, and/or any of the other computers and communication devices described herein as being used in or with the apparatus. The social network computer can communicate with, and/or be linked with, the central processing computer, any of the user communication devices, and/or any other computers or communication devices described herein.

The social network computer can communicate with, and/or be linked with, the central processing computer, any of the user communication devices, and/or any other computers or communication devices described herein, via a wired communication network, a wireless communication network, or via any combination of wired and/or wireless communication networks. The social network computer can transmit information directly to a user communication device or to the central processing computer for re-transmission to a user communication device. Each social network computer can include any number of computers, server computers, or computer systems, and can also have a website or websites associated therewith.

The apparatus also includes a financial institution/intermediary computer or computer system which can be used by, and/or which can be associated with a bank, a credit card company or service, a debit card company or service, an electronic money account or service, or any other financial institution which can administer and/or service financial accounts and/or gaming accounts for any of the herein-described users, sports governing bodies, governmental entities, gaming facilities or venues, content providers, information/analytics providers, and/or social networking companies or social networking providers, an/do or any other individuals or entities who or which use the present invention.

The financial institution computer can communicate with and/or interact with the central processing computer, the user communication devices, the sport governing body computer, the governmental entity computer, the gaming facility computer, the content provider computer, the information/analytics provider computer, the social network computer, and/or any of the other computers and communication devices described herein as being used in or with the apparatus. The financial institution computer can communicate with, and/or be linked with, the central processing computer, any of the user communication devices, and/or any other computers or communication devices described herein.

The financial institution computer can communicate with, and/or be linked with, the central processing computer, any of the user communication devices, and/or any other computers or communication devices described herein, via a wired communication network, a wireless communication network, or via any combination of wired and/or wireless communication networks. Each financial institution computer can include any number of computers, server computers, or computer systems, and can also have a website or websites associated therewith.

The apparatus also includes an escrow agent computer or computer system which can be used by, and/or can be associated with, an escrow agent or an escrow facility for holding bets or wagers and/or any other entities, monies, or objects, etc., which can be the subject of the bet or wager, for any user of the present invention. The escrow agent or escrow facility is a neutral administrator who or which can act as the escrow agent for parties to a bet or wager and/or who or which can be the officiating party or entity to officiate over a bet or wager when and/or if such a service or services are or may be needed and/or desired.

The escrow agent computer can communicate with and/or can interact with the central processing computer, the user communication devices, the sport governing body computer, the governmental entity computer, the gaming facility computer, the content provider computer, the information/analytics provider computer, the social network computer, the financial institution computer, and/or with any of the other computers and communication devices described herein. The escrow agent computer can communicate with, and/or can be linked with, the central processing computer, any of the user communication devices, and/or any other computers or communication devices described herein.

The escrow agent computer can communicate with, and/or be linked with, the central processing computer, any of the user communication devices, and/or any other computers or communication devices described herein, via a wired communication network, a wireless communication network, or via any combination of wired and/or wireless communication networks. Each escrow agent computer can include any number of computers, server computers, or computer systems, and can also have a website or websites associated therewith.

The apparatus can also include one or more wearable devices which can be worn by, or attached to the clothing or uniform of, an athlete or player during a respective game, match, or competition. The wearable device can be any of the many wearable devices which are equipped for, or utilized for, measuring and/or transmitting biological data and/or information, physiological data and/or information, pulse rate, heart rate, blood pressure, blood-sugar level or blood-glucose level data and/or information, athlete or player movement data and/or information, and/or any other data and/or information. The wearable device can also be equipped for, or utilized for, measuring steps taken, distance traveled, speed of travel, and/or any other data and/or information for monitoring an athlete's or a player's performance during a game, match, or competition.

The wearable device can communicate with and/or can interact with the central processing computer, the user communication devices, the sport governing body computer, the governmental entity computer, the gaming facility computer, the content provider computer, the information/analytics provider computer, the social network computer, the financial institution computer, and/or any of the other computers and communication devices described herein. The wearable device can communicate with, and/or be linked with, the central processing computer, any of the user communication devices, and/or any other computers or communication devices described herein.

The wearable device can communicate with, and/or be linked with, the central processing computer, any of the user communication devices, and/or any other computers or communication devices described herein, via a wired communication network, a wireless communication network, or via any combination of wired and/or wireless communication networks.

Any number of central processing computers, user communication devices, sport governing body computers, governmental entity computers, gaming facility computers, content provider computers, information/analytics provider computers, social network computers, financial institution computers, escrow agent computers, and wearable devices, can be utilized in, and/or in connection with or in association with, the present invention.

Any of the central processing computers, the user communication devices, the sport governing body computers, the governmental entity computers, the gaming facility computers, the content provider computers, the information/analytics provider computers, the social network computers, the financial institution computers, the escrow agent computers, and/or the wearable devices, can communicate with any other central processing computer(s), user communication device(s), sport governing body computer(s), governmental entity computer(s), gaming facility computer(s), content provider computer(s), information/analytics provider computer(s), social network computer(s), financial institution computer(s), escrow agent computer(s), and/or wearable device(s), in a bi-directional manner. In this regard, any computer or communication device, or any wearable device, described herein can communicate, in a bi-directional manner, with any other computer, communication device, or wearable device, described herein.

The present invention can be utilized on, over, or via, the Internet and/or the World Wide Web and/or on, over, or via, any suitable communication network and/or any combination of communication networks, including, but not limited to the Internet, the World Wide Web, a telecommunication network or system, a telephone network or system, a cable television communication network or system, a satellite television communication network or system, a digital television network or system, a satellite communication network or system, a broadband communication network or system, a radio frequency communication network or system, an optical communication network or system, a line-connected network or system, a wireless network or system, a radio communication network or system, a digital communication network or system, a personal communications services (PCS) network or system, a local area network (LAN), a wide area network (WAN), a wireless Internet network or system, a wireless World Wide Web network or system, an optical communication network or system, a broadband communication network or system, a Bluetooth communication network or system, a streaming video communication network or system, a streaming audio communication network or system, a live video communication network or system, and/or any other suitable communication network or system, and/or any combination(s) thereof.

The central processing computer includes a central processing unit (CPU) which can be microprocessor, a microcomputer, a minicomputer, a macro-computer, or a mainframe computer, depending upon the application. The CPU is specially programmed to perform all of the functionality described herein as being performed by the central processing computer. The central processing computer also includes a random access memory (RAM) device and a read only memory (ROM) device, and a user input device(s) which can be or include any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, or instructions and/or commands, to be entered into the central processing computer. Data, information, and/or commands or instructions, can also be input using voice recognition software and a microphone.

The central processing computer also includes a display device, such as a display monitor and/or a display screen. The central processing computer can also include an output device, such as a printer, a display device, and/or a modem, for outputting, in either or both of hard copy form or electronic form, any of the data and/or information which is described herein as being provided by, from, or at, the central processing computer.

The central processing computer can also include a receiver for receiving data and/or information, including any of the herein-described data and/or information, and/or any of the other data and/or information described herein as being provided or transmitted to the central processing computer from any of the user communication devices, sport governing body computers, governmental entity computers, gaming facility computers, content provider computers, information/analytics provider computers, social network computers, financial institution computers, escrow agent computers, wearable devices, and/or from any other central processing computers.

The central processing computer can also include a database(s), which can contain any and/or all of the data and/or information, and/or software programs or software applications, which may be required, and/or which may be desired, for performing any of the functionality and/or processing routines described herein as being performed by the central processing computer or the apparatus of the present invention.

The central processing computer can also include a transmitter for transmitting data and/or information, including any of the herein-described data and/or information, and/or any of the other data and/or information described herein as being provided or transmitted from the central processing computer to any of the user communication devices, sport governing body computers, governmental entity computers, gaming facility computers, content provider computers, information/analytics provider computers, social network computers, financial institution computers, escrow agent computers, and/or wearable devices, and/or to any other central processing computers.

The central processing computer can also include a global positioning device for determining the position or location of the central processing computer. The global positioning device can be utilized in order to determine the position or location of the central processing computer so as to, for example, determine a jurisdiction in which the central processing computer is located at any given time.

The central processing computer can also include a video and/or audio recording device(s) which can include a camera and/or a video recording device for recording pictures or video and/or video clips and/or a microphone or an audio recording device for recording audio or audio clips which can be recorded by, and/or transmitted live by, or from the central processing computer, or which can be recorded by, and stored at or in, the central processing computer for transmission by or from the central processing computer at a later time.

The user communication device can be any computer or communication device and/or can also be a computer terminal, a terminal device connected to, or associated with, the central processing computer, or a kiosk. The user communication device can also be, or can include, any 360 degree video headset or interface, VR (virtual reality) headset or interface, or AR (augmented reality) headset or interface, a wearable communication device, glasses equipped with communications equipment, or any other communication device or equipment.

The user communication device includes a central processing unit or CPU which is specially programmed to perform all of the functionality described herein as being performed by the user communication device, a random access memory device(s) (RAM), a read only memory device(s) (ROM), a user input device, and a display device. The user communication device also includes a transmitter(s), for transmitting signals and/or data and/or information to any one or more of the central processing computer(s), the sport governing body computers, the governmental entity computers, the gaming facility computers, the content provider computers, the information/analytics provider computers, the social network computers, the financial institution computers, the escrow agent computers, and/or the wearable devices, and/or any other user communication devices, which can be utilized in conjunction with the present invention.

The user communication device also includes a receiver, for receiving signals and/or data and/or information from any one or more of the central processing computer(s), the sport governing body computers, the governmental entity computers, the gaming facility computers, the content provider computers, the information/analytics provider computers, the social network computers, the financial institution computers, the escrow agent computers, and/or the wearable devices, and/or any other user communication devices, which may be utilized in conjunction with the present invention.

The user communication device also includes a database(s) which can contain, and/or be linked to, any of the data and/or information needed by the user communication device to perform any and/or all the functions described herein as being performed by the same, as well as can contain, and/or be linked to, data and/or information stored in the database of the central processing computer(s).

The user communication device also includes an output device, for outputting any of the data, information, and/or reports, described herein as being generated by or via the user communication device. The user communication device also includes a video and/or audio recording device(s) which can include a camera and/or a video recording device for recording pictures or video and/or video clips and/or a microphone or an audio recording device for recording audio or audio clips which can be recorded by, and/or transmitted live by, or from the user communication device, or which can be recorded by, and stored at or in, the user communication device for transmission by or from the user communication device at a later time. The user communication device also includes a global positioning device for determining the position or location of the user communication device.

Each of the sports governing body computers, the governmental entity computers, the gaming facility computers, the content provider computers, the information/analytics provider computers, the social network computers, the financial institution computers, the escrow agent computers, and the wearable devices, can also include a central processing unit or CPU, a random access memory device(s) (RAM), a read only memory device(s) (ROM), a user input device, a display device, a transmitter, a receiver, a database, and an output device. If needed or desired, each of the sports governing body computers, the governmental entity computers, the gaming facility computers, the content provider computers, the information/analytics provider computers, the social network computers, the financial institution computers, the escrow agent computers, and/or the wearable devices, can also include a global positioning device and/or a video and/or audio recording device(s).

The present invention can be utilized in a number of various preferred embodiments in order to allow individuals, groups of individuals, or entities, to place bets or wagers on sporting events, place bets during sporting events, watch and/or listen to sporting events via the apparatus, place bets while viewing sporting events via the apparatus, watch and/or listen to sporting events with other individuals in an electronic forum or a chat room, place bets with other individuals while watching and/or listening to sporting events via the electronic forum or chat room, and/or place bets in betting pools. The present invention can also be utilized in order to request and/or to receive data and/or information from a sports governing body, governmental entity, gaming facility, or content provider, before, during, or after, the sporting event.

The present invention can also be utilized in order to request and/or receive analytics information from a sports information and/or analytics provider regarding the sporting event before, during, or after, the sporting event. The present invention can also be utilized in order to request and/or obtain betting odds information from the central processing computer or from any information or analytics provider or content provider, or any other information provider who or which utilizes the present invention. The present invention can also be utilized in order to request and/or receive information obtained from wearable devices worn by players or athletes during sporting events.

The present invention can also be utilized in order to request and/or receive services from a financial institution and/or from an escrow agent or escrow service before, during, or after, a sporting event, as well as for placing bets and bet monies in escrow for safekeeping.

The present invention can also be utilized in order to allow an individual to watch and/or listen to games along with, and/or place bets with, other individuals and/or members of a social network or social networking group or subgroups in which the individual is a member. The present invention can also be utilized in order to allow an individual to watch and/or listen to games and places bets with other individuals or members of a social network or social networking group or subgroup before, during, and/or after, a sporting event.

The present invention can also be utilized by an individual to watch and/or listen to sporting events using 360 degree video, virtual reality (VR), or augmented reality (AR), or any combination of same.

The present invention can be used in connection with sports betting activities for or involving any and/or all types or kinds of games, matches, activities, events, or competitions, for any and/or all types or kinds of sporting and/or athletic games, matches, activities, events, and/or competitions. In this regard, and without limiting the use of the present invention in any way, the present invention can be utilized to engage in any and/or all types or kinds of sports betting and/or sports betting activities.

The present invention can also be utilized to allow an individual or user to search for, find, and/or be notified regarding, a sporting event, game, match, activity, competition, or tournament, on which he or she can place a bet, allow the individual or user to place a bet on the respective sporting event, game, match, activity, competition, or tournament, allow the individual or user to watch and/or listen to the sporting event, game, match, activity, competition, or tournament, via an electronic forum either alone or with a group of other individuals or users, allow the individual or user to place bets on events, plays, or happenings, which occur during the respective sporting event, game, match, activity, competition, or tournament, or during the course of the respective sporting event, game, match, activity, competition, or tournament, and/or allow the individual or user to communicate with other individuals or users in a social networking forum or chat room environment.

The electronic forum or chat room can also be used to provide an individual or user with a video screen by which the individual or user can watch and/or listen to the respective sporting event, game, match, activity, competition, or tournament, provide analytics data and/or information regarding the respective sporting event, game, match, activity, competition, or tournament, to the individual or user, provide the individual or user with information regarding his or her bets which have been placed, provide the individual or user with available bets which can be placed, provide the individual or user with information regarding betting odds for various bets as well as betting odds which can be continuously updated, and/or can provide the individual or user with the ability to communicate with, and see via video chatting or video conferencing, other individuals or users who can watch the respective sporting event, game, match, activity, competition, or tournament, along with the individual or user, thereby enabling the individual or user, and others, to watch and/or listen to the respective sporting event, game, match, activity, competition, or tournament, as a group, as well as be provided with any and/or all other data and/or information and/or services described herein as being provided by the present invention.

An individual or user can also utilize a headset as, or in conjunction with, the user communication device. In instances when an individual or user uses a headset as, or in conjunction with, the user communication device, the individual or user can utilize the microphone of the video and/or audio recording device(s) of his or her user communication device, along with associated voice recognition software provided with the user communication device or the with the headset, in order to verbally input data, information, commands, or instructions, into the user communication device, and/or into the central processing computer, the sport governing body computers, the governmental entity computers, the gaming facility computers, the content provider computers, the information/analytics provider computers, the social network computers, the financial institution computers, the escrow agent computers, and/or the wearable devices, described herein.

Each of the central processing computers, the user communication devices, the sport governing body computers, the governmental entity computers, the gaming facility computers, the content provider computers, the information/analytics provider computers, the social network computers, the financial institution computers, the escrow agent computers, and the wearable devices, described herein, are each specially programmed and/or specially configured to perform any and/or all of the various functions described herein as being performed or provided by the same.

The individual or user can download, from or via the central processing computer, to his or her user communication device, any copies of any needed or desired 360 degree video, virtual reality (VR), and/or augmented reality (AR), software, application ("app"), or applications ("apps"). In this regard, the individual or user can watch and/or listen to any sporting event, game, match, activity, competition, or tournament, in and using 360 degree video, virtual reality (VR), and/or augmented reality (AR).

The individual or user can also search for a sporting event, game, match, activity, competition, or tournament, or sporting events, games, matches, activities, competitions, or tournaments, on or for which he or she can place a bet. The individual or user can use his or her user communication device, in communication with, and/or in conjunction with, the central processing computer, to search for, and/or to locate, a sporting event, game, match, activity, competition, or tournament, on or for which he or she wants to place a bet. The individual or user can search for a sporting event, game, match, activity, competition, or tournament, by searching by the sport, by the country or region in the world in which the sporting event, game, match, activity, competition, or tournament, is to be held or is being held, by the team or teams playing in or participating in the sporting event, game, match, activity, competition, or tournament, by the player or players playing in or participating in the sporting event, game, match, activity, competition, or tournament, by betting odds placed on the sporting event, game, match, activity, competition, or tournament, or by or using any other search criteria. The central processing computer can transmit one or more search results to the user communication device.

The individual or user can review any search results and select the sporting event, game, match, activity, competition, or tournament, on which he or she desires to place a bet. The individual or user can also access the information/analytics provider computer in order to obtain any data and/or information or analytics data and/or information which he or she may want to obtain and review in advance of placing any bet. The individual or user can also request, for the sporting event, game, match, activity, competition, or tournament, on which the individual or user has selected to place a bet, that the information/analytics provider computer transmit updated data and/or information, including, but not limited to, analytics data and/or information, information regarding betting odds changes, information regarding new betting opportunities, and any other data and/or information, regarding the sporting event, game, match, activity, competition, or tournament, or any team(s) and/or player(s) or participant(s) in same, to the user communication device before the start of, during, or after, the selected sporting event, game, match, activity, competition, or tournament.

The individual or user can also request to be notified regarding, and can be provided with, data and/or information, including, but not limited to, analytics data and/or information, information regarding betting odds changes, information regarding new betting opportunities, any other data and/or information, regarding any other sporting event(s), game(s), match(es), activity or activities, competition(s), or tournament(s), or any team(s) and/or player(s) or participant(s) in same, in which the individual or user may be interested. The individual or user can place a bet on the selected sporting event, game, match, activity, competition, or tournament, and the individual or user can utilize a payment identifier, such as his or her sports betting account number, gaming account number, or gambling account number, in order to place and make payment for the bet. The individual or user can also provide a payment identifier such as, but not limited to, a credit account number, a credit card account number, a debit account number, a debit card account number, a charge account number, a charge card account number, a savings account number, a checking account number, or any other payment account number.

The individual or user can also access his or her sports betting account, gaming account, or gambling account, by accessing the same via the financial institution computer for the financial institution or bank which services the respective sports betting account, gaming account, or gambling account, in order to ascertain the status of the same or to make payment for the bet by utilizing the same. The individual or user can also instruct the central processing computer to place his or her bet monies into an escrow account in order to safeguard the same in the event that the sporting event, game, match, activity, competition, or tournament, on which the bet was placed, has been, or is, reported to be the subject of game fixing, match fixing, or cheating, activities. The individual or user can also instruct the escrow computer not make payment of any lost bet until after a certain, and/or a pre-defined, time period has elapsed after the sporting event, game, match, activity, competition, or tournament, so that the individual or user can be safeguarded against any game fixing, match fixing, or cheating, activities which may have occurred and/or played a role in the outcome of the selected sporting event, game, match, activity, competition, or tournament. Use of the escrow agent computer, to hold and/or maintain bet monies for a bet in escrow, can help safeguard against game fixing, match fixing, or cheating, and provide a much more secure sports betting environment.

The central processing computer can also generate a bet confirmation message which can contain information regarding the bet that was placed, the date and time of the selected sporting event, game, match, activity, competition, or tournament, on which the bet was placed, and a link to an electronic forum, in which the individual or user can watch or listen to the sporting event, game, match, activity, competition, or tournament, on which the bet was placed, with, and interact with other individuals or users, a link to a chat room in which the individual or user can watch and/or listen to the sporting event, game, match, activity, competition, or tournament, with, and interact with, other individuals or users in the individual's or user's social networking group or in the individual's or user's group of friends, and/or a link to a website in which the individual or user can watch and/or listen to the watch and/or listen to the sporting event, game, match, activity, competition, or tournament, by himself or herself.

The central processing computer can be specially programmed to provide multiple broadcasts simultaneously of the sporting event, game, match, activity, competition, or tournament, to any number of different and distinct social networking groups in any number of electronic forums or chat rooms so that all of the individuals or users in the various social networking groups or other groups can watch and/or listen to the sporting event, game, match, activity, competition, or tournament, together and as a group, post comments, communicate and interact with one another, place additional bets on the sporting event, game, match, activity, competition, or tournament, or on other sporting events, games, matches, activities, competitions, or tournaments, request and be provided with data and/or information or analytical data and/or information for the sporting event, game, match, activity, competition, or tournament, or for another sporting event, game, match, activity, competition, or tournament, report instances of suspected game fixing, match fixing, or cheating, activities which any individual or user may notice. In this regard, the present invention allows an individual or user to place a bet on a sporting event, game, match, activity, competition, or tournament, and allows the individual or user to watch or listen to same with others while having the ability to communicate with others in an on-line social environment, obtain sports betting information, and report instances of suspected game fixing, match fixing, or cheating, activities.

The central processing computer can also be specially programmed to provide multiple broadcasts simultaneously of the sporting event, game, match, activity, competition, or tournament, and provide any and/or all of the herein-described functionality, to any number of different and distinct chat rooms of previously selected groups of individuals or users, which can include friends and/or acquaintances of the individual or user, or others, in an electronic forum or multimedia chat room so that all of the previously selected individuals in the social networking group or pre-selected group can watch and/or listen to the sporting event, game, match, activity, competition, or tournament and avail themselves to any and/or of all of the features and functionality capable of being provided by the present invention.

In instances in which the individual or user initially selected to watch and/or listen the sporting event, game, match, activity, competition, or tournament, by himself or herself, the individual or user can, at any time before or during the sporting event, game, match, activity, competition, or tournament, join any available electronic forum or chat room provided in the betting confirmation message. Links to any such electronic forums or chat rooms can also be provided along with a broadcast of the sporting event, game, match, activity, competition, or tournament provided on a website.

At any time, the individual or user can access the respective electronic forum, chat room, or website, to obtain information, such as the score, time remaining, or any other information regarding the sporting event, game, match, activity, competition, or tournament, simply by linking to same using the link in the betting confirmation message. In this regard, the individual or user need not watch or listen to the entire sporting event, game, match, activity, competition, or tournament, but can simply access the respective electronic forum, chat room, or website, via which same can be watched and/or listened to in order to obtain information regarding same at any time. The individual or user can obtain information which may be displayed via the video screen on which the score of the sporting event, game, match, activity, competition, or tournament, and/or the individual or user can obtain information from the postings of the other individuals or users.

The betting confirmation message can be transmitted from the central processing computer to the user communication device which was used by the individual or user in to place the bet, or the betting confirmation message can be transmitted in or as an email message to the email server servicing the individual's or user's email account. The betting confirmation message can also be transmitted in or as an instant message or as an SMS message to the user communication device or to another user communication device which can be used by the individual or user to receive the same and to access the sporting event, game, match, activity, competition, or tournament.

The individual or user can also program or request, at the time of the placing of the bet on the sporting event, game, match, activity, competition, or tournament, or upon registering an account with the apparatus or the central processing computer, that the central processing computer generate and/or transmit a sporting event message which can be transmitted to his or her the user communication device in or as an email message or in or as instant message or an SMS message prior to the start of the sporting event, game, match, activity, competition, or tournament, so as to remind the individual or user regarding the start of the same and to provide the individual or user with time to be able to watch and/or listen to same. The sporting event message can all contain all of the information contained in the betting confirmation message, including, but not limited to, a link to the respective electronic forum, chat room, or website. The sporting event message can be transmitted and/or retransmitted multiple times at pre-defined time intervals in advance of the sporting event, game, match, activity, competition, or tournament, to serve to remind the individual or user of the same.

The individual or user, prior to the start of a sporting event, game, match, activity, competition, or tournament, or at any time thereafter, can access the respective electronic forum, in which the individual or user can watch and/or listen to the sporting event, game, match, activity, competition, or tournament, with, and interact with other individuals or users, access the chat room in which the individual can watch and/or listen to the sporting event, game, match, activity, competition, or tournament, with, and interact with other individuals or users in the individual's or user's social networking group or in the individual's or user's group of friends, or access the website in which the individual or user can watch and/or listen to the sporting event, game, match, activity, competition, or tournament, by himself or herself.

The sporting event, game, match, activity, competition, or tournament, which is the subject of the bet, can be transmitted, broadcast, or "streamed", from or via a gaming facility computer and/or a content provider computer which can be located at the venue of the sporting event, game, match, activity, competition, or tournament, to the central processing computer or directly to the individual's or user's user communication device. In this regard, the sporting event, game, match, activity, competition, or tournament, which is the subject of the bet, can also be transmitted, broadcast, or "streamed", to the user communication device from either the central processing computer or directly from the gaming facility computer or the content provider computer located at the venue of the sporting event, game, match, activity, competition, or tournament.

The individual or user can use the user communication device to access the respective electronic forum, chat room, or website, in order to watch and/or listen to a live video or a streaming video broadcast and/or audio broadcast of the sporting event, game, match, activity, competition, or tournament, as well as to obtain any data and/or information and/or any analytics data and/or information regarding the respective teams and/or players involved in, or participating, in the sporting event, game, match, activity, competition, or tournament. The respective electronic forum, chat room, or website, can also provide a listing of all available bets and their respective odds, and/or a listing of private bets offered by any individuals or users who may be watching or listening to, or interested in betting on, the sporting event, game, match, activity, competition, or tournament, via the respective electronic forum, chat room, or website.

In instances where the electronic forum or chat room is being used, any and all comments posted by any of the individuals or users who may be participating in the same can also be displayed via the display of the user communication device. The individual or user can also post comments on the website in a comments section. The individual or user can also engage in video conference calls or video chats with other individuals or users via the respective electronic forum or chat room.

The individual or user can use the present invention to watch and/or listen to the sporting event, game, match, activity, competition, or tournament, in 360 degree video, virtual reality (VR), or augmented reality (AR). Other information described herein as being provided in and/or by the respective electronic forum, chat room, or website, can also be provided and viewed via 360 degree video, virtual reality (VR), or augmented reality (AR).

The respective electronic forum, chat room, or webpage of the website, via which the sporting event, game, match, activity, competition, or tournament, is being watches and/or listened to, can be specially designed to allow the individual or user, or any other individuals or users, to watch and/or listen to the sporting event, game, match, activity, competition, or tournament, and to communicate with other participants in and via the electronic forum or chat room. The respective electronic forum, chat room, or webpage of the website, via which the sporting event, game, match, activity, competition, or tournament, is being watched or listened to, can also be specially designed to, simultaneously with providing the sporting event, game, match, activity, competition, or tournament, allow the individual or user, or any other individuals or users, to post comments regarding the sporting event, game, match, activity, competition, or tournament, and/or to communicate with any other individuals or users watching or listening to the sporting event, game, match, activity, competition, or tournament, via the electronic forum or chat room, to communicate with the central processing computer, and/or to communicate with any of the sport governing body computers, the governmental entity computers, the gaming facility computers, the content provider computers, the information/analytics provider computers, the social network computers, the financial institution computers, the escrow agent computers, and/or the wearable devices.

The respective electronic forum, chat room, or webpage of the website, via which the sporting event, game, match, activity, competition, or tournament, is being watched or listened to can also be specially designed to, simultaneously with providing the sporting event, game, match, activity, competition, or tournament, allow the individual or user, or any other individuals or users, to receive and view data and/or information and/or analytics data and/or information regarding the sporting event, game, match, activity, competition, or tournament, and/or the teams, players, or other participants, participating in the same, to receive and view information obtained by any wearable devices worn by or used by any players or participants in the sporting event, game, match, activity, competition, or tournament, to receive and view any analytics data and/or information relating to any data and/or information obtained from any of the wearable devices during the sporting event, game, match, activity, competition, or tournament, to view information regarding bets being offered by various book makers or other gaming or gambling entities or individuals, and/or to view, via the respective electronic forum, chat room, or webpage of the website, any private bets being offered by other individuals or users participating in the electronic forum or chat room, and/or to view private bets being offered by other individuals or users who or which utilize the present invention.

At any time, the individual or user can place any bet while in, or via, the respective electronic forum, chat room, or webpage of the website, or via the central processing computer. In all instances when the individual or user places the bet, information regarding or pertaining to the bet can be transmitted from the user communication device and can be received and processed by the central processing computer.

Any individuals or users can post any private bets, on or regarding the sporting event, game, match, activity, competition, or tournament, which can be provided across all electronic forums, chat room, or webpages of websites, providing that sporting event, game, match, activity, competition, or tournament for other individuals or users to be informed about. Any individual or user can place a private bet and any individual or user can accept a private bet.

The respective electronic forum, chat room, or webpage of the website, via which the sporting event, game, match, activity, competition, or tournament, is watched or listened to, can also be specially designed to, simultaneously with providing the sporting event, game, match, activity, competition, or tournament, allow the individual or user, or any other individuals or users, to place a bet or any number of bets on the outcome of the sporting event, game, match, activity, competition, or tournament, at any time prior to the conclusion of the sporting event, game, match, activity, competition, or tournament, as well as to place a bet or any numbers of bets on any plays, calls, occurrences, or events, which can occur during the sporting event, game, match, activity, competition, or tournament (hereinafter referred to as "game events" or "match events"). Game events or match events can include, for example, but are not limited to, any single play, activity, event, happening, occurrence, action by a team, action by a player or participant, penalty call, type of penalty, infraction, type of infraction, violation, type of violation, scoring play, type of play, type of activity engaged in, a score at a particular time of the sporting event, game, match, activity, competition, or tournament (for example, the score at the end of a quarter or at a half-time, or at any other specified time in the sporting event, game, match, activity, competition, or tournament), and/or any other play, activity, and/or call made by a game or match official, a referee, or an umpire, which can be the subject of a bet. Any bets on game events or match event will be referred to herein as "game event bets" or "match event bets".

Private bets, which can be or which can include outcome bets or game event bets or match event bets, which are offered by the individual or user or by any other individuals or users can also be offered via the electronic forum, chat room, or the webpage of the website. Betting odds for any bets described herein, as well as continuous updates to betting odds for any of the bets described herein, can also be provided via the electronic forum, chat room, or the webpage of the website.

The individual or user or any other individuals or users watching or listening to the sporting event, game, match, activity, competition, or tournament, can place any number and types of bets, including outcome events and bets on game events or match events which can or may take place during the course of the sporting event, game, match, activity, competition, or tournament. Each time a bet is placed, the central processing computer can process and store information regarding the bet placed by the individual or user, the bet placed by any other individual or user, the sporting event, game, match, activity, competition, or tournament, on which the bet is placed, the sporting event, game, match, activity, competition, or tournament, during which the bet is placed, the amount of the bet, the time of the bet, the date of the bet, a counterparty to the bet, the sports betting account, gaming account, or gambling account, used in placing the bet or in connection with the bet, any information regarding whether or not the bet monies are instructed to be placed in escrow with the escrow agent computer, and/or any other information regarding the bet.

The individual or user, or any other individuals or users watching or listening to the sporting event, game, match, activity, competition, or tournament, on which the bet is placed, can request data and/or information and/or analytics data and/or information at any time before, during, or after, the sporting event, game, match, activity, competition, or tournament. Any data and/or information and/or analytics data and/or information requested, or any data and/or information and/or analytics data and/or information which is provided without request, can be transmitted from the information/analytics provider computer and/or from the central processing computer to the user communication device being used by the individual or user.

The individual or user or any other individuals or users watching or listening to the sporting event, game, match, activity, competition, or tournament, can also place any number of posts or comments in the electronic forum, chat room, or webpage of the website. The individual or user or any other individuals or users watching or listening to the sporting event, game, match, activity, competition, or tournament, can place any number of outcome bets or game event bets or match event bets. Each time a bet is placed by the individual or user or by any other individual or user, information regarding the same can be stored in his or her respective sports betting account, gaming account, or gambling account, and information regarding same can also be transmitted to, stored, and/or maintained, at the central processing computer, the financial institution computer, and/or the escrow agent computer.

The central processing computer can receive, process, store, and maintain, all data and/or information regarding any and all of the individual's or user's bets which are placed on the sporting event, game, match, activity, competition, or tournament, as well any of the individual's or user's bets placed on any other sporting events, games, matches, activities, competitions, or tournaments, along with any scheduled playing time(s) of the same. In instances when the individual or user has bet on, seeks to bet on, or simply wants to watch and/or listen to, another sporting event, game, match, activity, competition, or tournament, the user can request a link to the respective electronic forum, chat room, or website, on which to watch or listen to that other sporting event, game, match, activity, competition, or tournament.

At any and/or at all times during the sporting event, game, match, activity, competition, or tournament, the central processing computer can provide, via the respective electronic forum, chat room, or website, and for each bet placed by the individual or user, an indication as to whether the individual or user is winning the respective bet or losing the respective bet at that point in time, or at that point in the sporting event, game, match, activity, competition, or tournament. For example, information regarding a bet which is a winning bet at that point in time, or at that point in the sporting event, game, match, activity, competition, or tournament, can be provided or displayed in one color, such as, for example, green, while information regarding a bet which is losing bet at that point in time, or at that point in the sporting event, game, match, activity, competition, or tournament, can be provided or displayed in another color, such as, for example, red. In instances in which it cannot be determined whether a bet is a winning or a losing bet, that bet can be provided or displayed in a third and neutral color such as, for example yellow, white, or any other appropriate color.

The central processing computer can also provide, via the electronic forum, chat room, or webpage of the website, and during the sporting event, game, match, activity, competition, or tournament, information regarding any new available bets and/or any new or updated betting odds for bets corresponding to the sporting event, game, match, activity, competition, or tournament, as well as the availability of bets and/or betting odds for bets which can allow the individual or user to protect his or her betting position and/or to increase his or her potential winnings or minimize his or her potential losses. The central processing computer can also provide, via the electronic forum, chat room, or webpage of the website, and during the sporting event, game, match, activity, competition, or tournament, information regarding a gaming insurance product or any number of gaming insurance products, and/or a gaming derivative product, or any number of gaming derivative products, which the individual or user can purchase in order to minimize his or her losses. If the individual or user chooses to purchase any gaming insurance product(s) or gaming derivative product(s), the individual or user can do so at any allowable time, and information regarding the purchase of the same can be transmitted to, received at, and stored and maintained at, the central processing computer.

Any information regarding any bets placed by the individual or user can be displayed in an appropriate location or section of the electronic forum, chat room, or webpage of the website. Any information regarding any gaming insurance product(s) or gaming derivative product(s) can also be displayed in an appropriate location or section of the electronic forum, chat room, or webpage of the website.

The individual or user can also, at any allowable time, decide to sell his or her position in a bet, or purchase another individual's or user's position in a bet. In such instances, bets available for sale can be displayed at an appropriate location or section of the electronic forum, chat room, or webpage of the website.

The individual or user, as well any other individuals or users watching or listening to the sporting event, game, match, activity, competition, or tournament, can also report, suspected instances of game fixing, match fixing, cheating, play irregularities, officiating irregularities, or any other instances which may call into question the integrity of the match fixing by making postings or comments regarding same in the electronic forum, chat room, or webpage of the website. The postings or comments can be posted by the individual or user, or by any other individual or user who is watching or listening to the sporting event, game, match, activity, competition, or tournament in or via the respective electronic forum, chat room, or webpage of the website. The postings or comments can be posted in a section of the respective electronic forum, chat room, or webpage of the website, and can be viewed by all participants in the electronic forum, chat room, or webpage of the website in order to obtain as many comments reported suspected game fixing, match fixing, or cheating, as possible. Each posting or comment can be time stamped and can also be transmitted to, and submitted to, the central processing computer via the user communication device.

The central processing computer can receive all submitted postings and comments posted and received from all individuals or users who are watching the sporting event, game, match, activity, competition, or tournament, store the same in a file associated with the sporting event, game, match, activity, competition, or tournament, and automatically transmit the file and all postings and comments to the sport governing body computer of the sport governing body associated by, or which governs, the sporting event, game, match, activity, competition, or tournament, or the league, team, players, or participants, participating in the sporting event, game, match, activity, competition, or tournament. In this manner, the present invention can be utilized to record and report instances of suspected game fixing, match fixing, or cheating, activity, or any other issues pertaining to game integrity or match integrity, to the sport governing body computer of the respective sport. In this regard, the international federation, the International Olympic Committee, and national federations, and/or any national Olympic Committees, or any other sports governing body can be apprised of the suspected game fixing, match fixing, or cheating, activity, or any other game integrity or match integrity issue.

In this regard, the present invention can be utilized to obtain and report instances of suspected game fixing, match fixing, or cheating, as reported by the individuals or users who use the present invention to watch and/or listen to sporting events, games, matches, activities, competitions, or tournaments, on which they have placed bets.

The central processing computer can also automatically transmit information regarding suspected game fixing, match fixing, or cheating, activity, or any other game integrity or match integrity issue to the respective governmental entity computer for each government which may have an interest in receiving the same. In this regard, each government having an interest in receiving this information can be apprised of the suspected game fixing, match fixing, or cheating, activity, or any other game fixing or match fixing issue.

The individual or user, as well any other individuals or users watching and/or listening to the sporting event, game, match, activity, competition, or tournament, can also report any complaints regarding the placing of any bets, the payment or satisfaction regarding any bets, and/or any suspected betting fraud, and/or any other problems encountered using the apparatus of the present invention. Information regarding any complaints can be transmitted from the user communication device to the central processing computer.

As noted herein, in instances when the individual or user is utilizing a headset as or with the user communication device, any and/or all data or information inputs, postings, comments, information requests, placing of bets, or reports or reportings of any kind, can be input verbally via the microphone of the video and/or audio recording device(s) of the user communication device. The headset or the user communication device can be equipped with software to translate the verbal information into text and, in this regard, any voice inputs can be translated into text and displayed in the electronic forum, chat room, or webpage of the website. The headset, the user communication device, and the central processing computer can each be equipped with any needed software for translating verbal inputs into text and for translating text from one language into another language so that the text can be displayed in the electronic forum, chat room, or webpage of the website.

Any and all interactions between the individual or user with any other individuals or users which take place in or via the electronic forum, chat room, or webpage of the website, can be recorded and stored by and at the central processing computer in a file associated with the electronic forum, chat room, or webpage of the website, for the sporting event, game, match, activity, competition, or tournament.

Any sport governing body computer, any governmental entity computer, any gaming facility computer, and/or any escrow agent computer, can be used by an authorized operator of same to monitor any and/or all activity occurring or transpiring in or via one or more electronic forums, chat rooms, or web pages of any websites, associated with the viewing, watching, and/or listening to, the sporting event, game, match, activity, competition, or tournament.

Upon a completing of the sporting event, game, match, activity, competition, or tournament, the individual or user can request that the central processing computer process a bet outcome or result, such as, for example, whether the individual or user won the bet or lost the best, for each and every bet made by the individual or user regarding and/or during the sporting event, game, match, activity, competition, or tournament. The central processing computer can process each bet, one at a time, and, for each bet, the central processing computer can determine if the bet being processed is a winning bet or a losing bet. After determining whether the bet is a winning bet or a losing bet, the central processing computer can determine whether or not a hold has been placed on any payout for the bet.

If it should be determined that information regarding any suspected game fixing, match fixing, or cheating, activity, or any other issues pertaining to game integrity or match integrity, exists or has been reported to the central processing computer regarding the sporting event, game, match, activity, competition, or tournament, by or from any sport governing body computer, by or from any governmental entity computer, by or from any gaming facility computer, by or from any information/analytics provider computer, by or from any social network computer, by or from any financial institution computer, by or from any escrow agent computer, or by any user communication device, such as can be reported in any electronic forum, chat room, or web page of a website, as described herein, or by or through any other independent or other means, then the central processing computer can withhold any payment on a winning bet, and/or suspend or withhold any charge on any losing, until the matter is resolved. The central processing computer can also automatically process information for placing all bets regarding the sporting event, game, match, activity, competition, or tournament into escrow with the escrow agent computer until the matter is resolved.

If it is determined that no information regarding any suspected game fixing, match fixing, or cheating, activity, or any other issues pertaining to game integrity or match integrity, exists or has been reported to the central processing computer regarding the sporting event, game, match, activity, competition, or tournament, then the central processing computer can, in the event of a winning bet, effectuate payment for the winning bet to the sports betting account, gaming account, or gambling account, of the individual or user and, in the event of a losing bet, extract payment from the sports betting account, gaming account, or gambling account, of the individual or user. In an instance where the individual or user placed the bet monies into escrow with the escrow agent computer, the central processing computer can generate and transmit to the escrow agent computer a request for funds, along with an official certification that no suspected game fixing, match fixing, or cheating, activity, or any other issues pertaining to game integrity or match integrity, exists or has been reported for the sports betting account, gaming account, or gambling account, of the individual or user, and thereby allow the escrow agent computer to release the bet monies to the central processing computer or to a sports betting account, gaming account, or gambling account, of the individual or user who won the bet, if all other escrow agreement conditions have been satisfied.

The central processing computer can also effectuate payment of a gaming fee to the respective financial account associated with the respective sport governing body computer for each sport governing body which is due a gaming fee payment, effectuate a gaming fee payment to the respective financial account associated with the respective governmental entity computer for each governmental entity due a gaming fee payment, effectuate a gaming fee payment to the respective financial account associated with the respective gaming facility computer for each gaming facility due a gaming fee payment, effectuate a gaming fee payment to the respective financial account associated with the respective content provider computer for each content provider, if any, due a gaming fee payment, and/or effectuate a gaming fee payment to the respective financial account associated with the respective information/analytics provider computer for each information/analytics provider, if any, due a gaming fee payment. In this regard, any stakeholders in or of the sports betting system of the present invention can be paid any gaming fees due them for each bet placed using the present invention.

The central processing computer can repeat the above bet processing routine for all bets placed by the individual or user.

The central processing computer can also generate a final report regarding and including information regarding all of the bets placed on the sports betting account, gaming account, or gambling account, of the individual or user, including outcome bets, and any game event bets or match events, the outcomes of all such bets, the identities of all of the individuals or users who bet on the sporting event, game, match, activity, competition, or tournament, the identities of all individuals or users who watched and/or listened to the sporting event, game, match, activity, competition, or tournament, via any electronic forum, chat room, and web page of any website, and a record of all postings, comments, bets placed, and any and/or all activity which took place in the respective electronic forum(s), chat room(s), and web pages of any website, for or regarding the sporting event, game, match, activity, competition, or tournament.

The final report can also contain any comments or reports regarding any instances of any suspected game fixing, match fixing, or cheating, activity, or any other issues pertaining to game integrity or match integrity. The final report can be stored in the database of the central processing computer, can be transmitted to any party or entity requesting same, and/or can be transmitted to and stored at any sport governing body computer, any governmental entity computer, any gaming facility computer, any information/analytics provider computer, any social network computer, any financial institution computer, or any escrow agent computer, either upon request or automatically. Requests for automated transmissions of any and/or all such final reports can be previously transmitted to, and stored at, the central processing computer.

Any data and/or information obtained, recorded by, processed by, or stored in, any wearable device can also be automatically transmitted to the information/analytics computer for use in generating data and/or information and/or analytics data and/or information using the same. Once processed by the information/analytics computer, the data and/or information, generated from the data and/or information obtained by the wearable device, can be transmitted to and stored in the central processing computer, and/or to any user communication device(s) of the individual or user, to the user communication device(s) or any other individuals or users, to the electronic forum, to the chat room, or to website providing the web page, and/or to any sport governing body computer, to any governmental entity computer, to any gaming facility computer, to any information/analytics provider computer, to any social network computer, to any financial institution computer, or to any escrow agent computer, either automatically or upon request from the respective individual or entity.

The present invention and/or the central processing computer can also be specially programmed and/or specially configured to account for any time zone differences between the local time of the sporting event, game, match, activity, competition, or tournament, and the time zone where the individual or user and any other individuals or users who watch and/or listen to the sporting event, game, match, activity, competition, or tournament, via an electronic forum, chat room, or web page of a website, is/are located.

The present invention and/or the central processing computer can also be specially programmed and/or specially configured to delay any presentation of any information, comments, or postings, which are posted or presented to or in an electronic forum, chat room, or webpage of a website, in order to adjust for any time delays detected in any streaming video and/or audio of the sporting event, game, match, activity, competition, or tournament. In this manner, the present invention can delay any information, comments, or postings, until after a play or occurrence has been completed so as to adjust for any time delays in the video being streamed to the electronic forum, chat room, or webpage of a website and, therefore, prevent instances where a posting regarding the play or occurrence is displayed in the electronic forum, chat room, or webpage of a website, before the play is shown therein.

In another preferred embodiment, as well as any and/or all of the embodiments described herein, the central processing computer can be specially programmed by the individual or user to provide the individual or user with a notification message regarding an upcoming sporting event, game, match, activity, competition, or tournament, for which the individual or user desires to be notified.

An individual or user can place any of the bets described herein, including, but not limited to any of the herein-described outcome bets, game event bets, match event bets, private bets, or any other bets, while at a gaming facility or venue either by using his or her user communication device or by placing a bet or bets via the gaming facility computer, such as by using a kiosk or computer terminal of the gaming facility computer.

The present invention can also be utilized in order to provide for the selling and/or for the purchasing of a ticket, tickets, a ticket option, and/or ticket options for any of the herein-descried games, matches, competitions, or events. The present invention can be utilized by an individual or by a user to purchase a ticket, tickets, a ticket option, or ticket options, for any game, match, competition, or event, or for any games, matches, competitions, or events, on or regarding which he or she places a bet. The present invention can also be utilized by an individual or by a user to purchase a ticket, tickets, a ticket option, or ticket options, for any game, match, competition, or event, or for any games, matches, competitions, or events, using data and/or information, including, but not limited to, historical information, statistical information, analytics information, betting odds information, news information, or any other information, regarding any game, match, competition, or event, or any players, athletes, or participants, in same, which can be provided by and/or via the present invention, in order to place a bet or bets on any number of games, matches, competitions, or events.

The present invention also can also be utilized by an individual or by a user to purchase a ticket, tickets, a ticket option, or ticket options, for any game, match, competition, or event, whether or not he or she places a bet on any game, match, competition, or event.

In addition to including a central procession computer, and any number of user communication device(s), sport governing body computers, governmental entity computers, gaming facility computers, content provider computers, information/analytics provider computers, social network computers, financial institution computer(s), escrow agent computers, and/or the wearable devices, the apparatus of the present invention can also include any number of ticket seller computers. The ticket seller computer can be used by, and/or can be associated with, any ticket seller, such as, for example, a ticket broker, a ticket agent, a team, a league, a sports or gaming venue or facility, and/or any other third party (hereinafter referred to as "ticket seller") which or who desires to sell tickets or ticket options via the present invention.

The ticket seller computer can also include a central processing unit or CPU, a random access memory device(s) (RAM), a read only memory device(s) (ROM), a user input device, a display device, a transmitter, a receiver, a database, and an output device. If needed or desired, the ticket seller computer can also include a global positioning device and/or a video and/or audio recording device(s).

In addition to using the present invention as described herein, an individual or user can access the ticket seller computer in order to determine if tickets or ticket options are available for sale for a sporting event, game, match, activity, competition, or tournament, for which he or she desires to place a bet. Tickets or ticket options can be available for the entire sporting event, game, match, activity, competition, or tournament, or for a potion of the sporting event, game, match, activity, competition, or tournament.

An individual or user can also request that the ticket seller computer transmit updated ticket or ticket option data and/or information for or regarding the sporting event, game, match, activity, competition, or tournament, for which bets can be placed, to his or her user communication device, before the start of, during, or after, the selected sporting event, game, match, activity, competition, or tournament. The individual or user can also request to be notified regarding, and be provided with, ticket or ticket option data and/or information for any other sporting events, games, matches, activities, competitions, or tournaments, or any teams, players, or participants, involved in same, in which the individual or user may be interested.

At any time, an individual or user, using his or her user communication device, can access the ticket seller computer and can search for, and can access, ticket information for the selected sporting event, game, match, activity, competition, or tournament, on or regarding which the individual or user placed his or her bet. The individual or user can also access the ticket seller computer via the central processing computer, and can search for, and can access, ticket information for the selected sporting event, game, match, activity, competition, or tournament, on or regarding which the individual or user placed his or her bet. The individual or user can select to purchase one or more tickets, to the selected sporting event, game, match, activity, competition, or tournament, on or regarding which the individual or user placed his or her bet by transmitting a ticket purchase request from his or her user communication device to the ticket seller computer.

The individual or user can provide a payment identifier for making payment for the ticket purchase. Thereafter, the ticket seller computer can process payment for the ticket or tickets purchased, generate a ticket purchase confirmation message, and transmit the same to the user communication device. The ticket purchase confirmation message can contain, or can contain as an attachment, a copy or an electronic copy of each ticket purchased by the individual or user. Thereafter, the individual or user can either print out his ticket or tickets in hard copy form and/or can store same on his or her user communication device in electronic form.

At any time, an individual or user, using his or her user communication device, can also access the ticket seller computer and can search for, and can access, ticket option information for the selected sporting event, game, match, activity, competition, or tournament, on or regarding which the individual or user placed his or her bet. The individual or user can also access the ticket seller computer via the central processing computer, and can search for, and can access, ticket option information for the selected sporting event, game, match, activity, competition, or tournament, on or regarding which the individual or user placed his or her bet. The individual or user can select to purchase one or more tickets options, for the selected sporting event, game, match, activity, competition, or tournament, on or regarding which the individual or user placed his or her bet by transmitting a ticket option purchase request from his or her user communication device to the ticket seller computer.

The individual or user can provide a payment identifier for making payment for the ticket option purchase. Thereafter, the ticket seller computer can process payment for the ticket option or ticket options purchased, generate a ticket option purchase confirmation message, and transmit the same to the user communication device. The ticket option purchase confirmation message can contain, or can contain as an attachment, a copy or an electronic copy of each ticket option purchased by the individual or user. Thereafter, the individual or user can either print out his ticket option or ticket options in hard copy form and/or can store same on his or her user communication device in electronic form.

The individual or user can exercise a ticket option to purchase a ticket for the selected sporting event, game, match, activity, competition, or tournament, or to any portion of same, before the ticket option expires and/or before the conclusion or the completion of the selected sporting event, game, match, activity, competition, or tournament.

An individual or user can also program, or request, at the time of the placing of a bet on a sporting event, game, match, activity, competition, or tournament, or upon registering an account with the apparatus or the central processing computer, that the central processing computer generate and/or that the ticket seller computer generate a ticket availability message, containing information regarding tickets available for purchase for the sporting event, game, match, activity, competition, or tournament, or a ticket option availability message, containing information regarding tickets available for purchase for the sporting event, game, match, activity, competition, or tournament, and transmit same to any user communication device used by the individual or user prior to the start of the sporting event, game, match, activity, competition, or tournament, and/or prior to the completing or conclusion of the sporting event, game, match, activity, competition, or tournament. The ticket availability message or the ticket option availability message can contain a link to the ticket seller computer so that the individual or user can access the ticket seller computer and purchase a ticket, tickets, a ticket option, or ticket options.

An individual or user can also, at any time, purchase a ticket, tickets, a ticket option, or ticket options, for any sporting event, game, match, activity, competition, or tournament, on or regarding which the individual or user has placed a bet or desires to place a bet, or which can be brought to the individual's or user's attention via the electronic forum, chat room, or webpage of the website, or via the sporting event, game, match, activity, competition, or tournament being watched or listened to. The individual or user can also become aware of the sporting event, game, match, activity, competition, or tournament, through or as the result of his or her own actions or activities.

At any time, the individual or user can, using his or her user communication device, access the ticket seller computer via a link provided in or via the electronic forum, chat room, or webpage of the website, and/or via the central processing computer. The individual or user can thereafter search for the sporting event, game, match, activity, competition, or tournament, of interest, and can search for and access ticket information for or regarding the same. The individual or user can then select to purchase one or more tickets, to the selected sporting event, game, match, activity, competition, or tournament, by transmitting a ticket purchase request from his or her user communication device to the ticket seller computer. The individual or user can provide a payment identifier for making payment for the ticket purchase. Thereafter, the ticket seller computer can process payment for the ticket or tickets purchased, can generate a ticket purchase confirmation message, and can transmit same to the user communication device. The ticket purchase confirmation message, or information contained therein, can be provided to the individual or user via the electronic forum, chat room, or webpage of the website, and/or via any other appropriate means.

The ticket purchase confirmation message can contain, or can contain as an attachment, a copy or an electronic copy of each ticket purchased by the individual or user. Thereafter, the individual or user can either print out his ticket or tickets in hard copy form and/or can store same on his or her user communication device in electronic form.

At any time, an individual or user can also, using his or her user communication device, access the ticket seller computer and can thereafter search for and access ticket option information for or regarding the a sporting event, game, match, activity, competition, or tournament, in which the individual or user has an interest. The individual or user can thereafter select to purchase one or more ticket options for the selected sporting event, game, match, activity, competition, or tournament, by transmitting a ticket option purchase request from his or her user communication device to the ticket seller computer. The individual or user can also provide a payment identifier for making payment for the ticket option purchase. Thereafter, the ticket seller computer can process payment for the ticket option or ticket options purchased, can generate a ticket option purchase confirmation message, and can transmit the same to the user communication device. The ticket option purchase confirmation message, or information contained therein, can be provided to the individual or user via the electronic forum, chat room, or webpage of the website, and/or via any other appropriate means.

The ticket option purchase confirmation message can also contain, or can contain as an attachment, a copy or an electronic copy of each ticket option purchased by the individual or user. Thereafter, the individual or user can either print out his ticket option or ticket options in hard copy form and/or can store same on his or her user communication device in electronic form.

Any ticket, tickets, ticket option, or ticket options, can be resold by the individual or user at any time before the conclusion or the completion of the selected sporting event, game, match, activity, competition, or tournament, associated with the respective ticket or ticket option.

The central processing computer can also perform any and/or all of the processing routines described herein as being performed by, and can, therefore, also serve as, a ticket seller computer, so that individuals or users of the apparatus of the present invention can purchase a ticket, tickets, a ticket option, or ticket options, directly from the central processing computer.

The present invention can also be utilized in gaming or gambling activities involving bets placed on fantasy sports teams, leagues, events, or activities, and/or esports teams, leagues, events, or activities.

Each of the central processing computer(s), the user communication device(s), the sport governing body computer(s), the governmental entity computer(s), the gaming facility computer(s), the information/analytics provider computer(s), the social network computer(s), the financial institution computer(s), the escrow agent computer(s), and the wearable device(s), are specially programmed and/or specially configured to perform their respective functionalities.

The present invention provides and facilitates a global and international sports betting platform whereby individuals, users, or entities, can place bets on various sporting events, games, matches, activities, competitions, or tournaments, in a safe and secure manner and in a socially enjoyable environment. The present invention also provides and facilitates a global and international sports betting platform whereby governmental entities can regulate and oversee sports betting activities and whereby sports governing bodies can oversee sports betting activities in order to maintain the integrity of their sport.

DESCRIPTION OF THE PREFERRED EMBODIMENTS

Figure 1:
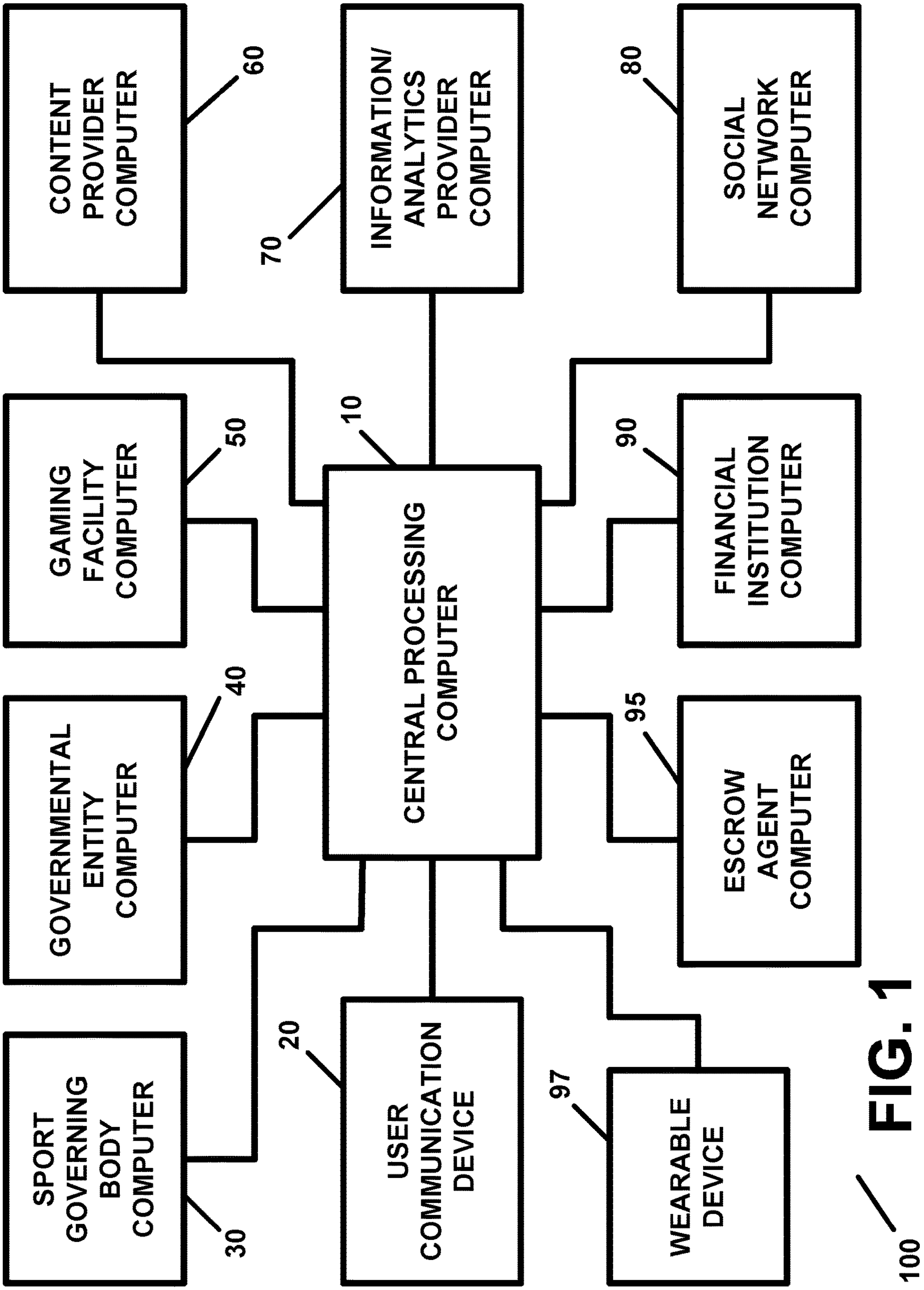
FIG. 1 illustrates a preferred embodiment of the apparatus of the present invention, in block diagram form.

The present invention pertains to an apparatus and methods for providing and/or for facilitating sports betting or wagering, and/or other gambling or gaming, activities, on, for, and relating to any types or kinds of sporting or athletic games, matches, events, contests, competitions, or tournaments, on, for, and relating to, any players or participants in or of the same, and/or on, for, and relating to, any plays, events, occurrences, or happenings (also referred to herein as “game events”, “match events” or “micro-events”), before, during, or after, the same before, during, or after, the same (hereinafter also referred to as “sports betting”), as well as for providing and/or facilitating the sale and/or purchase of a ticket, tickets, a ticket option, or ticket options, for any other game(s), match(es), competition(s), or event(s).

The present invention also pertains to an apparatus and methods for providing and/or for facilitating betting, gambling, or gaming, activities on and/or for fantasy sports and e-sports competitions and activities. The apparatus and methods of the present invention also provide and/or facilitate betting, gambling, or gaming, activities on and/or for any non-sports-related or non-athletic-related activity or event for which a bet or a wager can be placed between individuals, parties, or entities, who or which utilize the present invention. In this regard, while the apparatus and methods of the present invention can be utilized in a preferred embodiment for sports betting, they can also be utilized for any other betting, gambling, or gaming, activity which can the subject of a bet or wager between individuals, parties, or entities.

The present invention also pertains to an apparatus and methods for providing and/or for facilitating the sale and/or purchase of a ticket, tickets, a ticket option, or ticket options, for any game(s), match(es), competition(s), or event(s), described herein.

The apparatus and methods of the present invention also provide a platform and a network infrastructure by which sports betting of any nature, type, or kind, can be engaged in by any individuals, parties, or entities. The apparatus and methods of the present invention also provide a system whereby, sports governing bodies, such as the International Olympic Committee (hereinafter the “IOC”), national Olympic committees (“NOCs”), international sports federations (“IFs”), regional sports federations and/or confederations, national sports federations (“NFs”), sports conferences, sports leagues at any level (such as for example, professional, amateur, college or university, semi-professional, high school, grade school, and/or local clubs or organizations), teams in any of the foregoing leagues or clubs, and/or players in any of the foregoing leagues or clubs, governmental regulatory bodies, such as national, state, and/or local, governmental regulatory bodies, gamming or gambling facilities, such as venues where events take place, casinos or betting halls, on-line casinos or on-line betting halls, financial institutions, escrow agents, content providers, television broadcasters, streaming video and/or streaming audio providers, and social networks and social network providers, providers of analytics data and/or information, sports analytics information, news information, and/or any other information, along with the individual parties or entities who engage in sports betting or sports betting activities, can all come together to utilize the apparatus and methods of the present invention.

The present invention also pertains to, and provides, an apparatus and methods which can allow individuals, parties, and entities, who or which place bets or wagers on any of the herein-described games, matches, activities, or events, whether sports-related or non-sports-related, to watch and/or listen to a video and/or audio transmission of the same. Bets or wagers can also be placed during the respective game, match, activity, or event. These bets or wagers can be placed using the same communication device which is being used to watch and/or listen to the respective game, match, activity, or event.

The apparatus and methods of the present invention can allow individuals, parties, and entities, who or which place bets or wagers on any of the herein-described games, matches, activities, or events, whether sports-related or non-sports-related, to watch and/or listen to a video and/or audio transmission of the same in a group environment, a social networking environment, or in a chat room environment, and to place bets or wagers during the respective game, match, activity, or event, as well as to place bets or wagers on game events, match event, or micro-events, during the respective game, match, activity, or event.

The apparatus and methods of the present invention can also allow individuals, parties, and/or entities, to watch and/or listen to games, matches, activities, or events, in and/or using 360 degree video, virtual reality ("VR"), and/or augmented reality ("AR"), technologies while allowing the individuals, parties, and/or entities to also engage in placing bets or wagers via the respective 360 degree video, VR, or AR, user interface(s).

The apparatus and methods of the present invention can also allow individuals, parties, and/or entities, to engage in social networking activities while watching and/or listening to a game, match, activity, or event, and in discussing or engaging in sports betting and/or sports betting activities. Individuals, parties, and/or entities, can also place bets or wagers during any social networking activities or discussions.

The apparatus and methods of the present invention can also allow individuals, parties, and/or entities (also referred to as "users"), to engage in a chat room discussion prior to, after, or while watching and/or listening to, a sporting event or any other game, match, activity, or event, and can allow users to place bets on the same. The apparatus and methods of the present invention can also be utilized to allow users to place private bets with one another and/or in pools of individuals, parties, and/or entities.

The apparatus and methods of the present invention can also be utilized to provide users with sports analytics data and/or information, analytics information, news information, and/or statistical, probabilistic, or other, information, for use in engaging in sports betting activities.

The apparatus and methods of the present invention can also be utilized to allow users to engage in selecting or predicting next plays or other activities and/or game events, match events, or micro-events, during a sporting event or any game, match, activity, or event. Users can place bets on game events, match events, or micro-events, and/or users can engage in competitions to predict game events, match events, or micro-events, for betting or wagering purposes, for recreational purposes, such as to engage in competitions with other users, and/or for training purposes such as when an individual may desire to train to be a team coach or manager.

The apparatus and methods of the present invention can be utilized to provide any and/or all of the functionality described herein in order to provide a new and novel sports betting platform which can provide users with a safe, regulated, and dynamic, environment for engaging in sports betting and/or wagering activities of any kind or type.

Applicant hereby incorporates by reference herein the subject matter and teachings of U.S. Provisional Patent Application Ser. No. 62/713,004, filed Aug. 1, 2018, and entitled "SPORTS BETTING APPARATUS AND METHOD", the subject matter and teachings of which are hereby incorporated by reference herein in their entirety.

FIG. 1 illustrates a preferred embodiment of the apparatus of the present invention which is designated by reference numeral 100, in block diagram form. With reference to FIG. 1, the apparatus includes a central processing computer or server computer 10 (hereinafter "central processing computer 10"). The central processing computer 10 can include any number of central processing computers and/or computer systems. In this regard, the central processing computer 10 can be a single computer or server computer or can include a plurality of any number of computers, server computers, or computer systems. In this regard, in any and/or all of the embodiments described herein, the central processing computer 10 can be comprised of one computer or computer system and/or can be comprised of a plurality of computers or computer systems. Any number of central processing computers 10 can be utilized in the apparatus 100 of the present invention.

In the preferred embodiment, the central processing computer 10 is specially programmed and specially configured to provide a sports betting, gambling, or gaming, platform which can provide and/or which can perform all the functionalities described herein as being performed by the apparatus 100 and methods of the present invention. The central processing computer 10, in the preferred embodiment, is also specially programmed and/or specially configured to perform any of and/or all of the processing routines and/or functionalities described herein as being performed by the apparatus 100 of the present invention.

The central processing computer 10, in a preferred embodiment, can be associated with, and/or can used by, any sports betting provider, sports gaming provider, sports gaming facility, or sports gaming venue, and/or any betting provider, and/or any number of betting providers, sports betting providers, sports gaming providers, sports gaming facilities, or sports gaming venues. In a preferred embodiment, the central processing computer 10 can also be associated with, and/or can be used by, any sports betting provider or service of or associated with any sports governing body such as, for example, the International Olympic Committee, national Olympic committees, international sports federations, regional sports federations and/or confederations, national sports federations, sports conferences, or sports leagues, with any governmental entities, and/or with any gaming facilities, in providing sports betting. In the preferred embodiment, the central processing computer 10 will have a website or websites associated therewith as an interface for any of the users or other entities described herein as using or participating in using the apparatus 100 and methods of the present invention.

With reference to FIG. 1, the apparatus 100 also includes any number of user computers or user communication devices 20 (hereinafter "user communication device 20"). The user communication device 20 can be utilized by any user, individual, party, or entity, who or which uses the apparatus 100 of the present invention in order to communicate with the central processing computer(s) 10 described herein and/or to communicate with any of the other computers and communication devices described herein as being utilized in or with the apparatus 100.

In the preferred embodiment, the user communication device 20 can communicate with, and/or can be linked with, the central processing computer(s) 10 and/or any other computers or communication devices described herein, via a wired communication network, a wireless communication network, or via any combination of wired and/or wireless communication networks.

The user communication device 20 can be utilized by any of the herein-described users in order to interface with, and/or interact with, the central processing computer 10 or with any of the other computers and communication devices described herein as being used in or with the apparatus 100. In the preferred embodiment, the user communication device 20 can be a computer, a computer terminal, a terminal device connected to, or associated with, the central processing computer 10, a kiosk, a personal computer, a home computer, a personal communication device, a telephone, an interactive television, a smart phone, a cellular telephone, a wireless telephone, a videophone, a video telephone, a personal digital assistant, a watch, a smart watch, a 360 degree video headset or interface, a VR (virtual reality) headset or interface, an AR (augmented reality) headset or interface, a wearable communication device, glasses equipped with communications equipment, a beeper or a pager, or any other communication device or equipment. The user communication device 20 can also be a server computer, a network computer, or any other computer capable of being utilized in a network.

The user communication device 20 can also include and/or be utilized in conjunction with a network computer or any other computer which can be utilized to send and receive text messages and/or e-mail messages for or on behalf of a user. The network computer, in the preferred embodiment, can be any computer which can be used in a computer communication network to transmit and/or receive text messages or e-mail messages to and/or from any of the herein-described user communication devices 20 and/or can provide a text message or an e-mail message to the user communication device 20. In any and/or all of the embodiments described herein, the respective network computer or other computer can also automatically transmit or "push" a text message or an e-mail message or e-mail messages to a user communication device 20 as soon as same are received and/or in real-time.

In any and/or all of the embodiments described herein, the respective network computer or computer can also serve as a conventional text message server or as an e-mail server which can allow a user to request or "pull" a text message or an e-mail message or e-mail messages to a user communication device 20 when requested by the user or other authorized individual. In this regard, any network computer or other computer, such as one that can receive and send text messages or email messages to a user communication device 20 is also considered to be a user communication device 20 in and of itself. In this regard, text message server or an e-mail server can also be deemed to be a user communication device 20. In a preferred embodiment, each user communication device 20 can also have a website or websites associated therewith.

In the preferred embodiment, any number of user communication devices 20 can be utilized in, or in connection with, the apparatus 100. The user communication devices 20 described herein can be utilized to communicate with the central processing computer(s) 10 and/or with any other computers or communication devices described herein in a bi-directional manner.

With reference once again to FIG. 1, the apparatus also includes a sport governing body computer or computer system 30 (hereinafter "sport governing body computer 30") or any number of sport governing body computers 30 which can be used by, and/or which can be associated with, any sports governing body, such as, for example, but not limited to, the International Olympic Committee, a national Olympic committee, an international sports federation, a regional sports federation or confederation, a national sports federation, a sports conference, a sport league (such as, for example, the U.S. Professional leagues such as the National Football League (NFL), the National Basketball Association (NBA), Major League Baseball (MLB), the National Hockey League (NHL), Major League Soccer (MLS), or any other U.S. sports league or conference, or in Europe, for example, the Premier League, La Liga, or the UEFA Champions League, in soccer (also referred to as "football" outside the U.S.), or any sports governing body, league, or conference, of or on any level.

The respective sport governing body can utilize its respective sport governing body computer 30 to utilize the apparatus 100 and methods of the present invention for any purpose such as, for example, for monitoring and/or for providing oversight and/or for regulating sports betting activities or sports wager activities regarding games, matches, events, activities, competitions, or tournaments, in its sport, country or political subdivision, league, or conference. The sport governing body computer 30 can be utilized to allow the sport governing body, or an employee or agent of same, to communicate with and/or to interact with the central processing computer(s) 10, the user communication devices 20, and/or with any of the other computers and communication devices described herein as being used in or with the apparatus 100. In the preferred embodiment, the sport governing body computer 30 can communicate with, and/or be linked with, the central processing computer(s) 10 and/or any other computer or communication devices described herein, via a wired communication network, a wireless communication network, or via any combination of wired and/or wireless communication networks.

The sport governing body computer 30 can be utilized by any of the herein-described sport governing bodies in order to interface with, and/or interact with, the central processing computer 10 or with any other computers and communication devices described herein as being utilized in or with the apparatus 100. In a preferred embodiment, each sport governing body computer 30 can include any number of computers, server computers, or computer systems. In a preferred embodiment, each sport governing body computer 30 can also have a website or websites associated therewith.

With reference once again to FIG. 1, the apparatus also includes a governmental entity computer or computer system 40 (hereinafter "governmental entity computer 40") which can be used by, and/or which can be associated with, a governmental entity which can, for example, be a national government, federal government, regional government, state government, provincial government, state government, local government, municipal government, or any other government of any political or geographical subdivision. The governmental entity computer 40 can also be used by, and/or can be associated with, a gaming commission, a gaming administrator, or any other entity which can regulate, oversee, and/or administer, sports betting activities or sports wagering activities, or any other betting, wagering, gambling, or gaming activities, of any kind or type.

The governmental entity computer 40 can be utilized to allow the governmental entity, or an employee or agent of same, to communicate with and/or interact with the central processing computer(s) 10, the user communication devices 20, the sport governing body computer 30, and/or with any of the other computers and communication devices described herein as being utilized in or with the apparatus 100. In the preferred embodiment, the governmental entity computer 40 can communicate with, and/or can be linked with, the central processing computer(s) 10 and/or any other computer or communication devices described herein, via a wired communication network, a wireless communication network, or via any combination of wired and/or wireless communication networks.

The governmental entity computer 40 can be used by its respective governmental entity for any purpose such as, for example, for monitoring and/or for providing oversight and/or for regulating sports betting activities or sports wager activities regarding games, matches, events, or activities, within its jurisdiction.

The governmental entity computer 40 can be utilized by any of the herein-described governmental entities in order to interface with, and/or interact with, the central processing computer 10 or with any other computers and communication devices described herein as being used in or with the apparatus 100. In a preferred embodiment, each governmental entity computer 40 can include any number of computers, server computers, or computer systems. In a preferred embodiment, each governmental entity computer 40 can also have a website or websites associated therewith.

With reference once again to FIG. 1, the apparatus also includes a gaming facility or venue computer or computer system 50 (hereinafter "gaming facility computer 50") which can be used by, and/or which can be associated with, a gaming facility or venue such as, for example, a casino, a race track, or a betting establishment or a sport betting establishment, or a stadium, an arena, a gambling hall, a gaming outlet, a boat, a ship, a cruise ship, a commercial boat, a passenger boat, a ferry, a marine vehicle, a marine vessel, an aircraft, an airplane, a jet, a passenger aircraft, a shuttle aircraft, a commercial aircraft, a train, a subway train, a bus, and/or an automobile, a website, and/or any other entity or venue which can be the place, location, and/or venue, of a sporting event or an entity at which one may engage in sports betting activities or gambling or gaming activities of any type or kind.

The gaming facility computer 50 can be utilized to allow the gaming facility or venue, or an employee or agent of same, to communicate with and/or interact with the central processing computer(s) 10, the user communication devices 20, the sport governing body computer 30, the governmental computer 40, and/or with any of the other computers and communication devices described herein as being utilized in or with the apparatus 100. In the preferred embodiment, the gaming facility computer 50 can communicate with, and/or can be linked with, the central processing computer(s) 10 and/or any other computer or communication devices described herein, via a wired communication network, a wireless communication network, or via any combination of wired and/or wireless communication networks.

The gaming facility computer 50 can be used by its respective gaming facility or venue for any purpose such as, for example, for monitoring and/or for providing oversight and/or for regulating sports betting activities or sports wager activities regarding games, matches, events, or activities, within its facility or venue.

The gaming facility computer 50 can be utilized by any of the herein-described gaming facilities or venues in order to interface with, and/or interact with, the central processing computer 10 or with any other computers and communication devices described herein as being used in or with the apparatus 100. In a preferred embodiment, each gaming facility computer 50 can include any number of computers, server computers, or computer systems. In a preferred embodiment, each gaming facility computer 50 can also have a website or websites associated therewith.

The gaming facility computer 50 can also include a kiosk, or any number of kiosks, or a computer terminal or any number of computer terminals, or any other interface(s), for allowing an individual attending the gaming facility or venue, such as to attend a sporting event, game, or match, to access the central processing computer in order to place a bet or a wager on the same or to place a bet or wager on any other sporting event, game, or match. In this regard, an individual can use the gaming facility computer 50 to place a bet or wager on a sporting event taking place at the gaming facility or venue while the individual is at or in the facility or venue and without using his or her user communication device 20.

With reference once again to FIG. 1, the apparatus also includes a content provider computer or computer system 60 (hereinafter "content provider computer 60") which can be used by, and/or which can be associated with a television broadcasting network or station, a radio broadcasting network or station, an Internet streaming video and/or audio provider, or any other content provider. The content provider computer 60 can be utilized to allow the content provider to broadcast or transmit, whichever the case may be, its respective content to any users of the apparatus 100 as well as to communicate with and/or interact with the central processing computer(s) 10, the user communication devices 20, the sport governing body computer 30, the governmental entity computer 40, the gaming facility computer 50, and/or with any of the other computers and communication devices described herein as being utilized in or with the apparatus 100. In the preferred embodiment, the content provider computer 60 can communicate with, and/or can be linked with, the central processing computer(s) 10, any of the user communication devices 20, and/or any other computers or communication devices described herein.

In the preferred embodiment, the content provider computer 60 can communicate with, and/or can be linked with, the central processing computer(s) 10, any of the user communication devices 20, and/or any other computers or communication devices described herein, via a wired communication network, a wireless communication network, or via any combination of wired and/or wireless communication networks. In a preferred embodiment, the content provider computer 60 can transmit content, such as television broadcasts or Internet streaming broadcasts of video or audio of sporting events directly to a user communication device 20 or to the central processing computer 10 for re-transmission to a user communication device 20. In a preferred embodiment, the content provider computer 60 can also transmit content, such as television broadcasts or Internet streaming broadcasts of video and/or audio of sporting events, in or as 360 degree videos, immersive videos, spherical videos, in virtual reality, or in augmented reality, directly to a user communication device 20 or to the central processing computer 10 for re-transmission to a user communication device 20. In this regard, in a preferred embodiment, the content provider computer 60 and the central processing computer 10 are also specially programmed and specially configured to transmit sporting events in or as 360 degree video, immersive video, or spherical video, in virtual reality (VR), and/or in augmented reality (AR).

In a preferred embodiment, each content provider computer 60 can include any number of computers, server computers, or computer systems. In a preferred embodiment, each content provider computer 60 can also have a website or websites associated therewith.

With reference once again to FIG. 1, the apparatus also includes an information/analytics provider computer or computer system 70 (hereinafter "information/analytics provider computer 70") which can be used by, and/or which can be associated with an information provider, such as for example, a news service, a news website, a website associated with a newspaper or other periodical, an analytics company, a sports analytics company, an analytics provider, an analytics service, and/or any other provider of any data and/or information which can be utilized by users of the apparatus 100 in engaging is sports betting activities or sports wagering activities, of any kind or type.

The information/analytics provider computer 70 can be utilized to provide information, news, analytics information, sports analytics data and/or information, or any other statistical, historical, predictive, or forecasting, data and/or information, to any users of the apparatus 100 of the present invention. The information/analytics provider computer 70 can be utilized by the respective information/analytics provider associated with the same in order to communicate with and/or to interact with the central processing computer(s) 10, the user communication devices 20, the sport governing body computer 30, the governmental entity computer 40, the gaming facility computer 50, the content provider computer 60, and/or any of the other computers and communication devices described herein as being utilized in or with the apparatus 100. In the preferred embodiment, the information/analytics provider computer 70 can communicate with, and/or can be linked with, the central processing computer(s) 10, any of the user communication devices 20, and/or any other computers or communication devices described herein.

In the preferred embodiment, the information/analytics provider computer 70 can communicate with, and/or can be linked with, the central processing computer(s) 10, any of the user communication devices 20, and/or any other computers or communication devices described herein, via a wired communication network, a wireless communication network, or via any combination of wired and/or wireless communication networks. In a preferred embodiment, the information/analytics provider computer 70 can transmit information, news, analytics information, sports analytics data and/or information, or any other statistical, historical, predictive, or forecasting, data and/or information, directly to a user communication device 20 or to the central processing computer 10 for re-transmission to a user communication device 20.

In a preferred embodiment, each information/analytics provider computer 70 can include any number of computers, server computers, or computer systems. In a preferred embodiment, each information/analytics provider computer 70 can also have a website or websites associated therewith.

With reference once again to FIG. 1, the apparatus also includes a social network computer or computer system 80 (hereinafter "social network computer 80") which can be used by any social networking company or any social networking provider to provide social networks, social networking services, and/or social networking forums, to and/or for any of the users of the apparatus 100 of the present invention.

The social network computer 80 can be utilized by the social networking company or a social networking provider associated with the same in order to communicate with and/or to interact with the central processing computer(s) 10, the user communication devices 20, the sport governing body computer 30, the governmental entity computer 40, the gaming facility computer 50, the content provider computer 60, the information/analytics provider computer 70, and/or any of the other computers and communication devices described herein as being utilized in or with the apparatus 100. In the preferred embodiment, the social network computer 80 can communicate with, and/or can be linked with, the central processing computer(s) 10, any of the user communication devices 20, and/or any other computers or communication devices described herein.

In the preferred embodiment, the social network computer 80 can communicate with, and/or be linked with, the central processing computer(s) 10, any of the user communication devices 20, and/or any other computers or communication devices described herein, via a wired communication network, a wireless communication network, or via any combination of wired and/or wireless communication networks. In a preferred embodiment, the social network computer 80 can transmit information directly to a user communication device 20 or to the central processing computer 10 for re-transmission to a user communication device 20.

In a preferred embodiment, each social network computer 80 can include any number of computers, server computers, or computer systems. In a preferred embodiment, each social network computer 80 can also have a website or websites associated therewith.

With reference once again to FIG. 1, the apparatus 100 also includes a financial institution/intermediary computer or computer system 90 (hereinafter "financial institution computer 90") which can be used by, and/or which can be associated with a bank, a credit card company or service, a debit card company or service, a charge card company or service, an electronic money account service, or any other financial institution which can administer and/or service financial accounts and/or any of the sports betting accounts, gaming accounts, or gambling accounts, for any of the herein-described individuals, users, entities, sports governing bodies, governmental entities, gaming facilities or venues, content providers, information/analytics providers, social networking companies or social networking providers, and/or escrow agent service providers, who or which use the apparatus 100 of the present invention.

The financial institution computer 90, in a preferred embodiment, can communicate with and/or can interact with the central processing computer(s) 10, the user communication devices 20, the sport governing body computer 30, the governmental entity computer 40, the gaming facility computer 50, the content provider computer 60, the information/analytics provider computer 70, the social network computer 80, and/or with any of the other computers and communication devices described herein as being utilized in or with the apparatus 100. In the preferred embodiment, the financial institution computer 90 can communicate with, and/or be linked with, the central processing computer(s) 10, any of the user communication devices 20, and/or any other computers or communication devices described herein.

In the preferred embodiment, the financial institution computer 90 can communicate with, and/or be linked with, the central processing computer(s) 10, any of the user communication devices 20, and/or any other computers or communication devices described herein, via a wired communication network, a wireless communication network, or any combination of wired and/or wireless communication networks.

In a preferred embodiment, each financial institution computer 90 can include any number of computers, server computers, or computer systems. In a preferred embodiment, each financial institution computer 90 can also have a website or websites associated therewith.

With reference once again to FIG. 1, the apparatus 100 can also include an escrow agent computer or computer system 95 (hereinafter referred to as "escrow agent computer 95") which can be used by, and/or associated with, an escrow agent or an escrow facility for holding bets or wagers and/or any other monies or objects which can be the subject of the bet or wager, for any user of the apparatus 100. In the preferred embodiment, the escrow agent or escrow facility is a neutral administrator who or which can act as the escrow agent for a party or parties to a bet or wager and/or who or which can be the officiating party or entity over a bet or wager when and/or if such a service or services are or may be needed and/or desired.

The escrow agent computer 95, in a preferred embodiment, can communicate with and/or interact with the central processing computer(s) 10, the user communication devices 20, the sport governing body computer 30, the governmental entity computer 40, the gaming facility computer 50, the content provider computer 60, the information/analytics provider computer 70, the social network computer 80, the financial institution computer 90, and/or any of the other computers and communication devices described herein as being utilized in or with the apparatus 100. In the preferred embodiment, the escrow agent computer 95 can communicate with, and/or can be linked with, the central processing computer(s) 10, any of the user communication devices 20, and/or any other computers or communication devices described herein.

In the preferred embodiment, the escrow agent computer 95 can communicate with, and/or be linked with, the central processing computer(s) 10, any of the user communication devices 20, and/or any other computers or communication devices described herein, via a wired communication network, a wireless communication network, or any combination of wired and/or wireless communication networks.

In a preferred embodiment, each escrow agent computer 95 can include any number of computers, server computers, or computer systems. In a preferred embodiment, each escrow agent computer 95 can also have a website or websites associated therewith.

With reference once again to FIG. 1, the apparatus 100 can also include a wearable device 97 which can be worn by, or attached to the clothing or uniform of, an athlete or player during a respective game, match, or competition. In the preferred embodiment, the wearable device 97 can be any one the many wearable devices which are equipped for, or utilized for, measuring and transmitting biological data and/or information, physiological data and/or information, pulse rate, heart rate, blood pressure, blood-sugar level or blood-glucose level data and/or information, and/or any other data and/or information. The wearable device 97 can also be equipped for, or utilized for, measuring steps taken, distance traveled, speed of travel, and/or any other data and/or information for monitoring an athlete's or a player's movements and/or performance during a game, match, or competition. Any number of wearable devices 97 can be utilized with or in conjunction with the apparatus 100.

The wearable device 97, in a preferred embodiment, can communicate with and/or can interact with the central processing computer(s) 10, the user communication devices 20, the sport governing body computer 30, the governmental entity computer 40, the gaming facility computer 50, the content provider computer 60, the information/analytics provider computer 70, the social network computer 80, the financial institution computer 90, and/or any of the other computers and communication devices described herein as being utilized in or with the apparatus 100. In the preferred embodiment, the wearable device 97 can communicate with, and/or can be linked with, the central processing computer(s) 10, any of the user communication devices 20, and/or any other computers or communication devices described herein.

In the preferred embodiment, the wearable device 97 can communicate with, and/or be linked with, the central processing computer(s) 10, any of the user communication devices 20, and/or any other computers or communication devices described herein, via a wired communication network, a wireless communication network, or any combination of wired and/or wireless communication networks.

In a preferred embodiment, any number of central processing computers 10, user communication devices 20, sport governing body computers 30, governmental entity computers 40, gaming facility computers 50, content provider computers 60, information/analytics provider computers 70, social network computers 80, financial institution computers 90, escrow agent computers 95, and wearable devices 97, can be utilized in, and/or in connection with or in association with, the apparatus 100 of the present invention.

In a preferred embodiment, any of the central processing computers 10, the user communication devices 20, the sport governing body computers 30, the governmental entity computers 40, the gaming facility computers 50, the content provider computers 60, the information/analytics provider computers 70, the social network computers 80, the financial institution computers 90, the escrow agent computers 95, and/or wearable devices 97, can communicate with any other central processing computer(s) 10, user communication device(s) 20, sport governing body computer(s) 30, governmental entity computer(s) 40, gaming facility computer(s) 50, content provider computer(s) 60, information/analytics provider computer(s) 70, social network computer(s) 80, financial institution computer(s) 90, escrow agent computer(s) 95, and/or wearable device(s) 97, in a bi-directional manner. In this regard, any computer or communication device described herein can communicate, in a bi-directional manner, with any other computer or communication device regardless of whether the respective computer or communication device is a central processing computer 10, a user communication device 20, a sport governing body computer 30, a governmental entity computer 40, a gaming facility computer 50, a content provider computer 60, an information/analytics provider computer 70, a social network computer 80, a financial institution computer 90, an escrow agent computer 95, and/or a wearable device 97.

In the preferred embodiment, the apparatus 100 and methods of the present invention is utilized on, over, or via, the Internet and/or the World Wide Web. In the preferred embodiment, the apparatus 100 and methods of the present invention can also be utilized over any suitable communication network and/or any combination of computer networks, including, but not limited to the Internet, the World Wide Web, a telecommunication network or system, a telephone network or system, a cable television communication network or system, a satellite television communication network or system, a digital television network or system, a satellite communication network or system, a broadband communication network or system, a radio frequency communication network or system, an optical communication network or system, a line-connected network or system, a wireless network or system, a radio communication network or system, a digital communication network or system, a personal communications services (PCS) network or system, a local area network (LAN), a wide area network (WAN), a wireless Internet network or system, a wireless World Wide Web network or system, an optical communication network or system, a broadband communication network or system, a Bluetooth communication network or system, a streaming video and communication network or system, a streaming audio communication network or system, a live video communication network or system, and/or any other suitable communications network or system, and/or any combination(s) thereof.

Figure 2:
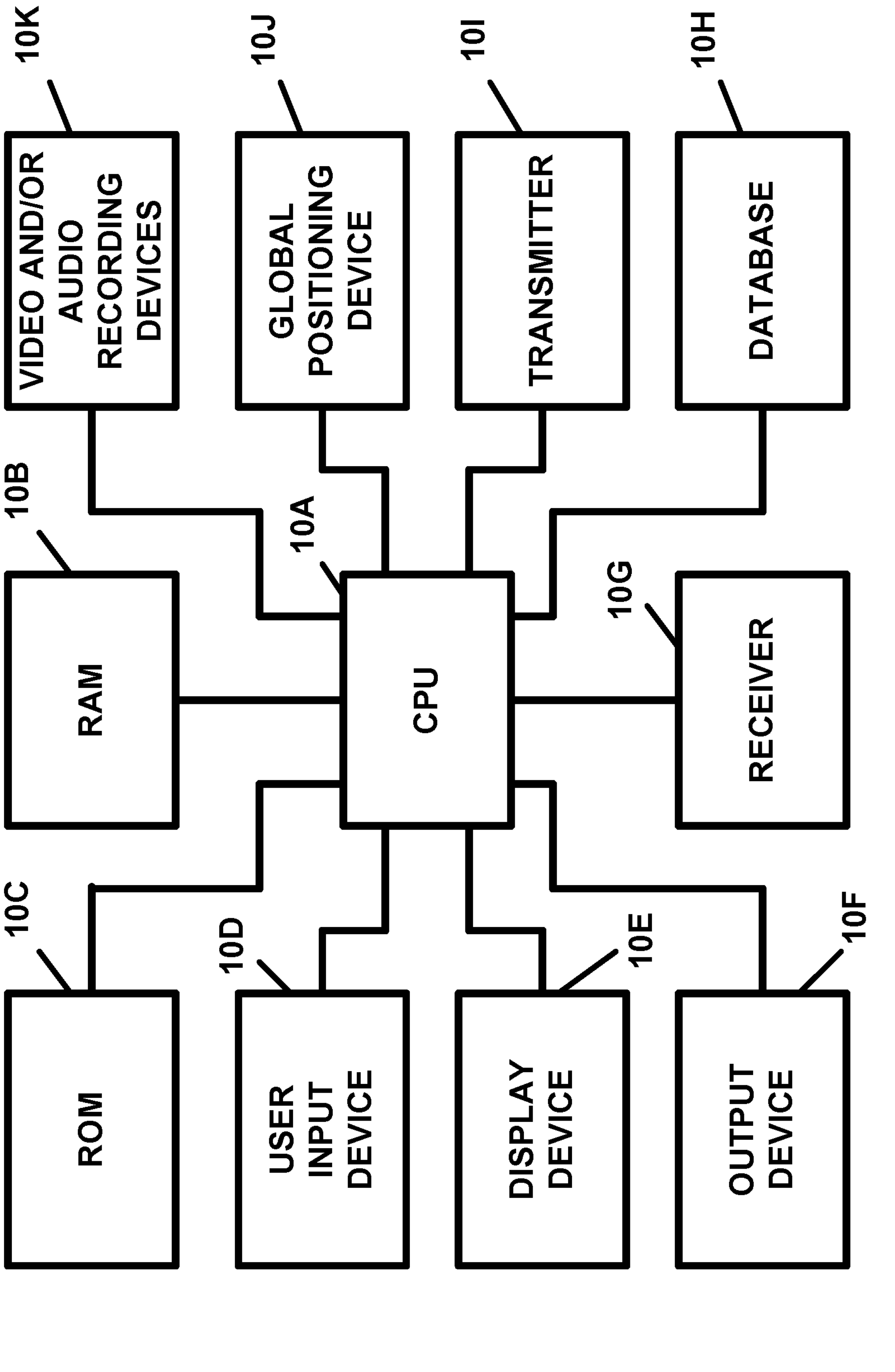
FIG. 2 illustrates the central processing computer of FIG. 1, in block diagram form.

FIG. 2 illustrates the central processing computer 10 of FIG. 1, in block diagram form. With reference to FIG. 2, the central processing computer 10 includes a central processing unit (CPU) 10A. The central processing unit (CPU) 10A may be a microprocessor, a microcomputer, a minicomputer, a macro-computer, or a mainframe computer, depending upon the application. The CPU 10A is specially programmed and/or specially configured to perform all of the functionality described herein as being performed by the central processing computer 10.

The central processing computer 10 also includes a random access memory (RAM) device(s) 10B and a read only memory (ROM) device(s) 10C which are connected to the CPU 10A. The central processing computer 10 also includes a user input device(s) 10D which can be or can include any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, instructions, or commands, to be entered into the central processing computer 10. The input device(s) 10D is also connected to the CPU 10A. In a preferred embodiment, data, information, instructions, or commands, can also be input using voice a microphone as an input device and recognition software.

The central processing computer 10 also includes a display device 10E, such as a display monitor and/or a display screen, for providing the herein-described data and/or information to the operator or user of the central processing computer 10. The display device 10E is also connected to the CPU 10A.

The central processing computer 10 can also include an output device 10F, such as a printer, a display device, and/or a modem, for outputting, in either or both of hard copy form or electronic form, any of the data and/or information which is described herein as being provided by, from, or at, the central processing computer 10. The output device 10F can also be connected to the CPU 10A.

The central processing computer 10 can also include a receiver 10G for receiving data and/or information, including any of the herein-described data and/or information, and/or any of the other data and/or information described herein as being provided to the central processing computer 10 from any of the user communication devices 20, from any of the sport governing body computers 30, from any of the governmental entity computers 40, from any of the gaming facility computers 50, from any of the content provider computers 60, from any of the information/analytics provider computers 70, from any of the social network computers 80, from any of the financial institution computers 90, from any of the escrow agent computers 95, from any of the wearable devices 97, or from any of the other central processing computers 10.

The central processing computer 10 can also include a database(s) 10H, which can contain any data and/or information, and/or software programs or software applications, which may be required, and/or which may be desired, for performing any of the functionality and/or processing routines described herein as being performed by the central processing computer 10 and/or the apparatus 100.

In a preferred embodiment, the database 10H can contain data and/or information regarding each individual, party, entity, or user, who or which uses the apparatus 100 of the present invention to engage in sports betting or in any other sports betting, gambling, gaming, betting, or wagering, activities. The database 10H can also contain data and/or information for each sports governing body, league, team, and player of any team or club, for each governmental entity, for each gaming facility or venue, for each content provider, for each information/analytics provider, for each social network, for each financial institution, and for each escrow agent, and for each team, club, or player, which or who participates in games, matches, or competitions, which can be the subject of a bet or on which bets can be placed.

For each individual, party, entity, or user, the database 10H can contain any and/or all data and/or information regarding the sports betting, or other betting, history and/or betting patterns. For each sports betting account, gaming account, or gambling account, serviced by the apparatus 100 of the present invention, the database 10H can contain data and/or information for each bet placed on the respective account, the data and time of the bet, the sporting event, game, match, activity, competition, or tournament, which was the subject of the bet, the position taken by the bet or the bet made, the amount of the bet, whether or not the bet was placed in escrow, whether suspected game fixing, match fixing, or cheating, activity was noted for the sporting event, game, match, activity, competition, or tournament, the outcome of the sporting event, game, match, activity, competition, or tournament, whether the bet was a winning bet or a losing bet, a link to a recording of the respective electronic forum, chat room, or webpage, activity for the respective electronic forum, chat room, or webpage, via which the sporting event, game, match, activity, competition, or tournament, was watched or listened to, and/or any other data and/or information pertaining to each bet placed on the respective sporting event, game, match, activity, competition, or tournament. A video and/or audio recording of the placement of, or the making of, the bet can also be stored in the database 10H for each bet for which such a recording was made.

For each individual, party, entity, or user, and for each sports governing body, league, team, and player of the team, for each governmental entity, for each gaming facility or venue, for each content provider, for each information/analytics provider, for each social network, for each financial institution, and for each escrow agent, the database 10H can contain data and/or information regarding he, she, or its, name, address, telephone number, cellular telephone number, text messaging number, mail address, website (if applicable), financial account information, sports betting account information, gaming account information, gambling account information, bank account number, credit account number, credit card account number, debit account number, debit card account number, charge account number, charge card account number, electronic money account number, payment service provider (for example, PayPal® or other payment system), information regarding any limitation(s) or restrictions on an individual's, party's, entity's, or user's, sports betting account, gaming account, gambling account, sports betting. gaming account, or gambling account, betting limits for an individual's, party's, entity's, or user's, any restrictions or limitations placed on a use of the sports betting account, gaming account, gambling account, respective account, sports, leagues, teams, clubs, or players, or games, matches, or events for which an individual, party, entity, or user, has expressed an interested in placing sports bets or wagers, information regarding an individual's, party's, entity's, or user's, sports betting history, sports wagering history, or gambling or gaming history, information regarding an individual's, party's, entity's, or user's, request to receive alerts regarding sporting events for which the individual, party, entity, or user, may be interested in pacing a bet or wager, information regarding an individual's, party's, entity's, or user's, request to receive alerts regarding betting odds, changes in betting odds, and/or analytics information, regarding sporting events for which the individual, party, entity, or user, may be interested in pacing a bet or wager, sports, games, matches, events, or activities in which the individual, party, entity, or user, is interested in placing a sports bet or wager or any bet or wager, games or games of chance which can be played via the apparatus 100 of the present invention, sporting events, games, matches, activities, competitions, or tournaments, and/or or any other gaming activities or games of chance, for which bets can be placed or which can be the subject of sport betting activities, schedules of sporting events, games, matches, activities, competitions, or tournaments, results of, sporting events, games, matches, activities, competitions, or tournaments, analytical information, historical information, statistical information, and/or forecasting information, and information regarding results regarding, sporting events, games, matches, activities, competitions, or tournaments, and/or any other data and/or information described herein and/or otherwise which is needed and/or desired in order to perform any and/or all of the processing routines and/or functionality described herein as being performed by and/or provided by the apparatus 100 and methods of the present invention and/or by the central processing computer 10, and/or by any of the user communication devices 20, sport governing body computers 30, governmental entity computers 40, gaming facility computers 50, content provider computers 60, information/analytics provider computers 70, social network computers 80, financial institution computers 90, escrow agent computers 95, and/or wearable devices 97, described herein.

The database 10H can also contain any needed software for providing electronic forums, chat rooms, video conference calls, Skype™ or other video conference calls, and telephone conference calls, which can be monitored and recorded, and the database 10H can store recorded electronic forum sessions, chat room sessions, video conference calls, Skype™ or other video conference calls, and/or telephone conference calls, involving any individuals, parties, entities, or users, and/or any individuals representing any of the users or operators of any of the herein-described sport governing body computers 30, the governmental entity computers 40, the gaming facility computers 50, the content provider computers 60, the information/analytics provider computers 70, the social network computers 80, the financial institution computers 90, and/or the escrow agent computers 95.

The database 10H can also contain data and/or information regarding schedules, and/or television broadcast schedules, or streaming video and/or audio transmission schedules, if applicable and/or available, for all games, matches, events, competitions, tournaments, or activities, for all sports, leagues, teams, players, or athletes, for which sports betting activity can occur via the apparatus 100, and/or any other sport betting, gaming, or gambling, activities which can be performed with or via the apparatus 100 of the present invention.

The database 10H can also contain software programs or software applications needed for providing 360 degree videos, immersive videos, and/or spherical videos, of sporting events, games, matches, activities, competitions, or tournaments, and/or for sporting events, games, matches, activities, competitions, or tournaments, in virtual reality (VR), and for providing data and/or information along with sporting events, games, matches, activities, competitions, or tournaments, in augmented reality (AR).

The database 10H also contains any data and/or information regarding each sports governing body or league which uses the apparatus 100 including, but not limited to, data and/or information regarding the body, its bylaws, its teams, and any and/or all players or athletes on each team, and/or analytics or statistical data and/or information for or regarding each body, its teams, and the players or athletes on each team, and/or sports betting fees or gambling fees charged by the sports governing body or league, and/or any other data and/or information which can be used in connection with the apparatus 100 of the present invention.

The database 10H also contains any data and/or information regarding each governmental entity which uses the apparatus 100 including, but not limited to, information regarding the name of the governmental entity and its betting, wagering, and gambling, laws, rules, and/or regulations, fees charged by the governmental entity, and/or any other data and/or information which can be used in connection with the apparatus 100 of the present invention.

The database 10H also contains any data and/or information regarding each gaming facility or venue which uses the apparatus 100 including, but not limited to, information regarding the name of the gaming facility or venue, and any betting, wagering, and gambling, laws, rules, and/or regulations, of or relating to the gaming facility or venue, and/or fees charged by the gaming facility or venue, and/or any other data and/or information which can be used in connection with the apparatus 100 of the present invention.

The database 10H also contains any data and/or information regarding each content provider which uses the apparatus 100 including, but not limited to, information regarding the games, matches, events, activities, and/or players or athletes, broadcasted by, or streamed by, the provider, schedules of television broadcasts and streaming video and/or audio transmissions or broadcasts, fees charged by the content provider, if applicable, and/or any other data and/or information which can be used in connection with the apparatus 100 of the present invention.

The database 10H also contains any data and/or information regarding each information provider or analytics provider which uses the apparatus 100 including, but not limited to, the type or kind of data and/or information it provides, the price for same, subscriptions available and the prices for same, other fees charged by the data and/or information provider or analytics provider, if applicable, and/or any other data and/or information which can be used in connection with the apparatus 100 of the present invention.

The database 10H also contains any data and/or information regarding each social network which uses the apparatus 100 including, but not limited to, the website for same, the names and profile pages for each member of the social network as well for each individual, user, party, or entity, who or which used the apparatus 100, and/or any other data and/or information which can be used in connection with the apparatus 100 of the present invention.

The database 10H also contains any data and/or information regarding each financial institution which uses the apparatus 100 including, but not limited to, the type or kind of accounts they provide, the types or kinds of financial services they provide, and any fees charged by the financial institution, if applicable, and/or any other data and/or information which can be used in connection with the apparatus 100 of the present invention.

The database 10H also contains any data and/or information regarding each escrow agent which or who uses the apparatus 100 including, but not limited to, the type or kind of escrow services it/he/she provides, and any fees charged by the escrow agent, if applicable, and/or any other data and/or information which can be used in connection with the apparatus 100 of the present invention.

The database 10H also contains data and/or information regarding each wearable device 97 used in connection with the apparatus 100 including, but not limited to, the make and model of the wearable device, the player or athlete who uses the same, and any data and/or information recorded by the wearable device 97 for each sporting event, game, match, activity, competition, or tournament, in which it is used.

The apparatus 100 of the present invention can also provide a social network for all of its members which can include all individual, parties, entities, and users, and all sports governing bodies, leagues, teams, and players of the teams, governmental entities, gaming facilities or venues, content providers, information/analytics providers, social networks, financial institutions, and escrow agents, and their respective employees and agents. For each member, the database 10H can store the respective member's profile information, profile pages, posts, comments, posted picture or video clips, and/or any other information typically found on a social network. In a preferred embodiment, posts and comments can be shared to or on any social networks which use the apparatus 100 as well as shared to or on any social networks which may not use the apparatus.

The database 10H can also store any data and/or information, and/or software programs or software applications, needed or required for allowing the central processing computer 10 to accept bets or wagers, process game, match, event, or activity results, determine if a bet or wager is a winning bet or wager or a losing bet or wager, effectuate payment to a winning party, and exact payment from a losing party.

The database 10H can also contain any data and/or information, and/or software programs or software applications, which is known to a person having ordinary skill in the art in gambling platforms and betting platforms as of the filing date of this application, which is or may be needed or required for operating a sports betting platform or other gambling or gaming platform.

The database 10H can also contain information regarding sports betting laws, regulations, and rules, gaming laws, regulations, and rules, income tax laws, withholding laws, and/or any other information, for each country or jurisdiction in which the apparatus 100 and methods of the present invention can be utilized in order to provide for proper oversight, monitoring, and/or regulation, of all sports betting activities which can take place via the apparatus 100 of the present invention.

The database 10H can also contain any data and/or information stored in the respective databases of any of the herein-described user communication devices 20, sport governing body computers 30, governmental entity computers 40, gaming facility computers 50, content provider computers 60, information/analytics provider computers 70, social network computers 80, financial institution computers 90, escrow agent computers 95, wearable devices 97, and ticket seller computers 99, which are utilized in conjunction with the apparatus 100, apparatus 200, and the methods of the present invention.

The database 10H can also contain any other data and/or information, and/or software programs or software applications, which may be needed and/or desired for performing any and/or all of the processing routines and/or functionality described herein as being provided by the central processing computer 10 and/or apparatus 100. In this regard, whether or not noted herein, the database 10H can contain any and/or all data and/or information which may be needed or desired in performing any and/or all of the functionality described herein as being performed by the apparatus 100, the central processing computer 10, and any of the herein-described user communication devices 20, sport governing body computers 30, governmental entity computers 40, gaming facility computers 50, content provider computers 60, information/analytics provider computers 70, social network computers 80, financial institution computers 90, escrow agent computers 95, any wearable devices 97, and any ticket seller computers 99. The database 10H can also be connected to the CPU 10A.

The central processing computer 10 can also include a transmitter 10I for transmitting data and/or information, including any of the herein-described data and/or information, and/or any other data and/or information described herein as being provided by, from, or to, the central processing computer 10, any of the user communication devices 20, any of the sport governing body computers 30, any of the governmental entity computers 40, any of the gaming facility computers 50, any of the content provider computers 60, any of the information/analytics provider computers 70, any of the social network computers 80, any of the financial institution computers 90, any of the escrow agent computers 95, and any wearable devices 97, or to any of the other central processing computer 10. The transmitter 10I can also be connected to the CPU 10A.

With reference to FIG. 2, the central processing computer 10 can also include a global positioning device 10J for determining the position or location of the central processing computer 10. In a preferred embodiment, the global positioning device 10J can be utilized in order to determine the position or location of the central processing computer 10 so as to, for example, determine a jurisdiction in which the central processing computer 10 is located at any given time.

For example, if the central processing computer 10 is located on board a boat, ship, aircraft, or jet, the global positioning device 10J can be utilized in order to determine if the respective boat, ship, aircraft, or jet, is in or over international waters or international airspace, and, therefore, outside of a state's or a country's gaming laws, or within the jurisdiction of international gaming laws, etc., if applicable. In another embodiment, when traveling over land, such as in a bus, automobile, or train, etc., the global positioning device 10J can be utilized in order to determine the position or location of the central processing computer 10 and/or to determine when a state or national line has been crossed in order to ascertain that new or different sports betting or gaming laws should be used in administering, governing, or processing a bet. The global positioning device 10J can also be connected with the CPU 10A.

The central processing computer 10 can also include a video and/or audio recording device(s) 10K which can include a camera and/or a video recording device for recording pictures or video and/or video clips and/or a microphone or an audio recording device for recording audio or audio clips which can be recorded by, and/or transmitted live, by or from the central processing computer 10, or which can be recorded by, and stored at or in, the central processing computer 10 for transmission by or from the central processing computer 10 at a later time. The video and/or audio recording device(s) 10K can also be utilized to facilitate one-way broadcasts from the central processing computer 10, and/or can be utilized to facilitate video conferencing, video chatting, and/or audio conferencing, and/or video and audio conferencing, between any of the herein-described users, individuals, parties, or entities, who or which utilize the apparatus 100 and method of the present invention. In this regard, the user or operator of the central processing computer 10 can engage in telephone calls and video conferencing calls via the same. The user or operator of the central processing computer 10 can also use the video and/or audio recording device(s) 10K to record and broadcast or transmit content via its transmitter 10I.

Figure 3:
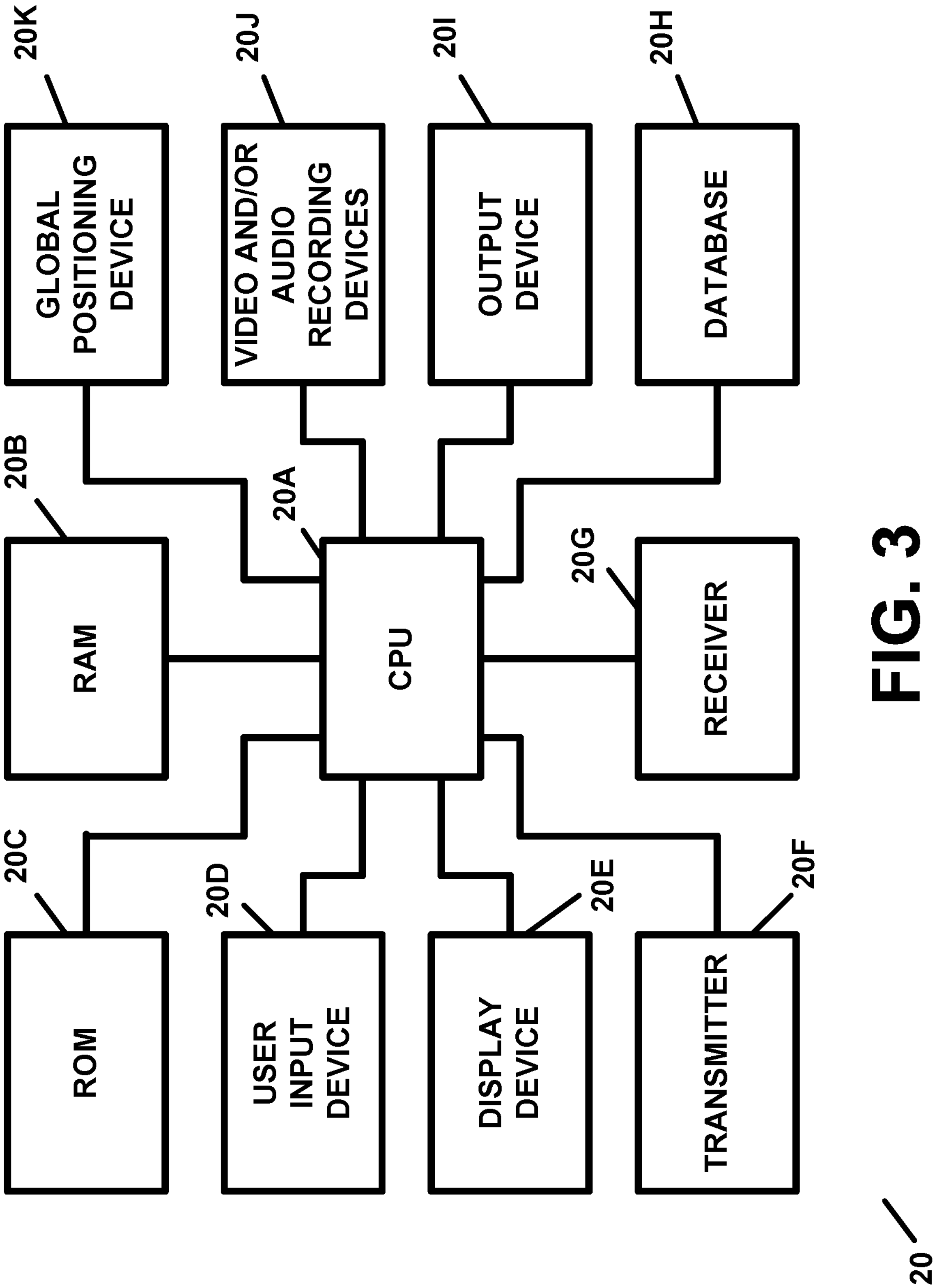
FIG. 3 illustrates the user communication device of FIG. 1, in block diagram form.

FIG. 3 illustrates the user communication device 20 of FIG. 1, in block diagram form. The user communication device 20, in the preferred embodiment, can be a computer, a personal computer, a home computer, a personal communication device, a telephone, an interactive television, a smart phone, a cellular telephone, a wireless telephone, a videophone, a video telephone, a personal digital assistant, a watch, a VR (virtual reality) headset or interface, an AR (augmented reality) headset or interface, a wearable communication device, glasses equipped with communications equipment, or any other communication device or equipment. The user communication device can also be a computer terminal, a terminal device connected to, or associated with, the central processing computer 10, or a kiosk. The user communication device 20 can also be any headset or other wearable device which can have all of the herein-described components of the user communication device 20. In instances when a headset is used as, or in conjunction with, the user communication device 20, the user of the same can verbally input information and/or instructions into the user communication device 20 via the microphone of the video and/or audio recording device(s) 20J described herein. In such an embodiment, the user communication device 20, and/or the headset utilized in conjunction with the same, can be specially programmed and/or equipped with voice recognition software in order to process the user's verbal or voice comments, commands, and/or instructions. The user communication device 20 can also be integrated within a headset or other wearable device. The headset or other wearable device can also be a component of the user communication device 20. The user communication device 20 can also be a server computer, a network computer, or any other computer capable of being utilized in a network.

With reference to FIG. 3, in the preferred embodiment, the user communication device 20 includes a central processing unit or CPU 20A which, in the preferred embodiment, is a microprocessor. The CPU 20A may also be a microcomputer, a minicomputer, a macro-computer, and/or a mainframe computer, depending upon the application. The CPU 20A is specially programmed and/or specially configured to perform any and/or all of the functionality described herein as being performed by the user communication device 20.

The user communication device 20 also includes a random access memory (RAM) device(s) 20B and a read only (ROM) memory device(s) 20C, each of which is connected to the CPU 20A, and a user input device 20D, for entering data or information and/or instructions and/or commands into the user communication device 20. The user input device 20D can be or can include any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, or instructions and/or commands, to be entered into the user communication device 20. The input device(s) 20D is/are also connected to the CPU 20A.

The user communication device 20 also includes a display device 20E for displaying data and/or information to a user. The user communication device 20 also includes a transmitter(s) 20F, for transmitting signals and/or data and/or information to any one or more of the central processing computers 10, the sport governing body computers 30, the governmental entity computers 40, the gaming facility computers 50, the content provider computers 60, the information/analytics provider computers 70, the social network computers 80, the financial institution computers 90, the escrow agent computers 95, the wearable devices 97, and/or any other user communication devices 20, which may be utilized in conjunction with the apparatus 100 of the present invention. The user communication device 20 also includes a receiver 20G, for receiving signals and/or data and/or information from any one or more of the central processing computers 10, the sport governing body computers 30, the governmental entity computers 40, the gaming facility computers 50, the content provider computers 60, the information/analytics provider computers 70, the social network computers 80, the financial institution computers 90, the escrow agent computers 95, the wearable devices 97, and/or any other user communication devices 20, which may be utilized in conjunction with the apparatus 100 of the present invention.

The user communication device 20 also includes a database(s) 20H. The database 20H can contain and/or be linked to any of the data and/or information described herein as being stored in the database 10H.

The database 20H can also contain and/or include any data and/or information regarding the individual, party, or entity, or user ("user") who or which utilizes the user communication device 20, and for each user, the database 10H can contain and/or include, but not be limited to, data and/or information regarding the user's, or each user's name, address, telephone number (s), cellular telephone number(s), mobile or wireless telephone number(s), e-mail address or e-mail addresses, and/or text message, instant message, SMS message, or MMS message, or any other messaging, telephone number or other address or identifier. The database 20H can also contain data and/or information regarding the user's or each user's sports betting account, gaming account, or gambling account.

The database 20H can also contain any data and/or information which may be required, and/or which may be desired, for performing any of the functionality and/or processing routines described herein as being performed by the user communication device 20 and/or the apparatus 100. In a preferred embodiment, the database 20H can also include any of the data and/or information described herein as being contained in the respective databases of the central processing computer(s) 10, the sport governing body computers 30, the governmental entity computers 40, the gaming facility computers 50, the content provider computers 60, the information/analytics provider computers 70, the social network computers 80, the financial institution computers 90, the escrow agent computers 95, and the wearable devices 97. The database 20H can also be connected to the CPU 20A.

The user communication device 20 also includes an output device 20I for outputting any of the data, information, and/or reports, described herein as being generated by or via the user communication device 20. In the preferred embodiment, the output device 20I can be a printer, a display, a transmitter, a modem, and/or any other device which can be used to output data or information of any kind or type.

The user communication device 20 also includes a video and/or audio recording device(s) 20J which can include a camera and/or a video recording device for recording pictures or video and/or video clips and/or a microphone or an audio recording device for recording audio or audio clips which can be recorded by, and/or transmitted live, by or from the user communication device 20, or which can be recorded by, and stored at or in, the user communication device 20 for transmission by or from the user communication device 20 at a later time. The video and/or audio recording device(s) 20J can also be utilized to facilitate one-way broadcasts from the user communication device 20, and/or can be utilized to facilitate video conferencing, video chatting, and/or audio conferencing, and/or video and audio conferencing, between any of the herein-described users, individuals, parties, or entities, who or which utilize the apparatus 100 and method of the present invention. In this regard, the user of the user communication device 20 can engage in telephone calls and video conferencing calls via the same. The user of the user communication device 20 can also use the video and/or audio recording device(s) 20J to record and broadcast or transmit content via its transmitter 20F.

With reference to FIG. 3, the user communication device 20, in the preferred embodiment, also includes a global positioning device 20K for determining the position or location of the user communication device 20. In a preferred embodiment, the global positioning device 20K can be utilized to determine the position or location of the user communication device 20 so as to, for example, determine a jurisdiction in which the user communication device 20 is located and/or is being utilized while placing a bet or a wager on a sporting event, game, match, activity, competition, or tournament, while engaging in sports betting or in a sports betting activity, while placing a bet or wager on or involving any sports betting activity, or while engaging in any gaming or gambling activity.

For example, if the user and his or her user communication device 20 is at a fixed location, or is moving, the global positioning device 20K can determine the position or location of the user's user communication device 20K at the time or instant the user places any bet or wager on or involving a sporting event, game, match, activity, competition, or tournament, or any other gambling activity or gaming activity. The global positioning device 20K can also be utilized when the user communication device 20 is located on board a boat, ship, aircraft, or jet, in order to determine if the user communication device 20 and the respective boat, ship, aircraft, or jet, are in or over international waters or international airspace, and, therefore, outside of a state's or a country's gaming laws, or within the jurisdiction of international gaming laws, etc., if applicable. In another embodiment, when traveling over land, such as in a bus, automobile, or train, etc., the global positioning device 20K can be utilized in order to determine the position or location of the user communication device 20 and/or to determine when a state or national line has been crossed in order to ascertain that new or different sports betting or gaming laws should be used in administering, governing, or processing a bet. The global positioning device 20K can also be connected with the CPU 20A.

Figure 4:
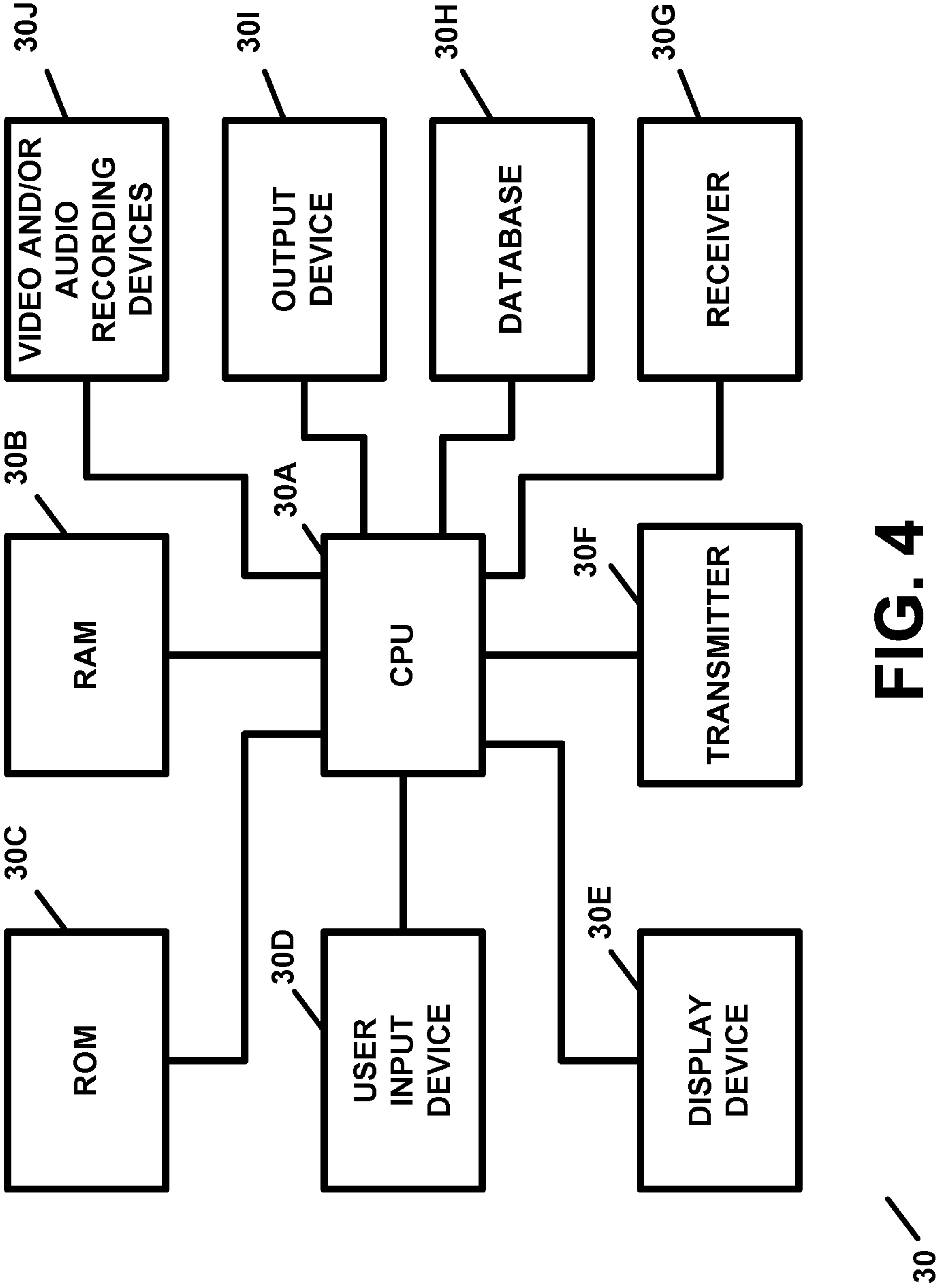
FIG. 4 illustrates the sports governing body computer of FIG. 1, in block diagram form.

FIG. 4 illustrates the sports governing body computer 30 of FIG. 1, in block diagram form. The sports governing body computer 30, in the preferred embodiment, can be a computer, a server computer, a computer terminal or a terminal device connected to a computer or a server computer, a personal computer, a home computer, a personal communication device, a telephone, an interactive television, a smart phone, a cellular telephone, a wireless telephone, a videophone, a video telephone, a personal digital assistant, a watch, a smart watch, a VR (virtual reality) headset or interface, an AR (augmented reality) headset or interface, a wearable communication device, glasses equipped with communications equipment, a beeper or a pager, or any other communication device or equipment. The sports governing body computer 30 can also be any computer capable of being utilized in a network.

With reference to FIG. 4, in the preferred embodiment, the sports governing body computer 30 includes a central processing unit or CPU 30A which, in the preferred embodiment, is a microprocessor. The CPU 30A may also be a microcomputer, a minicomputer, a macro-computer, and/or a mainframe computer, depending upon the application. The CPU 30A is specially programmed to perform all of the functionality described herein as being performed by the sports governing body computer 30.

The sports governing body computer 30 also includes a random access memory (RAM) device(s) 30B and a read only memory (ROM) device(s) 30C, each of which is connected to the CPU 30A, and a user input device 30D, for entering data and/or information or instructions and/or commands into the sports governing body computer 30, and which can be or can include any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, or instructions and/or commands, to be entered into the sports governing body computer 30. The input device(s) 30D is/are also connected to the CPU 30A.

The sports governing body computer 30 also includes a display device 30E for displaying data and/or information to a user. The sports governing body computer 30 also includes a transmitter(s) 30F, for transmitting signals and/or data and/or information to any one or more of the central processing computer(s) 10, the user communications devices 20, the governmental entity computers 40, the gaming facility computers 50, the content provider computers 60, the information/analytics provider computers 70, the social network computers 80, the financial institution computers 90, the escrow agent computers 95, the wearable devices 97, and/or any other sport governing body computers 30, which may be utilized in conjunction with the apparatus 100 of the present invention.

The sport governing body computer 30 also includes a receiver 30G, for receiving signals and/or data and/or information from any one or more of the central processing computer(s) 10, the user communication devices 20, the governmental entity computers 40, the gaming facility computers 50, the content provider computers 60, the information/analytics provider computers 70, the social network computers 80, the financial institution computers 90, the escrow agent computers 95, the wearable devices 97, and/or any other sport governing body computers 30, which may be utilized in conjunction with the apparatus 100 of the present invention.

The sport governing body computer 30 also includes a database(s) 30H. The database 30H can contain and/or be linked to any of the data and/or information described herein as being stored in the database 10H.

The database 30H can also contain and/or include data and/or information which may be required, and/or which may be desired, for performing any of the functionality and/or processing routines described herein as being performed by the sport governing body computer 30 and/or the apparatus 100. In a preferred embodiment, the database 30H can also include any of the data and/or information described herein as being contained in the respective databases of the central processing computer(s) 10, the user communication devices 20, the governmental entity computers 40, the gaming facility computers 50, the content provider computers 60, the information/analytics provider computers 70, the social network computers 80, the financial institution computers 90, the escrow agent computers 95, and the wearable devices 97. The database 30H can also be connected to the CPU 30A.

The sport governing body computer 30 also includes an output device 30I for outputting any of the data, information, and/or reports, described herein as being generated by or via the sport governing body computer 30. In the preferred embodiment, the output device 30I can be a printer, a display, a transmitter, a modem, and/or any other device which can be used to output data or information of any kind or type.

The sport governing body computer 30 can also include a video and/or audio recording device(s) 30J which can include a camera and/or a video recording device for recording pictures or video and/or video clips and/or a microphone or an audio recording device for recording audio or audio clips which can be recorded by, and/or transmitted live, by or from the sport governing body computer 30, or which can be recorded by, and stored at or in, the sport governing body computer 30 for transmission by or from the sport governing body computer 30 at a later time. The video and/or audio recording device(s) 30J can also be utilized to facilitate one-way broadcasts from the sport governing body computer 30, and/or can be utilized to facilitate video conferencing, video chatting, and/or audio conferencing, and/or video and audio conferencing, between any of the herein-described users, individuals, parties, or entities, who or which utilize the apparatus 100 and method of the present invention. In this regard, the user of the sport governing body computer 30 can engage in telephone calls and video conferencing calls via the same. The user of the sport governing body computer 30 can also use the video and/or audio recording device(s) 30J to record and broadcast or transmit content via its transmitter 30F.

Figure 5:
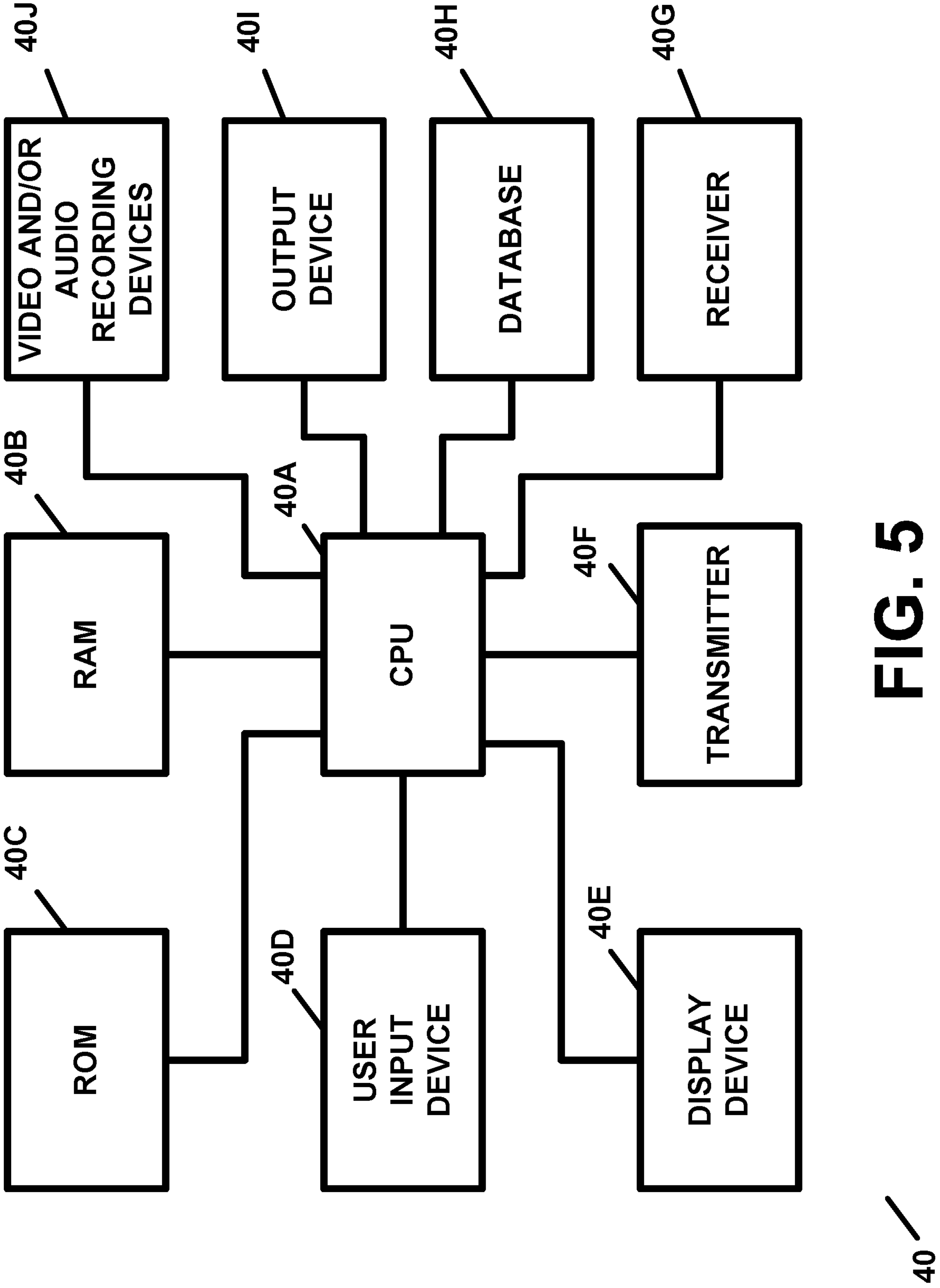
FIG. 5 illustrates the governmental entity computer of FIG. 1, in block diagram form.

FIG. 5 illustrates the governmental entity computer 40 of FIG. 1, in block diagram form. The governmental entity computer 40, in the preferred embodiment, can be a computer, a server computer, a computer terminal or a terminal device connected to a computer or a server computer, a personal computer, a home computer, a personal communication device, a telephone, an interactive television, a smart phone, a cellular telephone, a wireless telephone, a videophone, a video telephone, a personal digital assistant, a watch, a smart watch, a VR (virtual reality) headset or interface, an AR (augmented reality) headset or interface, a wearable communication device, glasses equipped with communications equipment, a beeper or a pager, or any other communication device or equipment. The governmental entity computer 40 can also be any computer capable of being utilized in a network.

With reference to FIG. 5, in the preferred embodiment, the governmental entity computer 40 includes a central processing unit or CPU 40A which, in the preferred embodiment, is a microprocessor. The CPU 40A may also be a microcomputer, a minicomputer, a macro-computer, and/or a mainframe computer, depending upon the application. The CPU 40A is specially programmed to perform all of the functionality described herein as being performed by the governmental entity computer 40.

The governmental entity computer 40 also includes a random access memory (RAM) device(s) 40B and a read only memory (ROM) device(s) 40C, each of which is connected to the CPU 40A, and a user input device 40D, for entering data or information and/or instructions and/or commands into the governmental entity computer 40, which can be or which can include any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, or instructions and/or commands, to be entered into the governmental entity computer 40. The input device(s) 40D is/are also connected to the CPU 40A.

The governmental entity computer 40 also includes a display device 40E for displaying data and/or information to a user. The governmental entity computer 40 also includes a transmitter(s) 40F, for transmitting signals and/or data and/or information to any one or more of the central processing computer(s) 10, the user communications devices 20, the sport governing body computers 30, the gaming facility computers 50, the content provider computers 60, the information/analytics provider computers 70, the social network computers 80, the financial institution computers 90, the escrow agent computers 95, the wearable devices 97, and/or any other governmental entity computers 40, which may be utilized in conjunction with the apparatus 100 of the present invention. The governmental entity computer 40 also includes a receiver 40G, for receiving signals and/or data and/or information from any one or more of the central processing computer(s) 10, the user communication devices 20, the sport governing body computers 30, the gaming facility computers 50, the content provider computers 60, the information/analytics provider computers 70, the social network computers 80, the financial institution computers 90, the escrow agent computers 95, the wearable devices 97, and/or any other governmental entity computers 40, which may be utilized in conjunction with the present invention.

The sport governing body computer 30 also includes a database(s) 40H. The database 40H can contain and/or can be linked to any of the data and/or information described herein as being stored in the database 10H.

The database 40H can also contain and/or include data and/or information which may be required, and/or which may be desired, for performing any of the functionality and/or processing routines described herein as being performed by the governmental entity computer 40 and/or the apparatus 100. In a preferred embodiment, the database 40H can also include any of the data and/or information described herein as being contained in the respective databases of the central processing computer(s) 10, the user communication devices 20, sport governing body computers 30, the gaming facility computers 50, the content provider computers 60, the information/analytics provider computers 70, the social network computers 80, the financial institution computers 90, the escrow agent computers 95, and the wearable devices 97. The database 40H can also be connected to the CPU 40A.

The governmental entity computer 40 also includes an output device 40I for outputting any of the data, information, and/or reports, described herein as being generated by or via the governmental entity computer 40. In the preferred embodiment, the output device 40I can be a printer, a display, a transmitter, a modem, and/or any other device which can be used to output data or information of any kind or type.

The governmental entity computer 40 also includes a video and/or audio recording device(s) 40J which can include a camera and/or a video recording device for recording pictures or video and/or video clips and/or a microphone or an audio recording device for recording audio or audio clips which can be recorded by, and/or transmitted live, by or from the governmental entity computer 40, or which can be recorded by, and stored at or in, the governmental entity computer 40 for transmission by or from the governmental entity computer 40 at a later time. The video and/or audio recording device(s) 40J can also be utilized to facilitate one-way broadcasts from the governmental entity computer 40, and/or can be utilized to facilitate video conferencing, video chatting, and/or audio conferencing, and/or video and audio conferencing, between any of the herein-described users, individuals, parties, or entities, who or which utilize the apparatus 100 and method of the present invention. In this regard, a user of the governmental entity computer 40 can engage in telephone calls and video conferencing calls via the same. The user of the governmental entity computer 40 can also use the video and/or audio recording device(s) 40J to record and broadcast or transmit content via its transmitter 40F.

Figure 6:
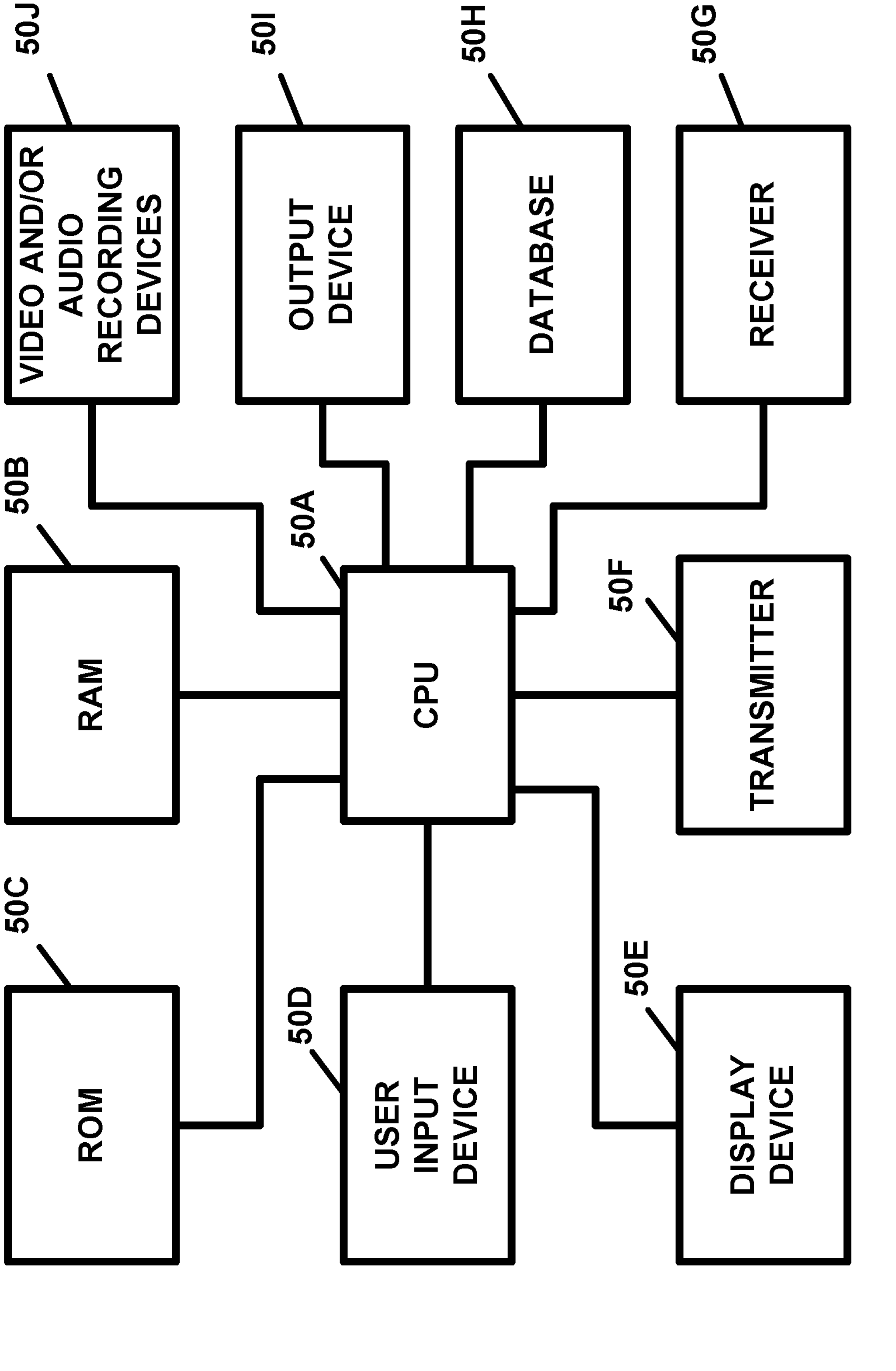
FIG. 6 illustrates the gaming facility computer of FIG. 1, in block diagram form.

FIG. 6 illustrates the gaming facility computer 50 of FIG. 1, in block diagram form. The gaming facility computer 50, in the preferred embodiment, can be a computer, a server computer, a computer terminal or a terminal device connected to a computer or a server computer, a personal computer, a home computer, a personal communication device, a telephone, an interactive television, a smart phone, a cellular telephone, a wireless telephone, a videophone, a video telephone, a personal digital assistant, a watch, a smart watch, a VR (virtual reality) headset or interface, an AR (augmented reality) headset or interface, a wearable communication device, glasses equipped with communications equipment, a beeper or a pager, or any other communication device or equipment. The gaming facility computer 50 can also be any computer capable of being utilized in a network.

With reference to FIG. 6, in the preferred embodiment, the gaming facility computer 50 includes a central processing unit or CPU 50A which, in the preferred embodiment, is a microprocessor. The CPU 50A may also be a microcomputer, a minicomputer, a macro-computer, and/or a mainframe computer, depending upon the application. The CPU 50A is specially programmed and/or specially configured to perform all of the functionality described herein as being performed by the gaming facility computer 50.

The gaming facility computer 50 also includes a random access memory (RAM) device(s) 50B and a read only memory (ROM) device(s) 50C, each of which is connected to the CPU 50A, and a user input device 50D, for entering data or information and/or instructions and/or commands into the gaming facility computer 50, and which can be, or can include, any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, or instructions and/or commands, to be entered into the gaming facility computer 50.

The input device(s) 50D can also include any kiosks or computer terminals used by individuals to place a sports bet or sports wager via the gaming facility computer 50 and while at the gaming facility or venue. The input device(s) 50D is/are also connected to the CPU 50A.

The gaming facility computer 50 also includes a display device 50E for displaying data and/or information to a user. The gaming facility computer 50 also includes a transmitter(s) 50F, for transmitting signals and/or data and/or information to any one or more of the central processing computer(s) 10, the user communications devices 20, the sport governing body computers 30, the governmental entity computers 40, the content provider computers 60, the information/analytics provider computers 70, the social network computers 80, the financial institution computers 90, the escrow agent computers 95, the wearable devices 97, and/or any other gaming facility computers 50, which may be utilized in conjunction with the apparatus 100 of the present invention.

The gaming facility computer 50 also includes a receiver 50G, for receiving signals and/or data and/or information from any one or more of the central processing computer(s) 10, the user communication devices 20, the sport governing body computers 30, the governmental entity computers 40, the content provider computers 60, the information/analytics provider computers 70, the social network computers 80, the financial institution computers 90, the escrow agent computers 95, the wearable devices 97, and/or any other gaming facility computers 50, which may be utilized in conjunction with the apparatus 100 of the present invention.

The gaming facility computer 50 also includes a database(s) 50H. The database 50H can contain and/or can be linked to any of the data and/or information described herein as being stored in the database 10H.

The database 50H can also contain and/or can include data and/or information which may be required, and/or which may be desired, for performing any of the functionality and/or processing routines described herein as being performed by the gaming facility computer 50 and/or the apparatus 100. In a preferred embodiment, the database 50H can also include any of the data and/or information described herein as being contained in the respective databases of the central processing computer(s) 10, the user communication devices 20, the sport governing body computers 30, the governmental entity computers 40, the content provider computers 60, the information/analytics provider computers 70, the social network computers 80, the financial institution computers 90, the escrow agent computers 95, and the wearable devices 97. The database 50H can also be connected to the CPU 10A.

The gaming facility computer 50 also includes an output device 50I for outputting any of the data, information, and/or reports, described herein as being generated by or via the gaming facility computer 50. In the preferred embodiment, the output device 50I can be a printer, a display, a transmitter, a modem, and/or any other device which can be used to output data or information of any kind or type.

The gaming facility computer 50 also includes a video and/or audio recording device(s) 50J which can include a camera and/or a video recording device for recording pictures or video and/or video clips and/or a microphone or an audio recording device for recording audio or audio clips which can be recorded by, and/or transmitted live, by or from the gaming facility computer 50, or which can be recorded by, and stored at or in, the gaming facility computer 50 for transmission by or from the gaming facility computer 50 at a later time. The video and/or audio recording device(s) 50J can also be utilized to facilitate one-way broadcasts from the gaming facility computer 50, and/or can be utilized to facilitate video conferencing, video chatting, and/or audio conferencing, and/or video and audio conferencing, between any of the herein-described users, individuals, parties, or entities, who or which utilize the apparatus 100 and method of the present invention. In this regard, a user of the gaming facility computer 50 can engage in telephone calls and video conferencing calls via the same. The user of the gaming facility computer 50 can also use the video and/or audio recording device(s) 50J to record and broadcast or transmit content via its transmitter 50F.

Figure 7:
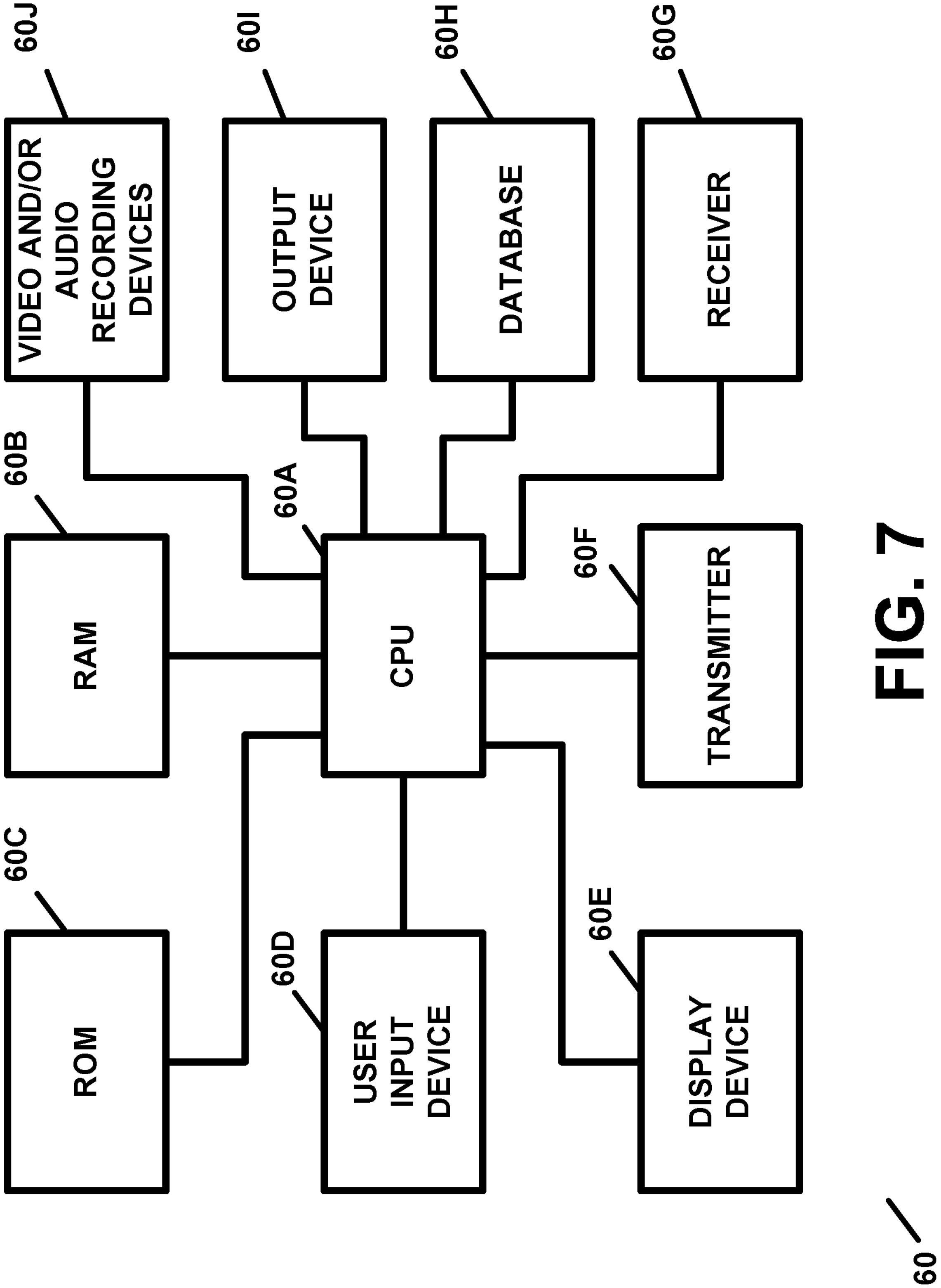
FIG. 7 illustrates the content provider computer of FIG. 1, in block diagram form.

FIG. 7 illustrates the content provider computer 60 of FIG. 1, in block diagram form. The content provider computer 60, in the preferred embodiment, can be a computer, a server computer, a computer terminal or a terminal device connected to a computer or a server computer, a personal computer, a home computer, a personal communication device, a telephone, an interactive television, a smart phone, a cellular telephone, a wireless telephone, a videophone, a video telephone, a personal digital assistant, a watch, a smart watch, a VR (virtual reality) headset or interface, an AR (augmented reality) headset or interface, a wearable communication device, glasses equipped with communications equipment, a beeper or a pager, or any other communication device or equipment. The content provider computer 60 can also be any computer capable of being utilized in a network.

With reference to FIG. 7, in the preferred embodiment, the content provider computer 60 includes a central processing unit or CPU 60A which, in the preferred embodiment, is a microprocessor. The CPU 60A may also be a microcomputer, a minicomputer, a macro-computer, and/or a mainframe computer, depending upon the application. The CPU 60A is specially programmed and/or specially configured to perform all of the functionality described herein as being performed by the content provider computer 60.

The content provider computer 60 also includes a random access memory (RAM) device(s) 60B and a read only memory (ROM) device(s) 60C, each of which is connected to the CPU 60A, and a user input device 60D, for entering data or information and/or instructions and/or commands into the content provider computer 60, which can be, or which can include, any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, or instructions and/or commands, to be entered into the content provider computer 60. The input device(s) 60D is/are also connected to the CPU 60A.

The content provider computer 60 also includes a display device 60E for displaying data and/or information to a user. The content provider computer 60 also includes a transmitter(s) 60F, for transmitting signals and/or data and/or information to any one or more of the central processing computer(s) 10, the user communications devices 20, the sport governing body computers 30, the governmental entity computers 40, the gaming facility computers 50, the information/analytics provider computers 70, the social network computers 80, the financial institution computers 90, the escrow agent computers 95, the wearable devices 97, and/or any other content provider computers 60, which may be utilized in conjunction with the apparatus 100 of the present invention.

The content provider computer 60 also includes a receiver 60G, for receiving signals and/or data and/or information from any one or more of the central processing computer(s) 10, the user communication devices 20, the sport governing body computers 30, the governmental entity computers 40, the gaming facility computers 50, the information/analytics provider computers 70, the social network computers 80, the financial institution computers 90, the escrow agent computers 95, the wearable devices 97, and/or any other content provider computers 60, which may be utilized in conjunction with the apparatus 100 of the present invention.

The content provider computer 60 also includes a database(s) 60H. The database 60H can contain and/or can be linked to any of the data and/or information described herein as being stored in the database 10H.

The database 60H can also contain and/or include data and/or information which may be required, and/or which may be desired, for performing any of the functionality and/or processing routines described herein as being performed by the content provider computer 60 and/or the apparatus 100. In a preferred embodiment, the database 60H can also include any of the data and/or information described herein as being contained in the respective databases of the central processing computer(s) 10, the user communication devices 20, the sport governing body computers 30, the governmental entity computers 40, the gaming facility computers 50, the information/analytics provider computers 70, the social network computers 80, the financial institution computers 90, the escrow agent computers 95, and the wearable devices 97. The database 60H can also be connected to the CPU 10A.

The content provider computer 60 also includes an output device 60I for outputting any of the data, information, and/or reports, described herein as being generated by or via the content provider computer 60. In the preferred embodiment, the output device 60I can be a printer, a display, a transmitter, a modem, and/or any other device which can be used to output data or information of any kind or type.

The content provider computer 60 also includes a video and/or audio recording device(s) 60J which can include a camera and/or a video recording device for recording pictures or video and/or video clips and/or a microphone or an audio recording device for recording audio or audio clips which can be recorded by, and/or transmitted live, by or from the content provider computer 60, or which can be recorded by, and stored at or in, the content provider computer 60 for transmission by or from the content provider computer 60 at a later time. The video and/or audio recording device(s) 60J can also be utilized to facilitate one-way broadcasts from the content provider computer 60, and/or can be utilized to facilitate video conferencing, video chatting, and/or audio conferencing, and/or video and audio conferencing, between any of the herein-described users, individuals, parties, or entities, who or which utilize the apparatus 100 and method of the present invention. In this regard, a user of the content provider computer 60 can engage in telephone calls and video conferencing calls via the same. The user of the content provider computer 60 can also use the video and/or audio recording device(s) 60J to record and broadcast or transmit content via its transmitter 60F.

Figure 8:
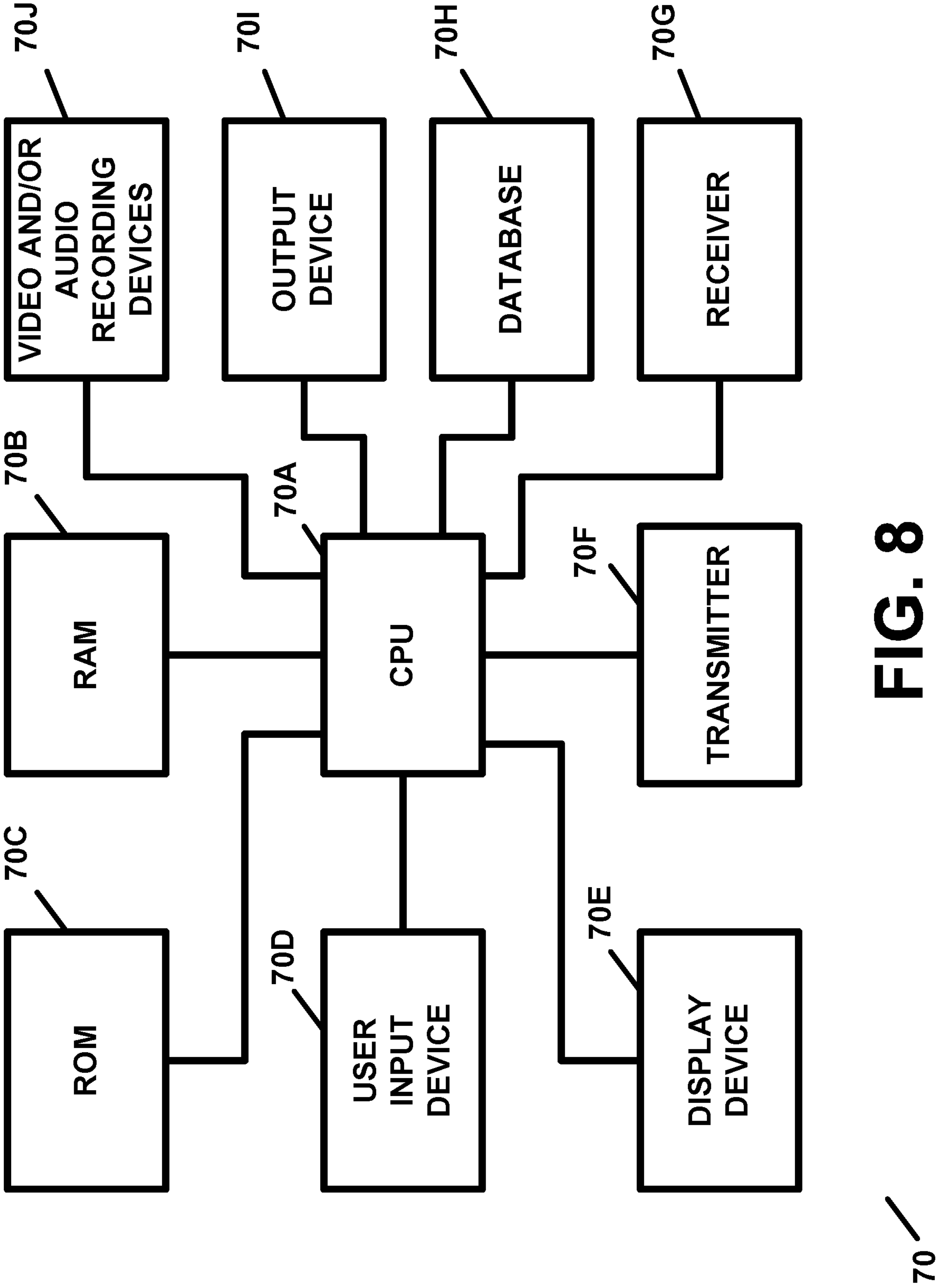
FIG. 8 illustrates the information and/or analytics provider computer of FIG. 1, in block diagram form.

FIG. 8 illustrates the information/analytics provider computer 70 of FIG. 1, in block diagram form. With reference to FIG. 8, in the preferred embodiment, the information/analytics provider computer 70 includes a central processing unit or CPU 70A which, in the preferred embodiment, is a microprocessor. The CPU 70A may also be a microcomputer, a minicomputer, a macro-computer, and/or a mainframe computer, depending upon the application. The CPU 70A is specially programmed and/or specially configured to perform all of the functionality described herein as being performed by the information/analytics provider computer 70.

The information/analytics provider computer 70 also includes a random access memory (RAM) device(s) 70B and a read only memory (ROM) device(s) 70C, each of which is connected to the CPU 70A, and a user input device 70D, for entering data or information and/or instructions and/or commands into the information/analytics provider computer 70, which can be or which can include any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, or instructions and/or commands, to be entered into the information/analytics provider computer 70. The input device(s) 70D is/are also connected to the CPU 70A.

The information/analytics provider computer 70 also includes a display device 70E for displaying data and/or information to a user. The information/analytics provider computer 70 also includes a transmitter(s) 70F, for transmitting signals and/or data and/or information to any one or more of the central processing computer(s) 10, the user communications devices 20, the sport governing body computers 30, the governmental entity computers 40, the gaming facility computers 50, the content provider computers 60, the social network computers 80, the financial institution computers 90, the escrow agent computers 95, the wearable devices 97, and/or any other information/analytics provider computers 70, which may be utilized in conjunction with the apparatus 100 of the present invention.

The information/analytics provider computer 70 also includes a receiver 70G, for receiving signals and/or data and/or information from any one or more of the central processing computer(s) 10, the user communication devices 20, the sport governing body computers 30, the governmental entity computers 40, the gaming facility computers 50, the content provider computers 70, the social network computers 80, the financial institution computers 90, the escrow agent computers 95, the wearable devices 97, and/or any other information/analytics provider computers 70, which may be utilized in conjunction with the apparatus 100 of the present invention.

The information/analytics provider computer 70 also includes a database(s) 70H. The database 70H can contain and/or can be linked to any of the data and/or information described herein as being stored in the database 10H.

The database 70H can also contain and/or include data and/or information which may be required, and/or which may be desired, for performing any of the functionality and/or processing routines described herein as being performed by the information/analytics provider computer 70 and/or the apparatus 100. In a preferred embodiment, the database 70H can also include any of the data and/or information described herein as being contained in the respective databases of the central processing computer(s) 10, the user communication devices 20, the sport governing body computers 30, the governmental entity computers 40, the gaming facility computers 50, the content provider computers 60, the social network computers 80, the financial institution computers 90, the escrow agent computers 95, and the wearable devices 97. The database 70H can also be connected to the CPU 70A.

The database 70H can also contain any and/or all of the data, information, news, statistical data and/or information, historical data and/or information, forecasting data and/or information, predictive data and/or information, analytics data and/or information, and/or sports analytics data and/or information, and/or information regarding products and/or services, and/or information regarding subscriptions for products and or services which are, or can be, provided by the information/analytics provider which or who utilizes the information/analytics provider computer 70.

The information/analytics provider computer 70 also includes an output device 70I for outputting any of the data, information, and/or reports, described herein as being generated by or via the information/analytics provider computer 70. In the preferred embodiment, the output device 70I can be a printer, a display, a transmitter, a modem, and/or any other device which can be used to output data or information of any kind or type.

The information/analytics provider computer 70 also includes a video and/or audio recording device(s) 70J which can include a camera and/or a video recording device for recording pictures or video and/or video clips and/or a microphone or an audio recording device for recording audio or audio clips which can be recorded by, and/or transmitted live, by or from the information/analytics provider computer 70, or which can be recorded by, and stored at or in, the information/analytics provider computer 70 for transmission by or from the information/analytics provider computer 70 at a later time. The video and/or audio recording device(s) 70J can also be utilized to facilitate one-way broadcasts from the information/analytics provider computer 70, and/or can be utilized to facilitate video conferencing, video chatting, and/or audio conferencing, and/or video and audio conferencing, between any of the herein-described users, individuals, parties, or entities, who or which utilize the apparatus 100 and method of the present invention. In this regard, a user of the information/analytics provider computer 70 can engage in telephone calls and video conferencing calls via the same. The user of the information/analytics provider computer 70 can also use the video and/or audio recording device(s) 70J to record and broadcast or transmit content via its transmitter 70F.

Figure 9:
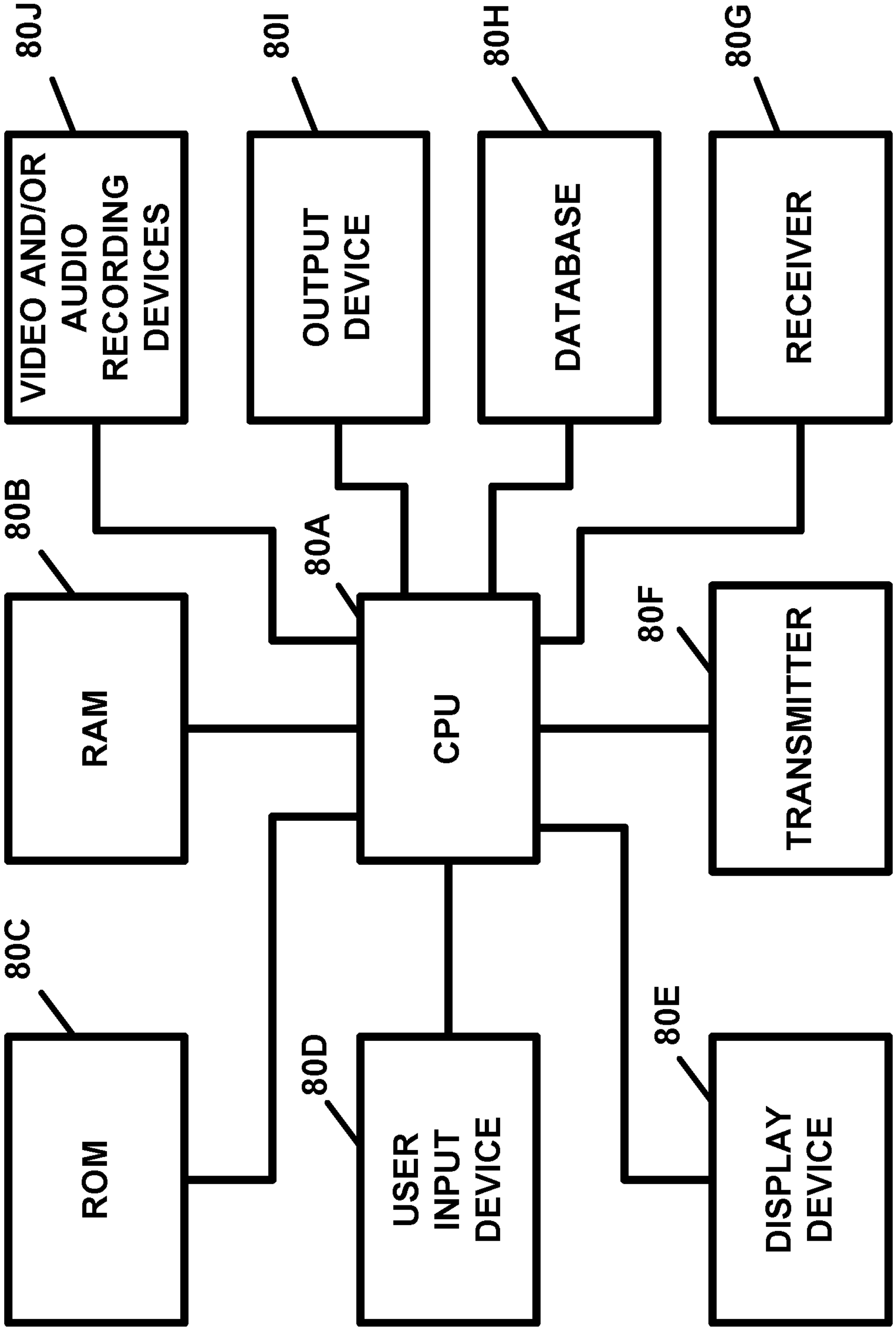
FIG. 9 illustrates the social network computer of FIG. 1, in block diagram form.

FIG. 9 illustrates the social network computer 80 of FIG. 1, in block diagram form. With reference to FIG. 9, in the preferred embodiment, the social network computer 80 includes a central processing unit or CPU 80A, which in the preferred embodiment, is a microprocessor. The CPU 80A may also be a microcomputer, a minicomputer, a macrocomputer, and/or a mainframe computer, depending upon the application. The CPU 80A is specially programmed and/or specially configured to perform all of the functionality described herein as being performed by the social network computer 80.

The social network computer 80 also includes a random access memory (RAM) device(s) 80B and a read only memory (ROM) device(s) 80C, each of which is connected to the CPU 80A, and a user input device 80D, for entering data or information and/or instructions and/or commands into the social network computer 80, which can be, or which can include, any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, or instructions and/or commands, to be entered into the social network computer 80. The input device(s) 80D is/are also connected to the CPU 80A.

The social network computer 80 also includes a display device 80E for displaying data and/or information to a user. The social network computer 80 also includes a transmitter(s) 80F, for transmitting signals and/or data and/or information to any one or more of the central processing computer(s) 10, the user communications devices 20, the sport governing body computers 30, the governmental entity computers 40, the gaming facility computers 50, the content provider computers 60, the information/analytics provider computers 70, the financial institution computers 90, the escrow agent computers 95, the wearable devices 97, and/or any other social network computers 80, which may be utilized in conjunction with the apparatus 100 of the present invention.

The social network computer 80 also includes a receiver 80G, for receiving signals and/or data and/or information from any one or more of the central processing computer(s) 10, the user communication devices 20, the sport governing body computers 30, the governmental entity computers 40, the gaming facility computers 50, the content provider computers 60, the information/analytics provider computers 70, the financial institution computers 90, the escrow agent computers 95, the wearable devices 97, and/or any other social network computers 80, which may be utilized in conjunction with the apparatus 100 of the present invention.

The social network computer 80 also includes a database(s) 80H. The database 80H can contain and/or can be linked to any of the data and/or information described herein as being stored in the database 10H.

The database 80H can also contain and/or include data and/or information which may be required, and/or which may be desired, for performing any of the functionality and/or processing routines described herein as being performed by the social network computer 80 and/or the apparatus 100. In a preferred embodiment, the database 80H can also include any of the data and/or information described herein as being contained in the respective databases of the central processing computer(s) 10, the user communication devices 20, the sport governing body computers 30, the governmental entity computers 40, the gaming facility computers 50, the content provider computers 60, the information/analytics provider computers 70, the financial institution computers 90, the escrow agent computers 95, and the wearable devices 97. The database 80H can also be connected to the CPU 10A.

The database 80H can also contain information including profiles, posts, comments, and any other social network information for or regarding the members of the social network which can include all of the herein-described individuals, parties, entities, and users, and all sports governing bodies, leagues, teams, and players of the teams, governmental entities, gaming facilities or venues, content providers, information/analytics providers, social networks, financial institutions, and escrow agents, and their respective employees and agents. For each member, the database 80H can store the respective member's profile information, profile pages, posts, comments, posted pictures or video clips and any other information typically found on a social network website or in an on-line social network community.

The social network computer 80 also includes an output device 80I for outputting any of the data, information, and/or reports, described herein as being generated by or via the social network computer 80. In the preferred embodiment, the output device 80I can be a printer, a display, a transmitter, a modem, and/or any other device which can be used to output data or information of any kind or type.

The social network computer 80 also includes a video and/or audio recording device(s) 80J which can include a camera and/or a video recording device for recording pictures or video and/or video clips and/or a microphone or an audio recording device for recording audio or audio clips which can be recorded by, and/or transmitted live, by or from the social network computer 80, or which can be recorded by, and stored at or in, the social network computer 80 for transmission by or from the social network computer 80 at a later time. The video and/or audio recording device(s) 80J can also be utilized to facilitate one-way broadcasts from the social network computer 80, and/or can be utilized to facilitate video conferencing, video chatting, and/or audio conferencing, and/or video and audio conferencing, between any of the herein-described users, individuals, parties, or entities, who or which utilize the apparatus 100 and method of the present invention. In this regard, a user of the social network computer 80 can engage in telephone calls and video conferencing calls via the same. The user of the social network computer 80 can also use the video and/or audio recording device(s) 80J to record and broadcast or transmit content via its transmitter 80F.

Figure 10:
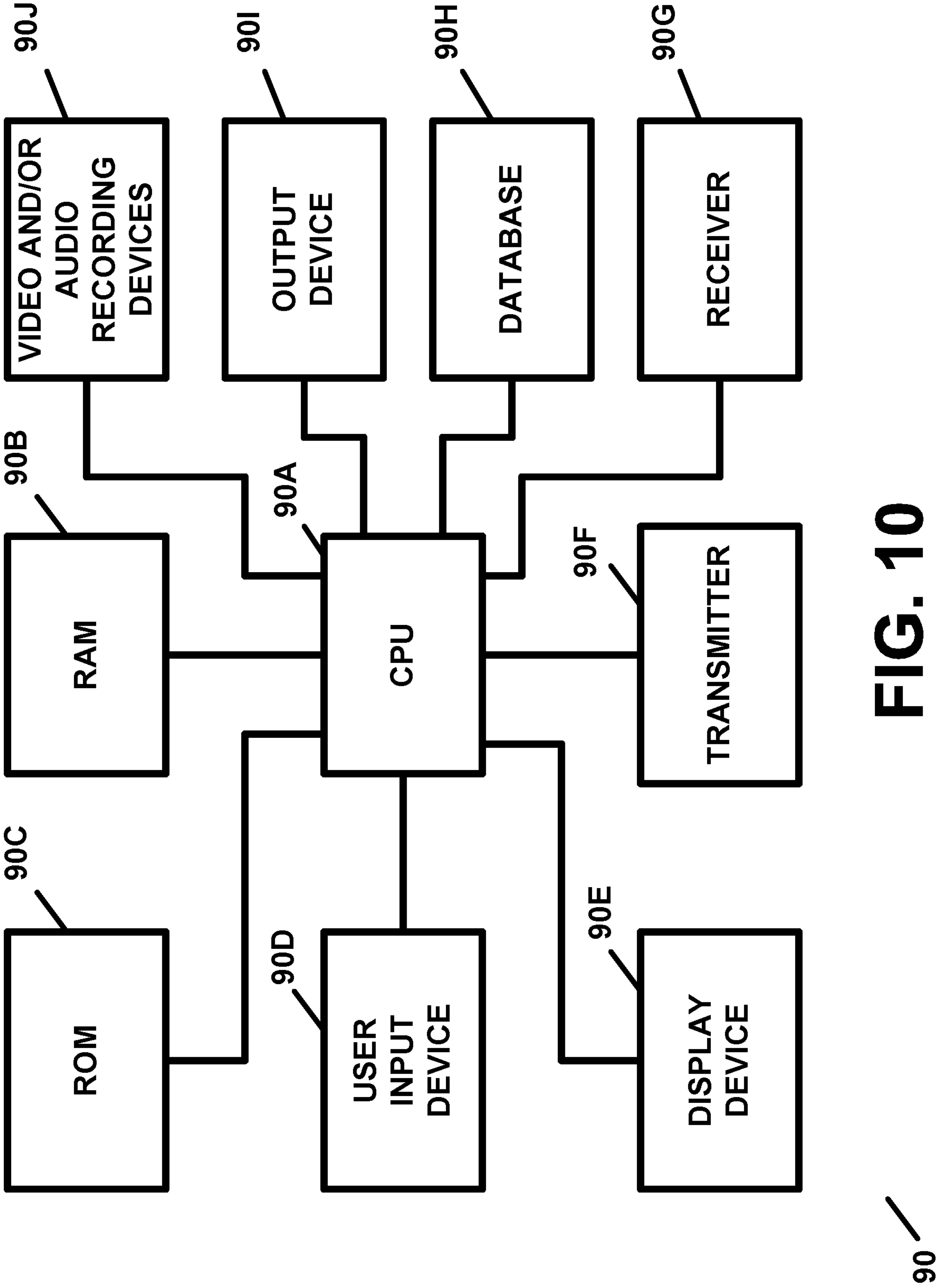
FIG. 10 illustrates the financial institution computer of FIG. 1, in block diagram form.

FIG. 10 illustrates the financial institution computer 90 of FIG. 1, in block diagram form. With reference to FIG. 10, in the preferred embodiment, the financial institution computer 90 includes a central processing unit or CPU 90A which, in the preferred embodiment, is a microprocessor. The CPU 90A may also be a microcomputer, a minicomputer, a macro-computer, and/or a mainframe computer, depending upon the application. The CPU 90A is specially programmed and/or specially configured to perform all of the functionality described herein as being performed by the financial institution computer 90.

The financial institution computer 90 also includes a random access memory (RAM) device(s) 90B and a read only memory (ROM) device(s) 90C, each of which is connected to the CPU 90A, and a user input device 90D, for entering data or information and/or instructions and/or commands into the financial institution computer 90, which can be, or which can include, any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, or instructions and/or commands, to be entered into the financial institution computer 90. The input device(s) 90D is/are also connected to the CPU 90A.

The financial institution computer 90 also includes a display device 90E for displaying data and/or information to a user. The financial institution computer 90 also includes a transmitter(s) 90F, for transmitting signals and/or data and/or information to any one or more of the central processing computer(s) 10, the user communications devices 20, the sport governing body computers 30, the governmental entity computers 40, the gaming facility computers 50, the content provider computers 60, the information/analytics provider computers 70, the social network computers 80, the escrow agent computers 95, the wearable devices 97, and/or any other financial institution computers 90, which may be utilized in conjunction with the apparatus 100 of the present invention.

The financial institution computer 90 also includes a receiver 90G, for receiving signals and/or data and/or information from any one or more of the central processing computer(s) 10, the user communication devices 20, the sport governing body computers 30, the governmental entity computers 40, the gaming facility computers 50, the content provider computers 60, the information/analytics provider computers 70, the social network computers 80, the escrow agent computers 95, the wearable devices 97, and/or any other financial institution computers 90, which may be utilized in conjunction with the apparatus 100 of the present invention.

The financial institution computer 90 also includes a database(s) 90H. The database 90H can contain and/or can be linked to any of the data and/or information described herein as being stored in the database 10H.

The database 90H can also contain and/or include data and/or information which may be required, and/or which may be desired, for performing any of the functionality and/or processing routines described herein as being performed by the financial institution computer 90 and/or the apparatus 100. In a preferred embodiment, the database 90H can also include any of the data and/or information described herein as being contained in the respective databases of the central processing computer(s) 10, the user communication devices 20, the sport governing body computers 30, the governmental entity computers 40, the gaming facility computers 50, the content provider computers 60, the information/analytics provider computers 70, the social network computers 80, the escrow agent computers 95, and the wearable devices 97. The database 90H can also be connected to the CPU 10A.

The database 90H can also contain information regarding any sports betting accounts, gaming accounts, or gambling accounts, maintained or serviced by the financial institution computer 90, and can also contain financial account information, payment information, payment identifier information, bank account information, credit account information, credit card account information, debit account information, debit card account information, charge account information, charge card account information, electronic money account information, and/or any other financial account information and/or payment information, for any of the herein-described individuals, parties, entities, and users, and/or their respective sports betting accounts, gaming accounts, or gambling accounts, and for of the sports governing bodies, leagues, teams, and players of the teams, governmental entities, gaming facilities or venues, content providers, information/analytics providers, social networks, financial institutions, and escrow agents, and their respective employees and agents, who or which use the apparatus 100 of the present invention.

The financial institution computer 90 also includes an output device 90I for outputting any of the data, information, and/or reports, described herein as being generated by or via the financial institution computer 90. In the preferred embodiment, the output device 90I can be a printer, a display, a transmitter, a modem, and/or any other device which can be used to output data or information of any kind or type.

The financial institution computer 90 also includes a video and/or audio recording device(s) 90J which can include a camera and/or a video recording device for recording pictures or video and/or video clips and/or a microphone or an audio recording device for recording audio or audio clips which can be recorded by, and/or transmitted live, by or from the financial institution computer 90, or which can be recorded by, and stored at or in, the financial institution computer 90 for transmission by or from the financial institution computer 90 at a later time. The video and/or audio recording device(s) 90J can also be utilized to facilitate one-way broadcasts from the financial institution computer 90, and/or can be utilized to facilitate video conferencing, video chatting, and/or audio conferencing, and/or video and audio conferencing, between any of the herein-described users, individuals, parties, or entities, who or which utilize the apparatus 100 and method of the present invention. In this regard, a user of the financial institution computer 90 can engage in telephone calls and video conferencing calls via the same. The user of the financial institution computer 90 can also use the video and/or audio recording device(s) 90J to record and broadcast or transmit content via its transmitter 90F.

Figure 11:
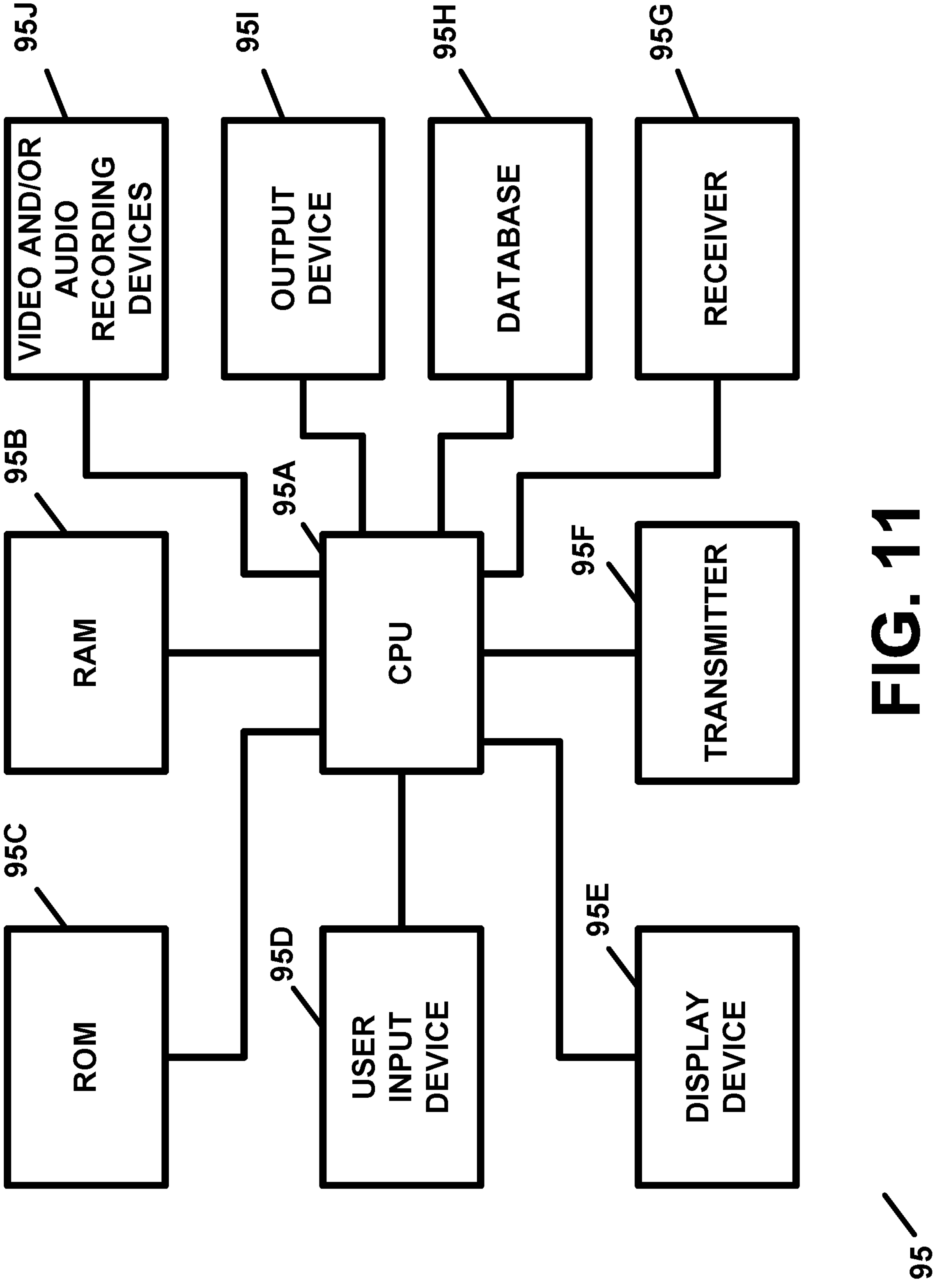
FIG. 11 illustrates the escrow agent computer of FIG. 1, in block diagram form.

FIG. 11 illustrates the escrow agent computer 95 of FIG. 1, in block diagram form. With reference to FIG. 11, in the preferred embodiment, the escrow agent computer 95 includes a central processing unit or CPU 95A, which in the preferred embodiment, is a microprocessor. The CPU 95A may also be a microcomputer, a minicomputer, a macro-computer, and/or a mainframe computer, depending upon the application. The CPU 95A is specially programmed and/or specially configured to perform all of the functionality described herein as being performed by the escrow agent computer 95.

The escrow agent computer 95 also includes a random access memory (RAM) device(s) 95B and a read only memory (ROM) device(s) 95C, each of which is connected to the CPU 95A, and a user input device 95D, for entering data or information and/or instructions and/or commands into the escrow agent computer 95, which can be, or which can include, any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, or instructions and/or commands, to be entered into the escrow agent computer 95. The input device(s) 95D is/are also connected to the CPU 95A.

The escrow agent computer 95 also includes a display device 95E for displaying data and/or information to a user. The escrow agent computer 95 also includes a transmitter(s) 95F, for transmitting signals and/or data and/or information to any one or more of the central processing computer(s) 10, the user communications devices 20, the sport governing body computers 30, the governmental entity computers 40, the gaming facility computers 50, the content provider computers 60, the information/analytics provider computers 70, the social network computers 80, the financial institution computers 90, the wearable devices 97, and/or any other escrow agent computer 95, which may be utilized in conjunction with the apparatus 100 of the present invention.

The escrow agent computer 95 also includes a receiver 95G, for receiving signals and/or data and/or information from any one or more of the central processing computer(s) 10, the user communication devices 20, the sport governing body computers 30, the governmental entity computers 40, the gaming facility computers 50, the content provider computers 60, the information/analytics provider computers 70, the social network computers 80, the financial institution computers 90, the wearable devices 97, and/or any other escrow agent computers 95, which may be utilized in conjunction with the present invention.

The escrow agent computer 95 also includes a database(s) 95H. The database 95H can contain and/or can be linked to any of the data and/or information described herein as being stored in the database 10H.

The database 95H can also contain and/or include data and/or information which may be required, and/or which may be desired, for performing any of the functionality and/or processing routines described herein as being performed by the escrow agent computer 95 and/or the apparatus 100. In a preferred embodiment, the database 95H can also include any of the data and/or information described herein as being contained in the respective databases of the central processing computer(s) 10, the user communication devices 20, the sport governing body computers 30, the governmental entity computers 40, the gaming facility computers 50, the content provider computers 60, the information/analytics provider computers 70, the social network computers 80, the financial institution computers 90, and the wearable devices 97. The database 95H can also be connected to the CPU 10A.

The database 95H can also contain any data and/or information regarding any of individuals, parties, entities, or users, who or which utilize the services provided by the escrow agent computer 95 or by the escrow service or company providing these escrow services. The database 95H can, for example, contain data and/or information regarding, for each individual, party, entity, or user, and of each escrow accounts associated with the respective individual, party, entity, or user, the escrow account number and the terms or conditions of the escrow agreement governing the escrow relationship.

The escrow agent computer 95 also includes an output device 95I for outputting any of the data, information, and/or reports, described herein as being generated by or via the escrow agent computer 95. In the preferred embodiment, the output device 95I can be a printer, a display, a transmitter, a modem, and/or any other device which can be used to output data or information of any kind or type.

The escrow agent computer 95 also includes a video and/or audio recording device(s) 95J which can include a camera and/or a video recording device for recording pictures or video and/or video clips and/or a microphone or an audio recording device for recording audio or audio clips which can be recorded by, and/or transmitted live, by or from the escrow agent computer 95, or which can be recorded by, and stored at or in, the escrow agent computer 95 for transmission by or from the escrow agent computer 95 at a later time. The video and/or audio recording device(s) 95J can also be utilized to facilitate one-way broadcasts from the escrow agent computer 95, and/or can be utilized to facilitate video conferencing, video chatting, and/or audio conferencing, and/or video and audio conferencing, between any of the herein-described users, individuals, parties, or entities, who or which utilize the apparatus 100 and method of the present invention. In this regard, a user of the escrow agent computer 95 can engage in telephone calls and video conferencing calls via the same. The user of the escrow agent computer 95 can also use the video and/or audio recording device(s) 95J to record and broadcast or transmit content via its transmitter 95F.

Figure 12:
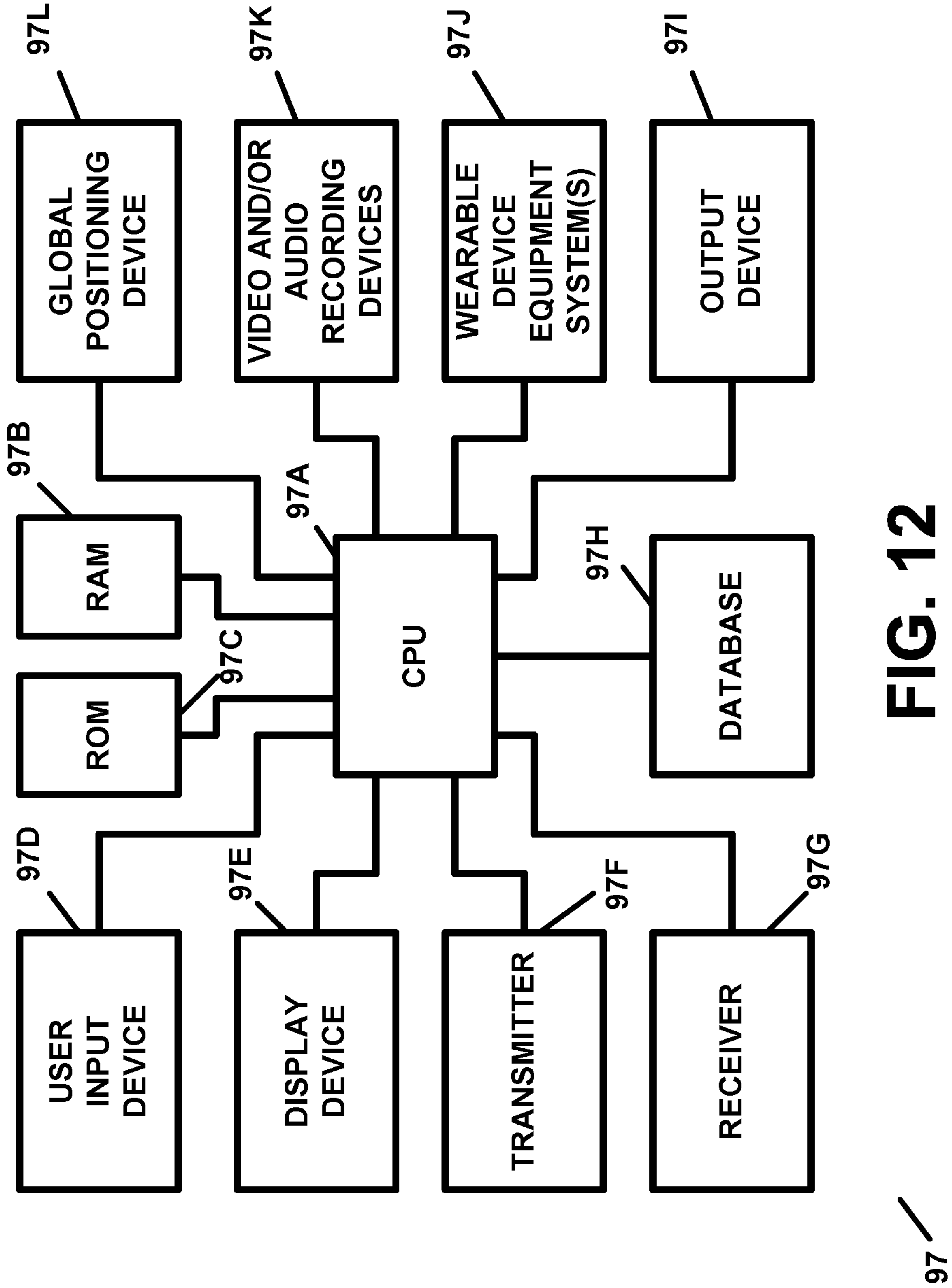
FIG. 12 illustrates the wearable device of FIG. 1, in block diagram form.

FIG. 12 illustrates the wearable device 97 of FIG. 1, in block diagram form. With reference to FIG. 12, in the preferred embodiment, the wearable device 97 includes a central processing unit or CPU 97A, which in the preferred embodiment, is a microprocessor. The CPU 97A may also be a microprocessor or any other processor which can be utilized in connection with any wearable devices. The CPU 97A is specially programmed and/or specially configured to perform all of the functionality described herein as being performed by the wearable device 97.

The wearable device 97 also includes a random access memory (RAM) device(s) 97B and a read only memory (ROM) device(s) 97C, each of which is connected to the CPU 97A, and a user input device 97D, for entering data or information and/or instructions and/or commands into the wearable device 97, which can include any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, or instructions and/or commands, to be entered into the wearable device 97. The input device(s) 97D is/are also connected to the CPU 97A.

The wearable device 97 can also include a display device 97E for displaying data and/or information to a user. The wearable device 97 also includes a transmitter(s) 97F, for transmitting signals and/or data and/or information to any one or more of the central processing computer(s) 10, the user communications devices 20, the sport governing body computers 30, the governmental entity computers 40, the gaming facility computers 50, the content provider computers 60, the information/analytics provider computers 70, the social network computers 80, the financial institution computers 90, the escrow agent computers 90, and/or any other wearable devices 97, which may be utilized in conjunction with the apparatus 100 of the present invention.

The wearable device 97 also includes a receiver 97G, for receiving signals and/or data and/or information from any one or more of the central processing computer(s) 10, the user communication devices 20, the sport governing body computers 30, the governmental entity computers 40, the gaming facility computers 50, the content provider computers 60, the information/analytics provider computers 70, the social network computers 80, and financial institution computers 90, the escrow agent computers 90, and/or any other wearable devices 97, which may be utilized in conjunction with the apparatus 100 of the present invention.

The wearable device 97 can also include a database(s) 97H which can contain and/or can be linked to any of the data and/or information described herein as being stored in the database 10H. The database 97H can also contain and/or include data and/or information which may be required, and/or which may be desired, for performing any of the functionality and/or processing routines described herein as being performed by the wearable devices 97 and/or the apparatus 100. In a preferred embodiment, the database 97H can also include any of the data and/or information described herein as being contained in the respective databases of the central processing computer(s) 10, the user communication devices 20, the sport governing body computers 30, the governmental entity computers 40, the gaming facility computers 50, the content provider computers 60, the information/analytics provider computers 70, the social network computers 80, the financial institution computers 90, and the escrow agent computers 95. The database 97H can also be connected to the CPU 97A.

The wearable device 97 also includes an output device 97I for outputting any of the data, information, and/or reports, described herein as being generated by or via the wearable device 97. In the preferred embodiment, the output device 97I can be a printer, a display, a transmitter, a modem, and/or any other device which can be used to output data and/or information of any kind or type.

The wearable device 97, in a preferred embodiment, also includes wearable device equipment system(s) 97J which can be utilized to measure biological, physiological, or any other data and/or information related to the athlete or player or the athlete's or player's performance. For example, the equipment system(s) 97 can be, or can include, equipment for measuring pulse rate, heart rate, blood pressure, blood-sugar level, glucose-sugar level, speed of movement, steps taken, distance traveled, or any other data and/or information regarding the athlete or player, or the performance and/or movements of the athlete or player during a game, match, or competition. The wearable device equipment system(s) 97J can also include a gyroscope or other device which can measure and record information regarding three-dimensional movements of an athlete or player.

The wearable device 97 also includes a video and/or audio recording device(s) 95K which can include a camera and/or a video recording device for recording pictures or video and/or video clips and/or a microphone or an audio recording device for recording audio or audio clips which can be recorded by, and/or transmitted live, by or from the wearable device 97, or which can be recorded by, and stored at or in, the wearable device 97 for transmission by or from the wearable device 97 during a game, match, or competition, or at a later time. The video and/or audio recording device(s) 95K can also be utilized to facilitate one-way broadcasts from the wearable device 97, and/or can be utilized to facilitate video conferencing, video chatting, and/or audio conferencing, and/or video and audio conferencing, between any of the herein-described users, individuals, parties, or entities, who or which utilize the apparatus 100 and method of the present invention. In this regard, a user of the wearable device 97 can engage in telephone calls and video conferencing calls via the same. The user of the wearable device 97 can also use the video and/or audio recording device(s) 95K to record and broadcast or transmit content via its transmitter 97F.

With reference to FIG. 12, the wearable device 97, in the preferred embodiment, also includes a global positioning device 97L for determining the position or location of the wearable device 97. In a preferred embodiment, the global positioning device 97L can be utilized to determine the position or location of the wearable device 97 and can be utilized to track and measure an amount of movement, and/or or a distance traveled, and/or a speed of movement or travel, by an athlete or player during a game, match, or competition.

For example, the wearable device 97 can utilize the global positioning device 97L in determining an athlete's or a player's speed of movement, direction of travel, frequency of movements, and/or total distance traveled, during a game, match, or competition.

The apparatus 100 of the present invention can be utilized in a number of various preferred embodiments in order to allow individuals or users, or groups of individuals or users, to place bets on sporting events, games, matches, activities, competitions, or tournaments, of all types or kinds, via the apparatus 100. Individuals or users can also watch and/or listen to a sporting event, game, match, activity, competition, or tournament, via an electronic forum, chat room, or webpage, with others or while alone, communicate with other individuals or users participating in the electronic forum or chat room, place bets via the electronic forum, chat room, or webpage, obtain information via the apparatus 100, electronic forum, chat room, or webpage, and/or report instances of suspected game fixing, match fixing, or cheating, via the apparatus 100, electronic forum, chat room, or webpage.

The apparatus 100 of the present invention can also be utilized by an individual or user to communicate with, and/or obtain information from, a sports governing body, governmental entity, gaming facility, or content provider, before, during, or after, a sporting event, game, match, activity, competition, or tournament, obtain analytics information from a sports information and/or analytics provider regarding a sporting event, game, match, activity, competition, or tournament, obtain betting odds information regarding a sporting event, game, match, activity, competition, or tournament, and/or obtain data and/or information from wearable devices worn by players or athletes during sporting events, games, matches, activities, competitions, or tournaments.

The apparatus 100 of the present invention can also be utilized in order to obtain services from a financial institution and/or an escrow agent or escrow service before, during, or after, a sporting event, game, match, activity, competition, or tournament, as well as for placing bets or bet monies in escrow for safekeeping.

The apparatus 100 of the present invention can also be utilized in order to allow an individual or user to watch and/or listen to sporting events, games, matches, activities, competitions, or tournaments, with other individuals or users, who may be friends of the individual or user or members of the individual's or user's social network or social networking group, and to place bets while watching or listening to the sporting events, games, matches, activities, competitions, or tournaments.

The apparatus 100 of the present invention can also be utilized by an individual or user to watch and/or listen to a sporting event, game, match, activity, competition, or tournament, using 360 degree video, virtual reality (VR), or augmented reality (AR), or any combination of same.

The apparatus 100 of the present invention can be utilized in connection with sports betting activities for any and all types or kinds of sporting events, games, matches, activities, competitions, or tournaments. In this regard, and without any limiting the use the use of the apparatus 100 of the present invention in any way, the apparatus 100 can be utilized to engage in sports betting activities and/or any sports betting-related activities involving football games, soccer games, baseball games, basketball games, ice hockey games, field hockey, American football games, cricket games or matches, lacrosse games, tennis matches, car races, track and field events, contests, or tournaments, swimming tournaments, dividing tournaments, boxing matches, martial arts matches, mixed martial arts matches, curling matches, bobsledding matches, as well as any and/or all variations of any sporting, athletic, gymnastic, or any other games, matches, activities, competitions, or tournaments, for which a bet can be placed. The apparatus 100 of the present invention can also be utilized to place bets on Esports (or "esports") games, matches, or competitions, and/or any video games, matches, or competitions. The apparatus 100 of the present invention can also be utilized to place bets on any team or club, as well as individual, sporting events, games, matches, activities, competitions, or tournaments, of any type or kind.

In a preferred embodiment, the apparatus 100 of the present invention can also be utilized to allow an individual or user to search for, find, and/or be notified regarding, a sporting event, game, match, activity, competition, or tournament, on which he or she can place a bet, allow the individual or user to place a bet on the respective sporting event, game, match, activity, competition, or tournament, allow the individual or user to watch and/or listen to the sporting event, game, match, activity, competition, or tournament, via the apparatus 100, an electronic forum, a chat room, or a webpage, either alone or with other individuals or users, and allow the individual or user to engage in, or participate in, a number of various activities.

The apparatus 100 can provide an electronic forum or chat room (not shown), or a webpage, which can provide an individual or user with a video screen via which he or she can watch and/or listen to a sporting event, game, match, activity, competition, or tournament. The apparatus 100, the electronic forum, the chat room, or the webpage can also provide the individual or user with sports betting and other data and/or information, which can be continuously updated, and allow the individual or user to place bets, communicate with others, and engage in a wide variety of activities described herein.

Figure 13A:
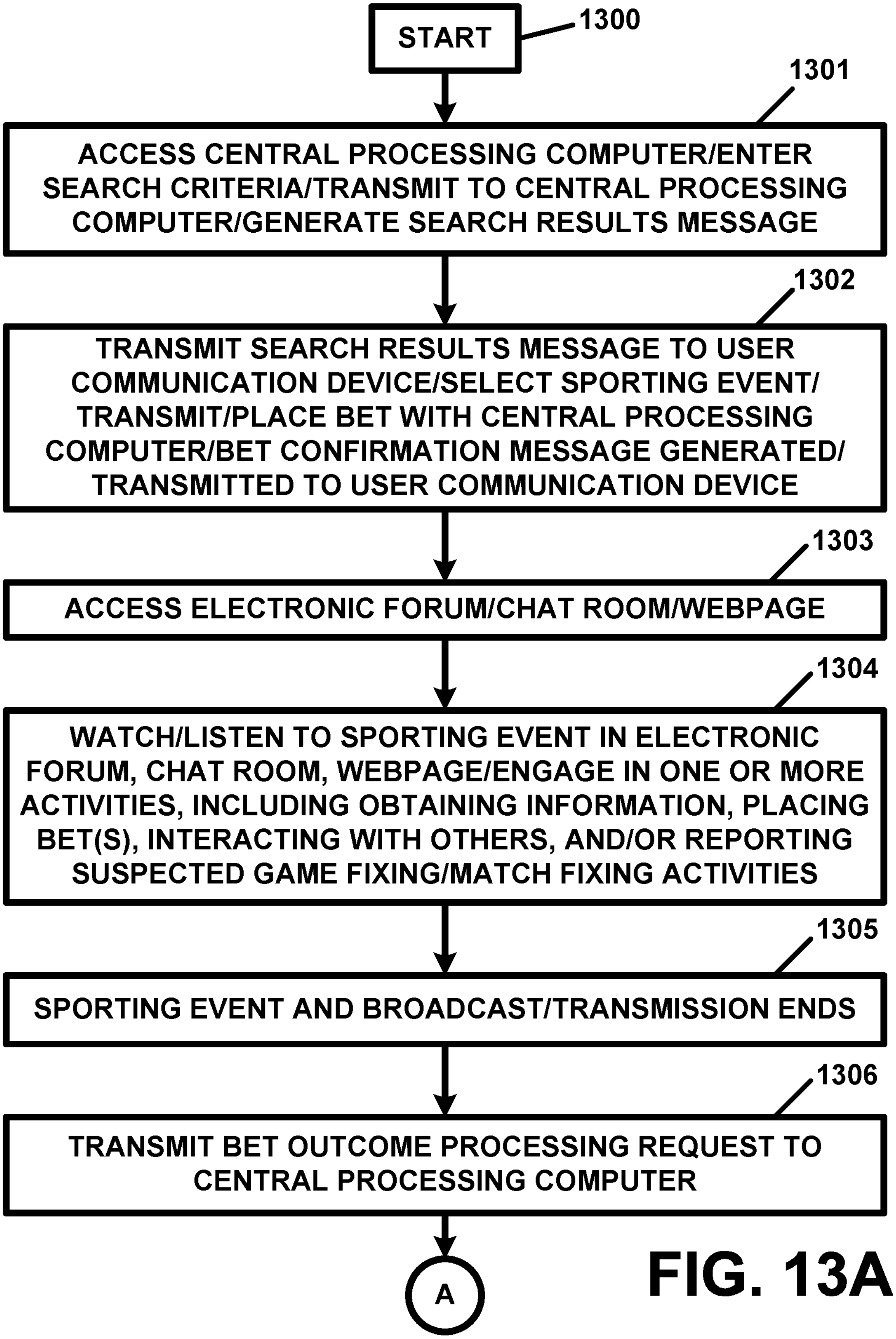
FIGS. 13A and 13B illustrate a preferred embodiment method for utilizing the apparatus and methods of the present invention, in flow diagram form.
Figure 13B:
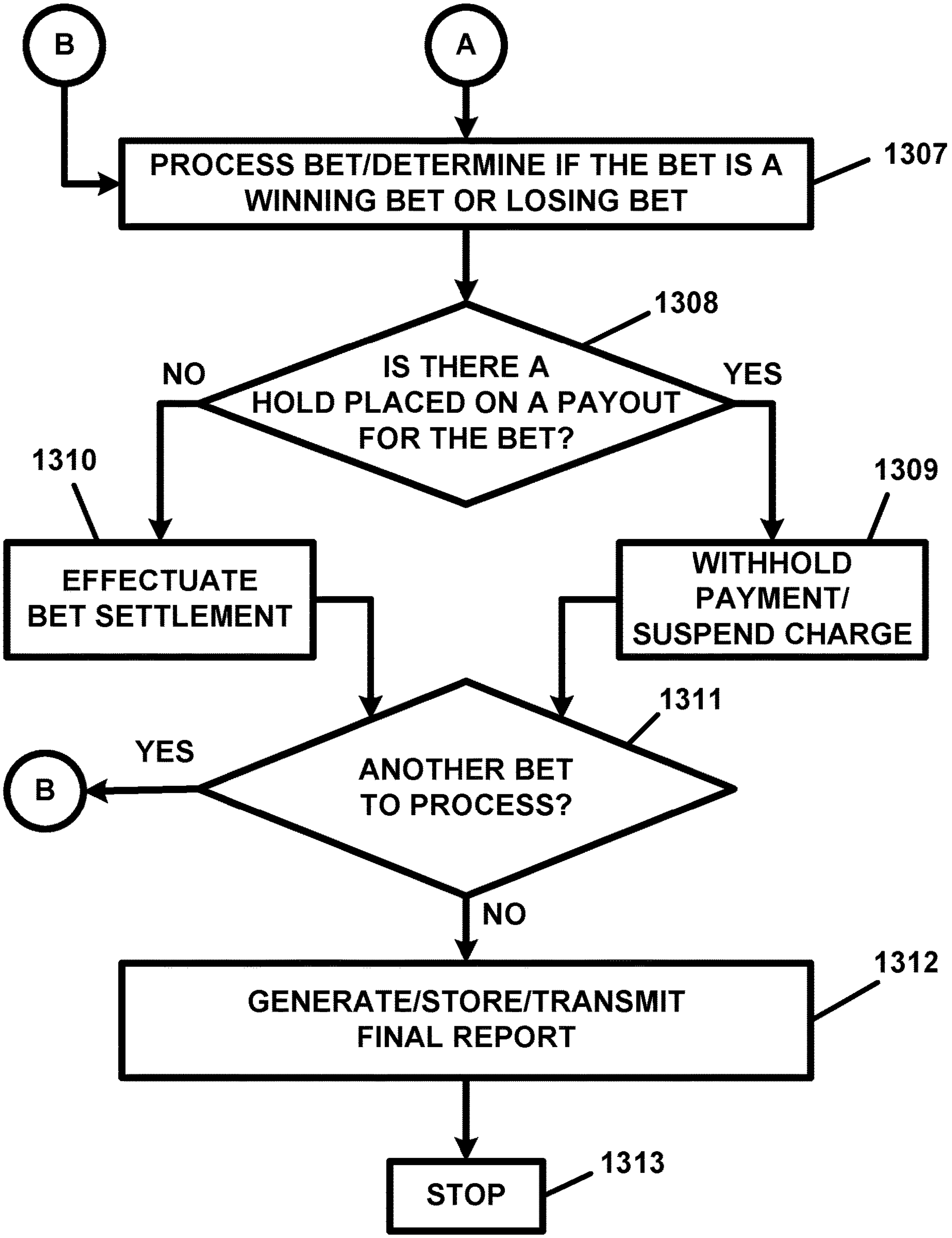

FIGS. 13A and 13B illustrate a preferred embodiment method for utilizing the apparatus 100 and methods of the present invention, in flow diagram form. With reference to FIGS. 13A and 13B, the operation of the apparatus 100 commences at step 1300. At step 1301, the individual or user can access the central processing computer 10 by using the user communication device 20. In a preferred embodiment, the central processing computer 10 can be operated and/or maintained by any on-line sports betting, gaming, or gambling, company or entity of any type of kind. In a preferred embodiment, the individual or user can utilize any user communication device 20 in order to access the central processing computer 10.

In another preferred embodiment of FIGS. 13A and 13B, the individual or user can utilize a headset as, or in conjunction with, the user communication device 20. In a preferred embodiment, whenever the individual or user uses a headset as, or in conjunction with, the user communication device 20, the individual or user can utilize the microphone of the video and/or audio recording device(s) 20J of the communication device 20 and associated voice recognition software in order to verbally input data, information, commands, or instructions, into the user communication device 20, and the individual or user can also utilize the same to verbally communicate with the central processing computer(s) 10, the sport governing body computers 30, the governmental entity computers 40, the gaming facility computers 50, the content provider computers 60, the information/analytics provider computers 70, the social network computers 80, the financial institution computers 90, the escrow agent computers 95, and the wearable devices 97.

With reference once again to step 1301, the individual or user can search for a sporting event, game, match, activity, competition, or tournament, on which he or she can place a bet. At step 1301, the individual or user can, using the user communication device 20 in communication with the central processing computer 10, search for the sporting event, game, match, activity, competition, or tournament, on which he or she wants to place a bet, or the individual or user can search for and locate a sporting event, game, match, activity, competition, or tournament, by searching for same via the central processing computer 10. In instances when the individual or user is in search of a sporting event, game, match, activity, competition, or tournament, on which to place a bet, the individual or user can search for the same by searching by sport, by country or region in the world in which the sporting event, game, match, activity, competition, or tournament, is being held, by team or teams playing in or participating in the sporting event, game, match, activity, competition, or tournament, by player or players playing in or participating in the sporting event, game, match, activity, competition, or tournament, by betting odds placed on the sporting event, game, match, activity, competition, or tournament, or by any other criteria. At step 1301, after entering the search criteria into the user communication device 20, the search criteria can be transmitted to, and received by, the central processing computer 10. At step 1301, the central processing computer 10 can receive and process the search criteria and can generate a search results message containing information regarding one or more sporting events, games, matches, activities, competitions, or tournaments, on or for which a bet(s) can be placed.

At step 1302, central processing computer 10 can transmit the search results message to the user communication device 20. At step 1302, user communication device 20 can receive the search results message. At step 1302, the individual or user can review the information contained in the search results message and select the sporting event, game, match, activity, competition, or tournament, on or for which he or she desires to place a bet. In a preferred embodiment, the individual or user, at step 1302, can, but not need, access the information/analytics provider computer 70 in order to obtain any data and/or information, or analytics data and/or information, which he or she may want to obtain and review in advance of placing any bet.

At step 1302, the individual or user can also request that the information/analytics provider computer 70 transmit updated data and/or information, including, but not limited to, analytics data and/or information, information regarding betting odds or betting odds changes, information regarding new betting opportunities, and/or any other data and/or information regarding the sporting event, game, match, activity, competition, or tournament, for which the individual or user wants to place a bet, or data and/or information regarding any teams and/or players or participants in or of same, to the user communication device 20, before the start of, during, or after, the selected sporting event, game, match, activity, competition, or tournament. At step 1302, the individual or user can also request to be notified regarding, and be provided with, data and/or information, including, but not limited to, analytics data and/or information, data and/or information regarding betting odds or betting odds changes, information regarding new betting opportunities, and/or any other data and/or information regarding any other sporting sporting events, games, matches, activities, competitions, or tournaments, or any teams, players, or participants, involved in same, in which the individual or user may be interested.

At step 1302, the individual or user can place a bet on the selected sporting event, game, match, activity, competition, or tournament. In a preferred embodiment, the individual or user can utilize is or her sports betting account, gaming account, or gambling account, or any appropriate or suitable payment identifier, in order to place, and make payment for, the bet. In another preferred embodiment, the individual or user can provide a payment identifier such as, but not limited to, a credit account number, a credit card account number, a debit account number, a debit card account number, a charge account number, a charge card account number, a savings account number, a checking account number, or any other payment account number.

In a preferred embodiment, the individual or user, at step 1302, can also access his or her sports betting account, gaming account, or gambling account, by accessing the same via the financial institution computer 90, of the financial institution which services the respective account, in order to ascertain the status of the same or to make payment for the bet by utilizing the same. In another preferred embodiment, the individual or user can also instruct the central processing computer 10 to place his or her bet into an escrow account in order to protect the individual or user in instances of game fixing, match fixing, or cheating, should such conduct be reported or discovered before, during, or after, the selected sporting event, game, match, activity, competition, or tournament. At step 1302, the individual or user can also instruct that the escrow computer 95 not make payment of any lost bet until after a certain and/or predefined time period has elapsed, so that the individual or user can be protected against any game fixing, match fixing, or cheating, activities.

For example, if the apparatus 100 is utilized in connection with practices designed to identify and combat game fixing, match fixing, or cheating, activities, then the individual or user, or any entities who or which utilize the apparatus 100 of the present invention, can utilize the escrow agent computer 95 so as to hold any or all bets in escrow for a certain amount of time, which can be any pre-selected time period, such as, but not limited to, one hour, two hours, six hours, twelve hours, twenty four hours, or any other desired time period, so as to provide operators of the apparatus 100, and any other individuals to entities, with sufficient opportunity to ensure that no game fixing, match fixing, or cheating, activities have occurred, with regards to a sporting event, game, match, activity, competition, or tournament, which could defraud the individual or user or any other individuals or users of the apparatus 100.

The above-described features of the apparatus 100, including the use of the escrow agent computer 95 to hold and keep a placed bet in escrow, can provide a safeguard against game fixing, match fixing, or cheating, activities and provide a more secure sports betting environment. At step 1302, the central processing computer 10 can receive and process the information regarding the bet and store the information regarding the bet in the database 10H. At step 1302, the user communication device 20 used by the individual or user can also store the information regarding the bet in the database 20H. The bet, described as being placed above, at step 1302, can be referred to herein as the "outcome bet".

At step 1302, the central processing computer 10 can also generate a bet confirmation message containing information regarding the bet that was placed, the date and time of the bet, the amount of the bet, the date and time of the selected sporting event, game, match, activity, competition, or tournament, on or for which the bet was placed, and a link to an electronic forum, a chat room, or a webpage of a website, in or via which the individual or user can watch and/or listen to the sporting event, game, match, activity, competition, or tournament, in or via which the individual or user can interact with other individuals or users in a group or social networking environment, and/or in or via which the individual or user can engage in any of the other herein-described activities.

In a preferred embodiment, the central processing computer 10 can be specially programmed and/or specially configured to provide multiple broadcasts simultaneously of the sporting event, game, match, activity, competition, or tournament, to any number of different and distinct social networking groups in or via any number of electronic forums, chat rooms, or webpages of websites, allow individuals or users to watch and/or listen to the sporting event, game, match, activity, competition, or tournament, with others, with friends or acquaintances, with social network group members, or while alone, and allow individuals or users to communicate and/or interact with other individuals or users or with one another, engage in a video conference or video chat with others or with one another, post messages, comments, and other postings, place additional bets on the sporting event, game, match, activity, competition, or tournament, place bets on other sporting events, matches, games, competitions, or tournaments, request and be provided with data and/or information or analytical data and/or information for the sporting event, game, match, activity, competition, or tournament, or for another sporting event, game, match, activity, competition, or tournament, and report instances of game fixing, match fixing, or cheating.

In instances in which the individual or user initially selected to watch and/or listen the sporting event, game, match, activity, competition, or tournament, by himself or herself, the individual or user can, at any time before or during the sporting event, game, match, activity, competition, or tournament, join any available electronic forum or chat room provided in the betting confirmation message. Links to any such electronic forums or chat rooms can also be provided along with a broadcast of the sporting event, game, match, activity, competition, or tournament provided on a website.

At step 1302, the bet confirmation message can be transmitted from the central processing computer 10 to the user communication device 20 used by the individual or user to place the bet, and/or the bet confirmation message can also be transmitted in or as an email message and be transmitted to the email server servicing the individual's or user's email account so that the individual or user can access the bet confirmation message from any user communication device 20. The betting confirmation message can also be transmitted, as an instant message or as an SMS message, to the user communication device 20 or to another user communication device 20 which can be used by the individual or user to receive the same and to access the sporting event, game, match, activity, competition, or tournament or the electronic forum, chat room, or webpage.

In another preferred embodiment, the individual or user can program, or request, at the time of the placing of the bet on the sporting event, game, match, activity, competition, or tournament, or upon registering an account with the apparatus 100 or the central processing computer 10, that the central processing computer 10 generate a sporting event message, containing information or containing reminder information regarding the sporting event, game, match, activity, competition, or tournament, on which the bet, or a bet, has been placed by the individual or user, and transmit the sporting event message to any user communication device 20 used by the individual or user, as a text message, as an instant message, or as an SMS message, or in or as an email message, transmitted to the email server servicing the individual's or user's email account, prior to the start of the sporting event, game, match, activity, competition, or tournament. In a preferred embodiment, the sporting event message can contain all of the information and link or links described herein as being included in the betting confirmation message, and can serve to remind the individual or user about the sporting event, game, match, activity, competition, or tournament. In a preferred embodiment, the sporting event message can be transmitted and/or retransmitted multiple times and/or at pre-defined time intervals in advance of the sporting event, game, match, activity, competition, or tournament, to serve to remind the individual or user of the same and provide the individual or user with a sufficient amount of time to be ready to watch and/or listen to the same.

At step 1303, the individual or user, prior to the start of the sporting event, game, match, activity, competition, or tournament, or at any time thereafter, can access the respective electronic forum, chat room, or webpage of the website, in or via which the individual or user can watch and/or listen to the sporting event, game, match, activity, competition, or tournament, and, in the case of the individual or user accessing the electronic forum or chat room, interact with other individuals or users or interact with individuals or users in the individual's or user's social networking group or in the individual or user's group of friends, or, in the case of the webpage of the website, watch and/or listen to the sporting event, game, match, activity, competition, or tournament, by himself or herself. Thereafter, the individual or user can watch and/or listen to the respective sporting event, game, match, activity, competition, or tournament, and/or interact with any other individual(s) or user(s), and/or engage in any of activities described herein.

At step 1304, the individual or user can watch and/or listen to the sporting event, game, match, activity, competition, or tournament, which is the subject of the bet. In a preferred embodiment, the sporting event, game, match, activity, competition, or tournament, can be transmitted, broadcast, or "streamed" from or via a gaming facility computer 50 and/or a content provider computer 60 located at the venue of the sporting event, game, match, activity, competition, or tournament, to the central processing computer 10, or directly to the individual's or user's user communication device 20. In this regard, the sporting event, game, match, activity, competition, or tournament, which is the subject of the bet, can be transmitted, broadcast, or "streamed" to the user communication device 20 from either the central processing computer 10 or from the gaming facility computer 50 or the content provider computer 60 located at the venue of the sporting event, game, match, activity, competition, or tournament.

In a preferred embodiment, the respective electronic forum, chat room, of website, can transmit and provide, to the user communication 20, for display via the display device 20E of same, a live video or a streaming video and/or audio of the sporting event, game, match, activity, competition, or tournament, data and/or information and/or analytics data and/or information regarding the respective teams, players, or other competitors involved in or participating in the sporting event, game, match, activity, competition, or tournament, a listing of all available bets and their respective odds, and a listing of all private bets offered by any of the individuals or users who may be watching and/or listening to the sporting event, game, match, activity, competition, or tournament, via the respective electronic forum or chat room. In a preferred embodiment, in instances where the electronic forum or chat room is being used, any and all comments, messages, or postings, posted by any of the individuals or users who may be watching and/or listening to the sporting event, game, match, activity, competition, or tournament, via the respective electronic forum or chat room can also be displayed via the display device 20E of the user communication device 20. In a preferred embodiment, the individual or user can also engage in video conference calls or video chats with other individuals or users via the respective electronic forum or chat room. In a preferred embodiment, the individual or user watching and/or listening to the sporting event, game, match, activity, competition, or tournament, via the webpage of the website can also post comments in a comments section on the website.

In a preferred embodiment, the individual or user can also watch and/or listen to the sporting event, game, match, activity, competition, or tournament, in 360 degree video, in virtual reality (VR), or in augmented reality (AR). In a preferred embodiment, any data and/or information, and any functionalities and/or individual or user activities, described herein as being provided in and via the respective electronic forum, chat room, or website, can also be provided to the individual or user in and via a 360 degree video, a virtual reality (VR), or an augmented reality (AR), presentation and experience. In a preferred embodiment, the individual or user can download, from the central processing computer 10 to his or her user communication device, any needed or desired 360 degree video, virtual reality (VR), and/or augmented reality (AR), software or software applications (also referred to as "apps"). Any such downloading of any 360 degree video, virtual reality (VR), and/or augmented reality (AR), software or apps can take place during step 1301.

At step 1304, the individual or user can watch and/or listen to the sporting event, game, match, activity, competition, or tournament, via the respective electronic forum, chat room, or website. In the preferred embodiment, the respective electronic forum, chat room, or webpage of the website, via which the sporting event, game, match, activity, competition, or tournament, is being watch and/or listen to, can be specially designed to allow the individual or user, or any other individuals or users, to watch and/or listen to the sporting event, game, match, activity, competition, or tournament, and to communicate with other individuals or users in the electronic forum or chat room.

In a preferred embodiment, the respective electronic forum, chat room, or webpage of the website, on, in, or via, which the sporting event, game, match, activity, competition, or tournament, can be watched and/or listened to can also be specially designed and/or specially configured to, simultaneously with providing the sporting event, game, match, activity, competition, or tournament, allow the individual or user, or any other individuals or users, to post comments or messages regarding the sporting event, game, match, activity, competition, or tournament, and/or to communicate with any other individual(s) or user(s) watching and/or listening to the sporting event, game, match, activity, competition, or tournament, via the electronic forum or chat room, and/or to communicate with the central processing computer 10, and/or with any of the sport governing body computers 30, the governmental entity computers 40, the gaming facility computers 50, the content provider computers 60, the information/analytics provider computers 70, the social network computers 80, the financial institution computers 90, the escrow agent computers 95, and the wearable devices 97, described herein as being utilized with the apparatus 100.

In the preferred embodiment, the respective electronic forum, chat room, or webpage of the website, on, in, or via, which the sporting event, game, match, activity, competition, or tournament, can be watched and/or listened to can also be specially designed and/or specially configured to, simultaneously with providing the sporting event, game, match, activity, competition, or tournament, allow the individual or user, or any other individuals or users, to view data and/or information and/or analytics and/or information regarding the sporting event, game, match, activity, competition, or tournament, and/or the teams, players, or participants, participating in the same, to view information obtained by of from any wearable devices 97 worn or used by any players or participants in the sporting event, game, match, activity, competition, or tournament, and/or to view any analytics data and/or information relating to any data and/or information obtained by or from any of the wearable devices 97 during the sporting event, game, match, activity, competition, or tournament.

In the preferred embodiment, the respective electronic forum, chat room, or webpage of the website, on, in, or via, which the sporting event, game, match, activity, competition, or tournament, can be watched and/or listened to can also be specially designed and/or specially configured to, simultaneously with providing the sporting event, game, match, activity, competition, or tournament, allow the individual or user, or any other individuals or users, to view information regarding available bets being offered by various book makers or other gaming or gambling entities or individuals or users, to view private bets being offered by other individuals or users participating in the electronic forum or chat room, and/or to view private bets being offered by other individuals or users who or which utilize the apparatus 100 and method of the present invention.

In the preferred embodiment, the respective electronic forum, chat room, or webpage of the website, on, in, or via, which the sporting event, game, match, activity, competition, or tournament, can be watched and/or listened to can also be specially designed and/or specially configured to, simultaneously with providing the sporting event, game, match, activity, competition, or tournament, allow the individual or user, or any other individuals or users, to place a bet or any number of bets on the outcome of the sporting event, game, match, activity, competition, or tournament, at any time prior to the conclusion of the sporting event, game, match, activity, competition, or tournament, and/or to place a bet or any numbers of bets on any plays, calls, occurrences, or events, which occur during the game (hereinafter referred to as "game events", "match events", or "micro-events"). Game events, match events, or micro-events, can include, for example, but are not limited to, any play, activity, action by a team, action by a player or participant, penalty call, type of penalty, infraction, type of infraction, violation, type of violation, scoring play, type of play, type of activity engaged in, a score at a particular time of the sporting event, game, match, activity, competition, or tournament, such as, for example, the score at the end of a quarter or at the half-time, or at any other specified time in or during the sporting event, game, match, activity, competition, or tournament, and/or any other play, activity, and/or call made by a game or match official, referee, or umpire, which can be the subject of a bet. Any bets on game events or match event can also be referred to herein as "game event bets" or "match event bets".

Private bets, which can be, or which can include, outcome bets or game event bets or match event bets, and which can be offered by the individual or user or by any other individual(s) or user(s), can also be offered via the electronic forum, chat room, or the webpage of the website. Betting odds for any bets described herein, as well as continuous updates to any betting odds for any of the bets described herein, can also be provided via the electronic forum, chat room, or the webpage of the website.

At step 1304, the individual or user, or any other individual(s) or user(s) watching and/or listening to the sporting event, game, match, activity, competition, or tournament, can place any number and/or types of bets, including outcome events and bets on game events ("game event bets) or match events ("match event bets") which can or may take place during the course of the sporting event, game, match, activity, competition, or tournament. Each time a bet is placed by the individual or user or by any other individual or user, the central processing computer 10 can process and store information regarding the bet placed, the individual or user who placed the bet, the sporting event, game, match, activity, competition, or tournament, on or during which the bet was placed, the amount of the bet, the time of the bet, the date of the bet, any counterparty to the event, the sports betting account, gaming account, or gambling account, used in placing the bet, and/or any information regarding whether or not any bet monies were instructed to be placed in escrow with the escrow agent computer 95, and/or any other information regarding the bet.

At step 1304, the individual or user, or any other individual(s) or user(s) watching and/or listening to the sporting event, game, match, activity, competition, or tournament, can request any data and/or information and/or analytics data and/or information at any time before, during, or after, the sporting event, game, match, activity, competition, or tournament. Any data and/or information and/or any analytics data and/or information requested, or any data and/or information and/or analytics data and/or information which is provided without request, can be transmitted from the information/analytics provider computer 70 and/or from the central processing computer 10 and can be viewed in or via the electronic forum, chat room, or webpage of the website.

At step 1304, the individual or user, or any other individual(s) or user(s) watching and/or listening to the sporting event, game, match, activity, competition, or tournament, can place any number of posts or comments in the electronic forum, chat room, or webpage of the website. At step 1304, the individual or user, or any other individual(s) or user(s) watching and/or listening to the sporting event, game, match, activity, competition, or tournament, can place any number of outcome bets, or game event bets or match event bets, before or during the sporting event, game, match, activity, competition, or tournament.

In a preferred embodiment, the individual or user can, at step 1304 or at any other time, place any bet while in, or via, the respective electronic forum, chat room, or webpage of the website, or via the central processing computer 10. In all instances when the individual or user places any bet, information regarding or pertaining to the bet can be transmitted from the user communication device 20 and can be received and processed by the central processing computer 10. At step 1304, each time a bet is placed by the individual or user, information regarding the same can be stored in his or her sports betting account, gaming account, or gambling account, which information can be stored and maintained at the central processing computer 10, the individual's or user's user communication device 20, the financial institution computer 90, and/or the escrow agent computer 95.

In a preferred embodiment, the central processing computer 10 can transmit information regarding any and/or all of the individual's or user's bets which are placed on the sporting event, game, match, activity, competition, or tournament, as well as any information regarding any and/or all of the individual's or user's bets which are placed on any other sporting event(s), game(s), match(es), activities, competition(s), or tournament(s), along with the playing time(s) of same, which might be occurring concurrently with, or which might overlap in time in any way with, the sporting event, game, match, activity, competition, or tournament watched and/or listened to. In another preferred embodiment, in instances when the individual or user has bet on, seeks to bet on, or simply wants to watch and/or listen to, another sporting event, game, match, activity, competition, or tournament, the individual or user can request a link to the respective electronic forum, chat room, or website, on or via which that other sporting event, game, match, activity, competition, or tournament can be watched or listened to.

With reference once again to FIGS. 13A and 13B, at any time during the sporting event, game, match, activity, competition, or tournament, the central processing computer 10 can, at step 1304, provide, via the respective electronic forum, chat room, or website, for each bet placed by the individual or user, an indication as to whether the individual or user is winning the bet or losing the bet at that point in time or at that point in the sporting event, game, match, activity, competition, or tournament. For example, information regarding a bet which is a winning bet at that point in time, or at that point in the sporting event, game, match, activity, competition, or tournament, can be provided or displayed in one color, such as, for example, green, while information regarding a bet which is losing bet at that point in time, or at that point in the sporting event, game, match, activity, competition, or tournament, can be provided or displayed in another color, such as, for example, red. In instances in which it cannot be determined whether a bet is a winning or a losing bet, that bet can be provided or displayed in a third and neutral color such as, for example yellow, white, or any other appropriate color.

In a preferred embodiment, at step 1304, the central processing computer 10 can also provide, via the electronic forum, chat room, or webpage of the website, and during the sporting event, game, match, activity, competition, or tournament, information regarding available new bets, betting odds for same, and/or any new or updated betting odds for bets corresponding to the sporting event, game, match, activity, competition, or tournament, as well as the availability of bets and/or betting odds for same which can provide the individual or user with an opportunity to increase his or her winnings, minimize his or her losses, or obtain any hedge position to protect his or her interests regarding any bets he or she has already placed. The individual or user can place any bet or bets using this above-described information. In a preferred embodiment, at step 1304, the central processing computer 10 can also provide, via the electronic forum, chat room, or webpage of the website, and during the sporting event, game, match, activity, competition, or tournament, information regarding a gaming insurance product or any number of gaming insurance products, and/or a gaming derivative product or any number of gaming derivative products, which the individual or user can purchase in order to minimize his or her losses.

If the individual or user chooses to purchase any gaming insurance product(s) or any gaming derivative product(s), the individual or user can enter the purchase request(s) at step 1304 and the same can be transmitted to the central processing computer 10 for processing and information storage regarding the same. Thereafter, any information regarding the individual's or user's purchase of any gaming insurance product(s) or any gaming derivative product(s) can be stored at the central processing computer 10 and, in particular, in the database 10H of same and in the individual's or user's sports betting account, gaming account, or gambling account.

Any information regarding any bets placed by the individual or user can be displayed to the individual or user in an appropriate location or section of the electronic forum, chat room, or webpage of the website. Any information regarding any gaming insurance product(s) or any gaming derivative product(s) can also be displayed to the individual or user in an appropriate location or section of the electronic forum, chat room, or webpage of the website.

In a preferred embodiment, at step 1304, the individual or user, can also decide to sell his position in a bet, or purchase another individual's or user's position in a bet. In such instances, bets available for sale can be displayed to the individual or user in an appropriate location or section of the electronic forum, chat room, or webpage of the website.

In a preferred embodiment, at step 1304, the individual or user, as well any other individual(s) or user(s) watching and/or listening to the sporting event, game, match, activity, competition, or tournament, can report suspected instances of match fixing, game fixing, cheating, play irregularities, officiating irregularities, or any other instances which may call into question the integrity of the sporting event, game, match, activity, competition, or tournament. Information, postings, or comments, can be posted by the individual or user, or any other individual(s) or user(s) watching and/or listening to the sporting event, game, match, activity, competition, or tournament, in a section of the electronic forum, chat room, or webpage of the website, dedicated for same, and the information, postings, or comments, can be time stamped. This allows for information, postings, or comments, relating to the integrity of the respective sporting event, game, match, activity, competition, or tournament, to be posted by the individual or user, and by any other individual(s) or user(s) watching and/or listening to the respective sporting event, game, match, activity, competition, or tournament, during the same. The posted information, postings, or comments can be transmitted to the central processing computer 10 for dissemination to the appropriate entities and/or authorities.

In this regard, the apparatus 100 of the present invention can be utilized to obtain and report instances of suspected game fixing, match fixing, or cheating, as reported by the individuals or users who use the apparatus 100 of the present invention to watch and/or listen to sporting events, games, matches, activities, competitions, or tournaments, on which they have placed bets.

The central processing computer 10 can receive the submitted information or comments received from the individual or user, or from any other individuals or users, store the same in a file associated with the sporting event, game, match, activity, competition, or tournament, and automatically transmit the same to the sport governing body computer 30 of the sport governing body for the sport associated with, or which governs, the sporting event, game, match, activity, competition, or tournament, or the league, team, players, or participants, participating in the sporting event, game, match, activity, competition, or tournament. In this manner, the apparatus 100 can be utilized to report instances of suspected game fixing, match fixing, or cheating, activity, or any other issues pertaining to game integrity or match integrity, to the sport governing body computer 30 of the respective sport. In this regard, an international federation, the International Olympic Committee, a nation federations, and/or any national Olympic Committee, can be apprised of the suspected game fixing, match fixing, or cheating, activity, or any other game integrity or match integrity issue.

The central processing computer 10 can also automatically transmit information regarding suspected game fixing, match fixing, or cheating, activity, or any other game integrity or match integrity issue, to the respective governmental entity computer 40 for each government which may have an interest in receiving the same. In this regard, each government having an interest in receiving this information can be apprised of the suspected game fixing, match fixing, or cheating, activity, or any other game integrity or match integrity issue.

In a preferred embodiment, at step 1304, the individual or user, as well any other individuals or users watching and/or listening to the sporting event, game, match, activity, competition, or tournament, can also report any complaints regarding the placing of any bets, the payment or satisfaction regarding any bets, and/or any suspected betting fraud, and/or any other problems encountered in using via the apparatus 100. Information regarding any such complaints can be transmitted from the user communication device 20 to the central processing computer 10.

In a preferred embodiment, if the individual or user is utilizing a headset as or with the user communication device 20, and any all data or information inputs, postings, comments, information requests, placing of bets, or reportings of any kind, can be input verbally via the microphone of the video and/or audio recording device(s) 20J of the user communication device 20. Any voice inputs can also translated into text and displayed in the electronic forum, chat room, or webpage of the website. The present invention can also be equipped with any needed software for translating text from one language into another language and/or translating verbal information into text and then translating the text into another language.

In a preferred embodiment, any and all interactions between the individual or user and/or any other individuals or users which take place in or via the electronic forum, chat room, or webpage of the website, can be recorded and stored by and at the central processing computer 10 in a file associated with the electronic forum, chat room, or webpage of the website, and/or in a file associated with the sporting event, game, match, activity, competition, or tournament.

In a preferred embodiment, at step 1304, any sport governing body computer 30, any governmental entity computer 40, any gaming facility computer 50, and/or any escrow agent computer 95, can be used by an authorized operator of same to monitor any and/or all activity occurring or transpiring in or via one or more electronic forums, chat rooms, or web pages of any websites, associated with any watching and/or listening to the sporting event, game, match, activity, competition, or tournament.

In a preferred embodiment, the sporting event, game, match, activity, competition, or tournament, and the streaming broadcast or transmission of same, will end at step 1305. At step 1306, the individual or user can transmit a bet outcome request to the central processing computer 10 to request that the central processing computer 10 process and determine a bet outcome or result, such as, for example, whether the individual or user has won the bet or has lost the best, for each and every bet made by the individual or user regarding and/or during the sporting event, game, match, activity, competition, or tournament. At step 1307, the central processing computer can process each bet, one at a time as described herein. For each bet, the central processing computer 10 can determine whether the bet which is being processed is a winning bet or a losing bet. After determining whether the bet is a winning bet or a losing bet, the operation of the central processing computer 10 can proceed to step 1308 and the central processing computer 10 can determine whether or not a hold has been placed on any payouts for the bet, such as may occur in cases of suspected betting fraud, game fixing, match fixing, or cheating.

If, at step 1308, it is determined that information regarding any suspected betting fraud, game fixing, match fixing, or cheating, activity, or any other issues pertaining to game integrity or match integrity, exists or has been reported to the central processing computer 10 regarding the sporting event, game, match, activity, competition, or tournament, by or from any sport governing body computer 30, by or from any governmental entity computer, by or from any gaming facility computer 50, by or from any information/analytics provider computer 70, by or from any social network computer 80, by or from any financial institution computer 70, by or from any escrow agent computer 95, or by any user communication device 20, such as can be reported in any electronic forum, chat room, or web page of a website, as described herein, or by or through any other independent or other means, then the operation of the central processing computer 10 will proceed to step 1309 and the central processing computer 10 can withhold any payment on a winning bet, and/or suspend or withhold any charge on any losing bet, until the matter is resolved. In another preferred embodiment, the central processing computer 10 can also automatically process information for placing all bets regarding the sporting event, game, match, activity, competition, or tournament, into escrow with the escrow agent computer 95 until the matter is resolved. Thereafter, the operation of the apparatus will proceed to step 1311.

If, at step 1308, it is determined that no information regarding any suspected betting fraud, game fixing, match fixing, or cheating, activity, or any other issues pertaining to game integrity or match integrity, exists or has been reported to the central processing computer 10 regarding the sporting event, game, match, activity, competition, or tournament, then the operation of the central processing computer 10 will proceed to step 1310. At step 1310, the central processing computer 10 will effectuate a settlement of the bet by, in the event of a winning bet, effectuating a payment to the sports betting account, gaming account, or gambling account, of the individual or user, or, in the event of a losing bet, extracting payment from the sports betting account, gaming account, or gambling account, of the individual or user.

In an instance where the individual or user placed the bet monies into escrow with the escrow agent computer 95, the central processing computer 10 can generate and transmit, to the escrow agent computer 95, a request for funds, along with an official certification that no suspected game fixing, match fixing, or cheating, activity, or any other issues pertaining to game integrity or match integrity, exists or has been reported for the sporting event, game, match, activity, competition, or tournament, and thereby request the escrow agent computer 95 release the bet monies to the central processing computer 10 if all other escrow agreement conditions have been met or satisfied.

At step 1310, the central processing computer 10 can also effectuate a gaming fee payment to the respective financial account associated with the respective sport governing body computer 30 for each sport governing body which is due a gaming fee payment, effectuate a gaming fee payment to the respective financial account associated with the respective governmental entity computer 40 for each governmental entity due a gaming fee payment, effectuate a gaming fee payment to the respective financial account associated with the respective gaming facility computer 50 for each gaming facility due a gaming fee payment, effectuate a gaming fee payment to the respective financial account associated with the respective content provider computer 60 for each content provider, if any, due a gaming fee payment, and/or effectuate a gaming fee payment to the respective financial account associated with the respective information/analytics provider computer 70 for each information/analytics provider, if any, due a gaming fee payment. In this regard, any stakeholders in or of the sports betting system of the apparatus 100 of the present invention can be paid any gaming fees due them for each bet placed using the apparatus 100. Thereafter, the operation of the apparatus will proceed to step 1311.

At step 1311, the central processing computer 10 can determine if another bet or if any other bets need to be processed for the individual or user. If, at step 1311, it is determined that there are no more bets that need to be processed for the individual or user, then the operation of the apparatus 100 will proceed to step 1312. If, however, it is determined that there are other bets which need to be processed, then the operation of the apparatus 100 will proceed to step 1307 and the above-described processes of steps 1307 through 1311 can be repeated for the next bet to be processed, and thereafter for all remaining bets to be processed.

At step 1312, the central processing computer 10 can also generate a final report regarding and including information regarding all of the bets placed on the sporting event, game, match, activity, competition, or tournament, including outcome bets, and any game event bets or match event bet, the outcomes of all such bets, the identities of the all individuals or users who placed each of the bets and/or who watched and/or listened to the sporting event, game, match, activity, competition, or tournament, via any electronic forum, chat room, or web page of any website, and a record of all posting, comments, and messages, bets placed, and any and/or all activity which took place in or via the respective electronic forum(s), chat room(s), and web pages of any websites. The final report can also contain any comments or reports regarding any instances of any suspected game fixing, match fixing, or cheating, activity, or any other issues pertaining to game integrity or match integrity.

In a preferred embodiment, the final report can be stored in the database 10H of the central processing computer 10, can be transmitted to any party or entity requesting same, and/or can be transmitted to any sport governing body computer 30, any governmental entity computer 40, any gaming facility computer 50, any information/analytics provider computer 70, any social network computer 80, any financial institution computer 90, and/or any escrow agent computer 95, either upon request or automatically. In a preferred embodiment, any requests for automated transmissions of any and/or all of the herein-described final reports, by any of the operators or owners of any of the above-described computers or communication devices, can be previously transmitted to, received by, and stored at, the central processing computer 10. Thereafter, the operation of the apparatus 100 will cease at step 1313.

In another preferred embodiment, the individual or user can, at any time, access the respective electronic forum, chat room, or website, to obtain information, such as the score, time remaining, or any other information, regarding the sporting event, game, match, activity, competition, or tournament, simply by linking to same using the link in the betting confirmation message. In this regard, the individual or user need not watch or listen to the entire sporting event, game, match, activity, competition, or tournament, but can simply access the respective electronic forum, chat room, or website, via which same can be watched and/or listened to in order to obtain information regarding same at any time. The individual or user can obtain information which may be displayed via the video screen on which the score of the sporting event, game, match, activity, competition, or tournament, and/or the individual or user can obtain information from the postings of the other individuals or users.

In another preferred embodiment, in instances in which the individual or user initially selected to watch and/or listen the sporting event, game, match, activity, competition, or tournament, by himself or herself, the individual or user can, at any time before or during the sporting event, game, match, activity, competition, or tournament, join any available electronic forum or chat room provided in the betting confirmation message. Links to any such electronic forums or chat rooms can also be provided along with a broadcast of the sporting event, game, match, activity, competition, or tournament provided on a website.

In another preferred embodiment, as well and any and/or all of the embodiments described herein, any data and/or information obtained by, recorded by, processed by, or stored in, any wearable device 97 can also be automatically transmitted to the information/analytics computer 70 for use in generating data and/or information and/or analytics data and/or information using the same. Once processed by the information/analytics computer 70, the information so generated can be transmitted to or provided to the central processing computer 10, to any user communication device 20, to the electronic forum, chat room, or webpage of a website broadcasting a sporting event, game, match, activity, competition, or tournament, to any sport governing body computer 30, to any governmental entity computer 40, to any gaming facility computer 50, to any information/analytics provider computer 70, to any social network computer 80, to any financial institution computer 90, or to any escrow agent computer 95, either automatically or upon request from a respective individual or entity.

In another preferred embodiment, as well as any and/or all of the embodiments described herein, the apparatus 100 and/or the central processing computer 10 can be specially programmed and/or specially configured to account for any time zone differences between the local time of a respective sporting event, game, match, activity, competition, or tournament, and the time zone from which an individual or user is watching and/or listening to the sporting event, game, match, activity, competition, or tournament, in or via a respective electronic forum, chat room, or webpage of a website.

In another preferred embodiment, the apparatus 100 and/or the central processing computer 10 can also be specially programmed and/or specially configured to delay any presentation of any information, comments, or postings, which are posted or presented to or in an electronic forum, chat room, or webpage of a website, in order to adjust for any time delays detected in any streaming video and/or audio of the sporting event, game, match, activity, competition, or tournament. In this manner, the apparatus 100 can delay any posting of any information, comments, or postings, until after a play has been completed so as to adjust for any time delays in the video being streamed to the electronic forum, chat room, or webpage of a website and, therefore, prevent instances where a posting regarding a play or occurrence is displayed in the electronic forum, chat room, or webpage of a website, before the play or occurrence is shown in or via the electronic forum, chat room, or webpage of a website.

In another preferred embodiment, as well as any and/or all of the embodiments described herein, the apparatus 100 and/or the central processing computer 10 can be specially programmed by the individual to provide the individual with a notification message(s) regarding upcoming an sporting event, game, match, activity, competition, or tournament, which the individual desires to be notified. In a preferred embodiment, the individual can access the central processing computer 10 via any user communication device 20 and enter a request to be notified, with or by means of an event notification message, which can be generated and transmitted via email, instant message, SMA message, or any other electronic message transmission, regarding any one or more upcoming sporting events, games, matches, activities, competitions, or tournaments, for which bets can be placed. The event notification message can identify any number of sporting events, games, matches, activities, competitions, or tournaments, the teams, players, or participants in or of same, any betting odds associated with same, and a link for use in accessing the central processing computer 10 in order to place a bet or bets regarding any sporting event(s), game(s), match(es), competition(s), or tournament(s), identified in the event notification message.

In another preferred embodiment, as well as in any and/or all of the embodiments described herein, the individual or user or any individual or user, who uses the apparatus 100 of the present invention, can place any of the bets described herein, including, but not limited to, any of the herein-described outcome bets, game event bets, match event bets, private bets, or any other bets while at a gaming facility or venue, either by using his or her user communication device 20 or by using any gaming facility computer 50.

In another preferred embodiment, as well as any and/or all of the embodiments described herein, the apparatus and methods of the present invention can be utilized in order to provide for the selling and/or for the purchasing of a ticket, tickets, a ticket option, and/or ticket options for any of the herein-descried games, matches, competitions, or events. In a preferred embodiment, the apparatus and methods of the present invention can also be utilized by an individual or by a user to purchase a ticket, tickets, a ticket option, or ticket options, for any game, match, competition, or event, or for any games, matches, competitions, or events, on or regarding which he or she places a bet.

In another preferred embodiment, the apparatus and methods of the present invention can also be utilized by an individual or by a user to purchase a ticket, tickets, a ticket option, or ticket options, for any game, match, competition, or event, or for any games, matches, competitions, or events, using data and/or information, including, but not limited to, historical information, statistical information, analytics information, betting odds information, news information, or any other information, regarding any game, match, competition, or event, or any players, athletes, or participants, in same, which can be provided by and/or via the apparatus and methods of the present invention, in order to place a bet or bets on any number of games, matches, competitions, or events. In another preferred embodiment, the apparatus and methods of the present invention also can also be utilized by an individual or by a user to purchase a ticket, tickets, a ticket option, or ticket options, for any game, match, competition, or event, whether or not he or she places a bet on any game, match, competition, or event.

Figure 14:
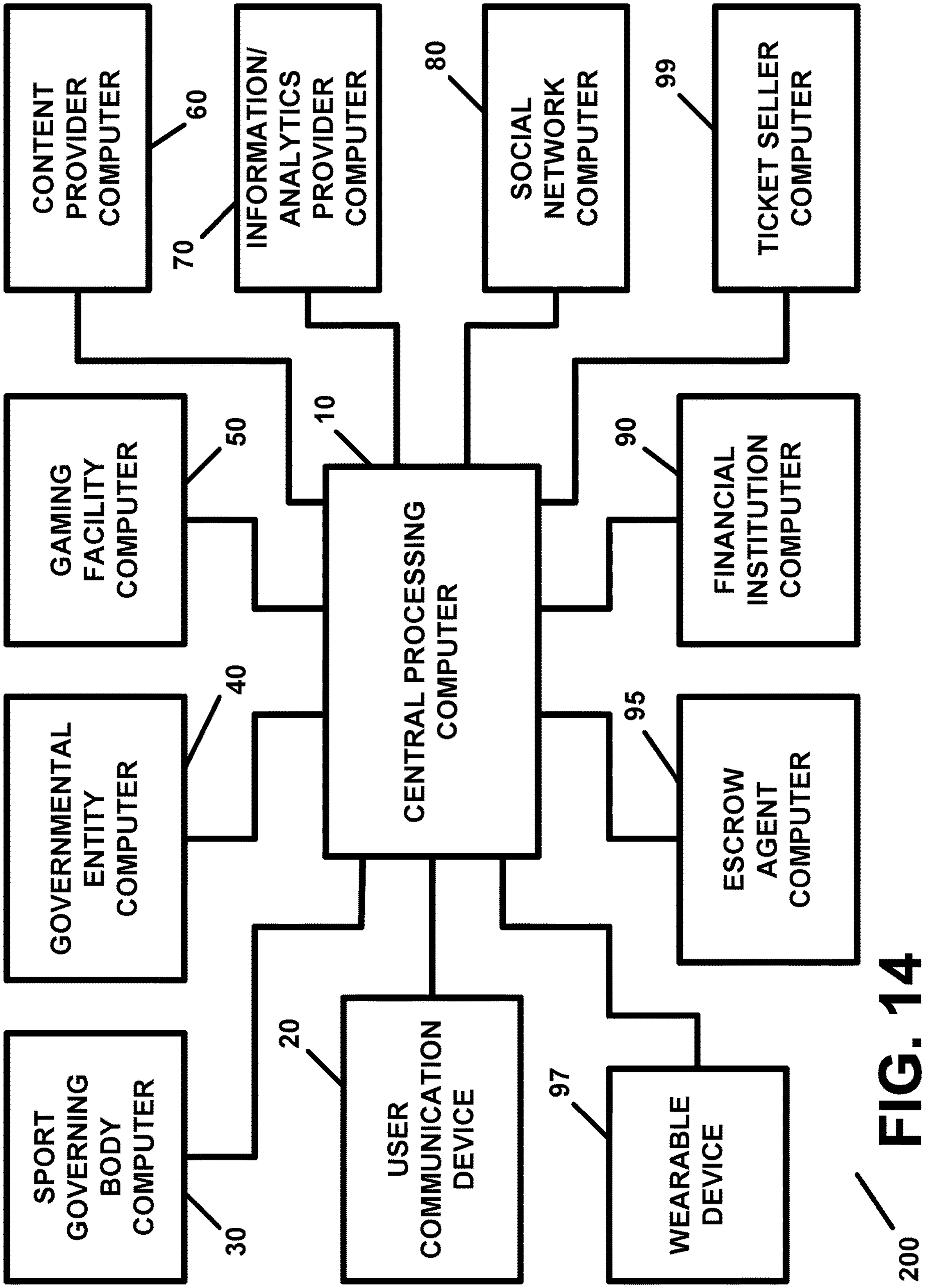
FIG. 14 illustrates another preferred embodiment of the apparatus of the present invention, in block diagram form.

FIG. 14 illustrates a preferred embodiment of the apparatus of the present invention, which is designated by reference numeral 200, in block diagram form. With reference to FIG. 14, in a preferred embodiment, the apparatus 200 includes the central processing computer(s) 10, the user communication device(s) 20, the sport governing body computer(s) 30, the governmental entity computer(s) 40, the gaming facility computer 50, the content provider computer(s) 60, the information/analytics provider computer(s) 70, the social network computer(s) 80, the financial institution computer(s) 90, the escrow agent computer(s) 95, and/or the wearable device(s) 97, which are described herein in the embodiment of FIG. 1. With reference to FIG. 14, the apparatus also includes a ticket seller computer 99, or any number of ticket seller computers 99.

In a preferred embodiment, the ticket seller computer 99 can be used by, and/or can be associated with, any ticket seller, such as, for example, a ticket broker, a ticket agent, a team, a league, a sports or gaming venue or facility, and/or any other third party (hereinafter referred to as "ticket seller") which or who desires to sell tickets or ticket options via the apparatus 200 of the present invention. The ticket seller computer 99 can also be utilized by the respective ticket seller associated with the same in order to communicate with and/or to interact with the central processing computer 10, and any of the herein-described user communication devices 20, sport governing body computers 30, governmental entity computers 40, gaming facility computers 50, content provider computers 60, information/analytics provider computers 70, social network computers 80, financial institution computers 90, escrow agent computers 95, and/or any wearable devices 97, and/or any other ticket seller computers 99.

In the preferred embodiment, the ticket seller computer 99 can communicate with, and/or can be linked with, the central processing computer(s) 10, any of the user communication devices 20, and/or any other computers or communication devices described herein, via a wired communication network, a wireless communication network, or via any combination of wired and/or wireless communication networks.

In a preferred embodiment, the ticket seller computer 99 can transmit ticket information, ticket option information, scheduling information regarding any game(s), match(es), competition(s), or event(s), analytics information, sports analytics data and/or information, or any other statistical, historical, predictive, or forecasting, data and/or information, directly to a user communication device 20 or to the central processing computer 10 for re-transmission to a user communication device 20.

In a preferred embodiment, the apparatus 200 can include any number of ticket seller computers 99. In a preferred embodiment, each ticket seller computer 99 can include any number of computers, server computers, or computer systems. In a preferred embodiment, each ticket seller computer 99 can also have a website or websites associated therewith.

It is also important to note that database 10H of the central processing computer 10 can also contain any data and/or information, and/or software programs or software applications, which may be needed and/or desired for performing any and/or all of the processing routines and/or functionality described herein as being provided by the ticket seller computer 99.

Figure 15:
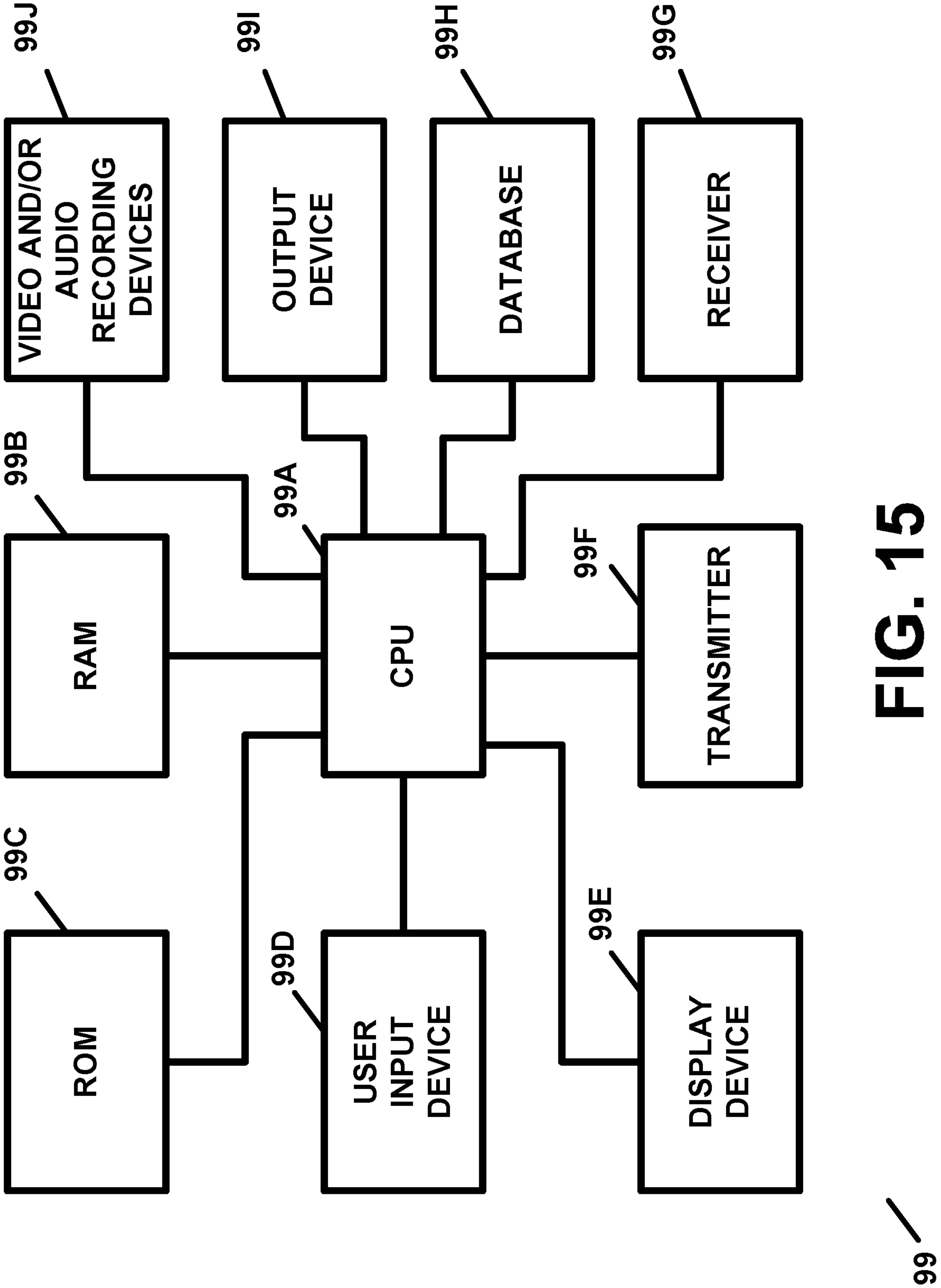
FIG. 15 illustrates the ticket selling computer of FIG. 14, in block diagram form.

FIG. 15 illustrates the ticket seller computer 99 of FIG. 14, in block diagram form. With reference to FIG. 15, in the preferred embodiment, the ticket seller computer 99 includes a central processing unit or CPU 99A, which in the preferred embodiment, is a microprocessor. The CPU 99A may also be a microcomputer, a minicomputer, a macro-computer, and/or a mainframe computer, depending upon the application. The CPU 99A is specially programmed and/or specially configured to perform all of the functionality described herein as being performed by the ticket seller computer 99.

The ticket seller computer 99 also includes a random access memory (RAM) device(s) 99B and a read only memory (ROM) device(s) 99C, each of which is connected to the CPU 99A, and a user input device 99D, for entering data or information and/or instructions and/or commands into the ticket seller computer 99, which can be, or which can include, any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, or instructions and/or commands, to be entered into the ticket seller computer 99. The input device(s) 99D is/are also connected to the CPU 99A.

The ticket seller computer 99 also includes a display device 99E for displaying data and/or information to a user. The ticket seller computer 99 also includes a transmitter(s) 99F, for transmitting signals and/or data and/or information to any one or more of the central processing computer(s) 10, the user communications devices 20, the sport governing body computers 30, the governmental entity computers 40, the gaming facility computers 50, the content provider computers 60, the information/analytics provider computers 70, the social network computers 80, the financial institution computers 90, the escrow agent computers 95, the wearable devices 97, and/or any other ticket seller computer 99, which may be utilized in conjunction with the apparatus 200 of the present invention.

The ticket seller computer 99 also includes a receiver 99G, for receiving signals and/or data and/or information from any one or more of the central processing computer(s) 10, the user communication devices 20, the sport governing body computers 30, the governmental entity computers 40, the gaming facility computers 50, the content provider computers 60, the information/analytics provider computers 70, the social network computers 80, the financial institution computers 90, the escrow agent computers 95, the wearable devices 97, and/or any other ticket seller computer 99, which may be utilized in conjunction with the apparatus 200 of the present invention.

The ticket seller computer 99 also includes a database(s) 99H. The database 99H can contain and/or can be linked to any of the data and/or information described herein as being stored in the database 10H.

The database 99H can also contain and/or include data and/or information which may be required, and/or which may be desired, for performing any of the functionality and/or processing routines described herein as being performed by the ticket seller computer 99 and/or the apparatus 200. In a preferred embodiment, the database 99H can also include any of the data and/or information described herein as being contained in the respective databases of the central processing computer(s) 10, the user communication devices 20, the sport governing body computers 30, the governmental entity computers 40, the gaming facility computers 50, the content provider computers 60, the information/analytics provider computers 70, the social network computers 80, the financial institution computers 90, the escrow agent computers 95, and the wearable devices 97. The database 99H can also be connected to the CPU 99A.

The database 99H can also contain any data and/or information regarding any of the tickets or ticket options, for or regarding any of the games, matches, competitions, or events, which can be purchased via the ticket seller computer 99. In this regard, the database 99H can contain and/or include any data and/or information which is required or desired for operating the ticket seller computer 99.

The database 99H of the ticket seller computer 99 can contain and/or include any and/or all of the data and/or information needed and/or desired for performing all of the processing routines and/or functionality described herein as being provided by the ticket seller computer 99. The database 99H of the ticket seller computer 99 can contain data and/or information regarding games, matches, competitions, and/or events, and/or any other events described herein, schedules of the respective games, matches, competitions, and/or events, dates of the respective games, matches, competitions, and/or events, and/or times of the respective games, matches, competitions, and/or events. The database 99H of the ticket seller computer 99 can also contain data and/or information regarding delays, cancellations, and/or rescheduling, of any of the herein-described games, matches, competitions, and/or events.

The database 99H of the ticket seller computer 99 can also contain data and/or information regarding the players, athletes, and/or other participants, in any of the herein-described games, matches, competitions, and/or events. The database 99H of the ticket seller computer 99 can also contain data and/or information regarding the location and/or venue of any of the herein-described games, matches, competitions, and/or events as well as directions to the respective venues.

The database 99H of the ticket seller computer 99 can also include any information regarding the tickets or ticket options to, for, or regarding, the games, matches, competitions, and/or events, and/or venues, which are sold by or via the ticket seller computer 99. Information regarding the tickets or ticket options can also include, but not limited be to, the location of the seat or seats for which the ticket or tickets, or the ticket option or ticket options, correspond, the price or prices of the respective tickets or ticket options, and/or any other information regarding the ticket or tickets or the ticket option or ticket options.

The database 99H of the ticket seller computer 99 can also contain data and/or information regarding contact information for or regarding any of the ticket issuers of any of the tickets or ticket options described herein.

The database 99H of the ticket seller computer 99 can also contain data and/or information regarding the prices of the various tickets or ticket options described herein, face value of the various tickets, location of the seats corresponding to the various tickets or ticket options, a video clip or video picture of the view from the respective seats corresponding to the tickets, availability of tickets or ticket options for resale, resale price or prices of the tickets or ticket options, options to buy any of the tickets described herein, and/or prices for any of the ticket options tickets described herein. The database 99H of the ticket seller computer 99 can also contain data and/or include information for determining option prices for any of the ticket options for any of the tickets described herein.

The database 99H of the ticket seller computer 99 can also contain data and/or information regarding a prorated price or prices and/or price reductions for any of the herein-described tickets during the course of a game, match, competition, or event, or use of a venue, and/or for any remaining portion of a game, match, competition, or event, or use of a venue. The database 99H of the ticket seller computer 99 can also contain data and/or information regarding price reductions for tickets sold or resold during a game, match, competition, or event.

The database 99H of the ticket seller computer 99 can also contain data and/or information regarding a ticket holders propensities to leave an event or venue early and/or prior to game, match, competition, or event, completion of conclusion. The database 99H of the ticket seller computer 99 can also contain data and/or information regarding the past prices charged by ticket holders for partially used tickets.

The database 99H of the ticket seller computer 99 can also contain data and/or information regarding ticket issuers, ticket agents, ticket brokers, and/or any other providers of tickets and/or ticket options for any herein-described games, matches, competitions, or events. The database 99H of the ticket seller computer 99 can also contain contact information for or regarding any of the respective ticket issuers, ticket agents, ticket brokers, and/or any other provider of tickets.

The database 99H of the ticket seller computer 99 can also contain data and/or information regarding contact information regarding any of the herein-described users, individuals, ticket issuers, and/or any other individuals or entities, who or which utilize the apparatus 200 of the present invention. The database 99H of the ticket seller computer 99 can also contain data and/or information regarding ticket preferences and/or ticket orders, and/or ticket option preferences and/or ticket option orders, by or from any of the users or individuals who or which desire to purchase tickets and/or ticket options for remaining portions of games, matches, competitions, or events. The database 99H of the ticket seller computer 99 can also contain data and/or information regarding ticket availability and/or tickets being offered for sale by or from any of the users or individuals who or which desire to sell or resell tickets and/or tickets for remaining portions of games, matches, competitions, or events. The database 99H of the ticket seller computer 99 can also contain data and/or information regarding ticket option availability and/or ticket options being offered for sale by or from any of the users or individuals who or which desire to sell or resell ticket options for remaining portions of games, matches, competitions, or events.

The database 99H of the ticket seller computer 99 can also contain data and/or information regarding prices of costs for purchasing, selling and/or for reselling, any of the herein-described tickets or ticket options. The price or cost information can also include prices for the tickets or ticket options, premium prices above face value, face values prices, discount prices below face value, brokerage charges or fees, agent charges or fees, commission charges or fees, intermediary charges or fees, shipping charges or fees, handling charges or fees, and/or any other charges and/or fees which can be applied and/or incurred in purchasing and/or selling any of the herein-described tickets and/or ticket options.

The database 99H of the ticket seller computer 99 can also contain and/or include data and/or information regarding trading, bartering and/or swapping of any of the herein-described tickets or ticket options. The database 99H of the ticket seller computer 99 can also contain data and/or information regarding posted or asking prices by sellers or resellers of any of the herein-described tickets or ticket options, and/or offering prices by prospective buyers of any of the herein-described tickets or ticket options.

The database 99H of the ticket seller computer 99 can also contain and/or include data and/or information regarding ticket orders, ticket option orders, and/or preferences by or of any of the prospective ticket purchasers and/or purchasers for any tickets or ticket options for any games, matches, competitions, or events and/or for any remaining portion of same.

The database 99H of the ticket seller computer 99 can also contain any data and/or information regarding financial accounts of any of the users, individuals, ticket issuers, and/or any other individual and/or entities, who or which utilize the apparatus 200 and method of the present invention. The database 99H of the ticket seller computer 99 can also contain and/or include any data and/or information for performing and/or for effecting financial transactions by and/or between any of the users, individuals, ticket issuers, and/or any other individual and/or entities, who or which utilize the apparatus 200 and method of the present invention. The database 99H of the ticket seller computer 99 can also contain and/or include data and/or information for performing electronic funds transfers, monetary transfers, and/or monetary value transfers.

The database 99H of the ticket seller computer 99 can also contain and/or include data and/or information for conducting auctions and/or bidding for or involving any of the tickets or ticket options described herein. The database 99H of the ticket seller computer 99 can also contain and/or include any other data and/or information, and/or any programs, software programs, and/or algorithms, needed or desired for performing any and/or all of the processing routines and/or functionality described herein as being performed by the ticket seller computer 99, the apparatus 200, and/or any of the user communication devices 20 described herein.

The ticket seller computer 99 also includes an output device 991 for outputting any of the data and/or information described herein as being processes and/or generated by or via the ticket seller computer 99. In the preferred embodiment, the output device 991 can be a printer, a display, a transmitter, a modem, and/or any other device which can be used to output data or information of any kind or type.

The ticket seller computer 99 also includes a video and/or audio recording device(s) 99J which can include a camera and/or a video recording device for recording pictures or video and/or video clips and/or a microphone or an audio recording device for recording audio or audio clips which can be recorded by, and/or transmitted live, by or from the ticket seller computer 99, or which can be recorded by, and stored at or in, the ticket seller computer 99 for transmission by or from the ticket seller computer 99 at a later time. The video and/or audio recording device(s) 99J can also be utilized to facilitate one-way broadcasts from the ticket seller computer 99, and/or can be utilized to facilitate video conferencing, video chatting, and/or audio conferencing, and/or video and audio conferencing, between any of the herein-described users, individuals, parties, or entities, who or which utilize the apparatus 200 and method of the present invention. In this regard, a user of the ticket seller computer 99 can engage in telephone calls and video conferencing calls via the same. The user of the ticket seller computer 99 can also use the video and/or audio recording device(s) 99J to record and broadcast or transmit content via its transmitter 99F.

Figure 16:
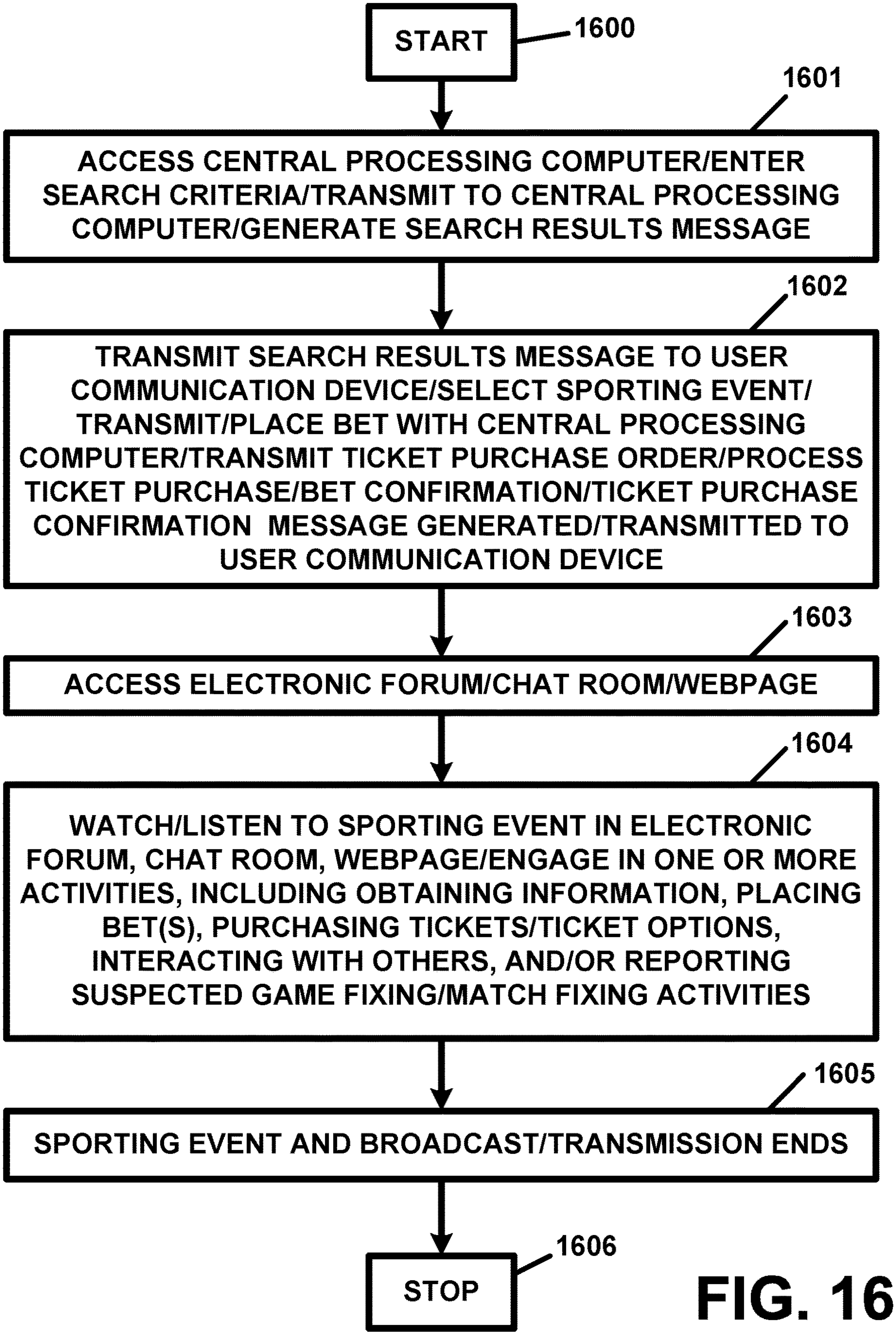
FIG. 16 illustrates a preferred embodiment method for utilizing the apparatus of FIG. 14, in flow diagram form.

FIG. 16 illustrates a preferred embodiment method for utilizing the apparatus 200 and methods of the present invention, in flow diagram form. With reference to FIG. 16, the operation of the apparatus 200 commences at step 1600. At step 1601, the individual or user can access the central processing computer 10 by using the user communication device 20. In a preferred embodiment, the central processing computer 10 can be operated and/or maintained by any on-line sports betting, gaming, or gambling, company or entity of any type of kind. In a preferred embodiment, the individual or user can utilize any user communication device 20 in order to access the central processing computer 10.

In another preferred embodiment of FIG. 16, the individual or user can utilize a headset as, or in conjunction with, the user communication device 20. In a preferred embodiment, whenever the individual or user uses a headset as, or in conjunction with, the user communication device 20, the individual or user can utilize the microphone of the video and/or audio recording device(s) 20J of the communication device 20 and associated voice recognition software in order to verbally input data, information, commands, or instructions, into the user communication device 20, and the individual or user can also utilize the same to verbally communicate with the central processing computer(s) 10, the sport governing body computers 30, the governmental entity computers 40, the gaming facility computers 50, the content provider computers 60, the information/analytics provider computers 70, the social network computers 80, the financial institution computers 90, the escrow agent computers 95, the wearable devices 97, and the ticket seller computer 99.

With reference once again to step 1601, the individual or user can search for a sporting event, game, match, activity, competition, or tournament, on which he or she can place a bet. At step 1601, the individual or user can, using the user communication device 20 in communication with the central processing computer 10, search for the sporting event, game, match, activity, competition, or tournament, on which he or she wants to place a bet, or the individual or user can search for and locate a sporting event, game, match, activity, competition, or tournament, by searching for same via the central processing computer 10. In instances when the individual or user is in search of a sporting event, game, match, activity, competition, or tournament, on which to place a bet, the individual or user can search for the same by searching by sport, by country or region in the world in which the sporting event, game, match, activity, competition, or tournament, is being held, by team or teams playing in or participating in the sporting event, game, match, activity, competition, or tournament, by player or players playing in or participating in the sporting event, game, match, activity, competition, or tournament, by betting odds placed on the sporting event, game, match, activity, competition, or tournament, or by any other criteria. At step 1601, after entering the search criteria into the user communication device 20, the search criteria can be transmitted to, and received by, the central processing computer 10. At step 1601, the central processing computer 10 can receive and process the search criteria and can generate a search results message containing information regarding one or more sporting events, games, matches, activities, competitions, or tournaments, on or for which a bet(s) can be placed.

At step 1602, central processing computer 10 can transmit the search results message to the user communication device 20. At step 1602, user communication device 20 can receive the search results message. At step 1602, the individual or user can review the information contained in the search results message and select the sporting event, game, match, activity, competition, or tournament, on or for which he or she desires to place a bet. In a preferred embodiment, the individual or user, at step 1602, can, but not need, access the information/analytics provider computer 70 in order to obtain any data and/or information, or analytics data and/or information, which he or she may want to obtain and review in advance of placing any bet. In a preferred embodiment, the individual or user, at step 1602, can also access the ticket seller computer 99 in order to determine if tickets or ticket options are available for sale for the selected sporting event, game, match, activity, competition, or tournament, for which he or she desires to place a bet. In a preferred embodiment, tickets or ticket options can be available for the entire sporting event, game, match, activity, competition, or tournament, or for a potion of the sporting event, game, match, activity, competition, or tournament.

At step 1602, the individual or user can also request that the information/analytics provider computer 70 transmit updated data and/or information, including, but not limited to, analytics data and/or information, information regarding betting odds or betting odds changes, information regarding new betting opportunities, and/or any other data and/or information regarding the sporting event, game, match, activity, competition, or tournament, for which the individual or user wants to place a bet, or data and/or information regarding any teams and/or players or participants in or of same, to the user communication device 20, before the start of, during, or after, the selected sporting event, game, match, activity, competition, or tournament. At step 1602, the individual or user can also request to be notified regarding, and be provided with, data and/or information, including, but not limited to, analytics data and/or information, data and/or information regarding betting odds or betting odds changes, information regarding new betting opportunities, and/or any other data and/or information regarding any other sporting sporting events, games, matches, activities, competitions, or tournaments, or any teams, players, or participants, involved in same, in which the individual or user may be interested.

At step 1602, the individual or user can also request that the ticket seller computer 99 transmit updated ticket or ticket option data and/or information for or regarding the sporting event, game, match, activity, competition, or tournament, for which bets can be placed, to his or her user communication device 20, before the start of, during, or after, the selected sporting event, game, match, activity, competition, or tournament. At step 1602, the individual or user can also request to be notified regarding, and be provided with, ticket or ticket option data and/or information for any other sporting events, games, matches, activities, competitions, or tournaments, or any teams, players, or participants, involved in same, in which the individual or user may be interested.

At step 1602, the individual or user can place a bet on the selected sporting event, game, match, activity, competition, or tournament. In a preferred embodiment, the individual or user can utilize is or her sports betting account, gaming account, or gambling account, or any appropriate or suitable payment identifier, in order to place, and make payment for, the bet. In another preferred embodiment, the individual or user can provide a payment identifier such as, but not limited to, a credit account number, a credit card account number, a debit account number, a debit card account number, a charge account number, a charge card account number, a savings account number, a checking account number, or any other payment account number.

In a preferred embodiment, the individual or user, at step 1602, can also access his or her sports betting account, gaming account, or gambling account, by accessing the same via the financial institution computer 90, of the financial institution which services the respective account, in order to ascertain the status of the same or to make payment for the bet by utilizing the same. In another preferred embodiment, the individual or user can also instruct the central processing computer 10 to place his or her bet into an escrow account in order to protect the individual or user in instances of game fixing, match fixing, or cheating, should such conduct be reported or discovered before, during, or after, the selected sporting event, game, match, activity, competition, or tournament. At step 1602, the individual or user can also instruct that the escrow computer 95 not make payment of any lost bet until after a certain and/or predefined time period has elapsed, so that the individual or user can be protected against any game fixing, match fixing, or cheating, activities.

For example, if the apparatus 200 is utilized in connection with practices designed to identify and combat game fixing, match fixing, or cheating, activities, then the individual or user, or any entities who or which utilize the apparatus 200 of the present invention, can utilize the escrow agent computer 95 so as to hold any or all bets in escrow for a certain amount of time, which can be any pre-selected time period, such as, but not limited to, one hour, two hours, six hours, twelve hours, twenty four hours, or any other desired time period, so as to provide operators of the apparatus 200, and any other individuals to entities, with sufficient opportunity to ensure that no game fixing, match fixing, or cheating, activities have occurred, with regards to a sporting event, game, match, activity, competition, or tournament, which could defraud the individual or user or any other individuals or users of the apparatus 200.

The above-described features of the apparatus 200, including the use of the escrow agent computer 95 to hold and keep a placed bet in escrow, can provide a safeguard against game fixing, match fixing, or cheating, activities and provide a more secure sports betting environment. At step 1602, the central processing computer 10 can receive and process the information regarding the bet and store the information regarding the bet in the database 10H. At step 1602, the user communication device 20 used by the individual or user can also store the information regarding the bet in the database 20H. The bet, described as being placed above, at step 1602, can be referred to herein as the "outcome bet".

At step 1602, the individual or user, using his or her user communication device 20, can access the ticket seller computer 99 via a link provided in the search results message for or associated with the selected sporting event, game, match, activity, competition, or tournament, on or regarding which the individual or user placed his or her bet, and the individual or user can search for and can access ticket information for the selected sporting event, game, match, activity, competition, or tournament, on or regarding which the individual or user placed his or her bet. At step 1602, the individual or user can also access the ticket seller computer 99 via the central processing computer 10, and can search for and can access ticket information for the selected sporting event, game, match, activity, competition, or tournament, on or regarding which the individual or user placed his or her bet. At step 1602, the individual or user can select to purchase one or more tickets, to the selected sporting event, game, match, activity, competition, or tournament, on or regarding which the individual or user placed his or her bet, by transmitting a ticket purchase request from his or her user communication device 20 to the ticket seller computer 99.

At step 1602, the individual or user can provide a payment identifier for making payment for the ticket purchase. Thereafter, the ticket seller computer 99 can process payment for the ticket or tickets purchased and, in a preferred embodiment, can generate a ticket purchase confirmation message, and can transmit the same to the user communication device 20. The ticket purchase confirmation message can also be transmitted, as an email message, sent to the individual's or user's email server and/or as an email message sent to the individual's or user's email server and then forwarded or transmitted to the user's communication device 20, and/or as an instant message, or as an SMS message, transmitted to the user communication device 20 or to another user communication device 20 which can be used by the individual or user to receive the same. In a preferred embodiment, the ticket purchase confirmation message can contain, or can contain as an attachment, a copy or an electronic copy of each ticket purchased by the individual or user. Thereafter, the individual or user can either print out his ticket or tickets in hard copy form and/or can store same on his or her user communication device 20 in electronic form.

At step 1602, the individual or user can access the ticket seller computer 99, in a same or similar manner as described herein, and can search for and can access ticket option information for the selected sporting event, game, match, activity, competition, or tournament, on or regarding which the individual or user placed his or her bet. In a preferred embodiment, the ticket option can provide the individual or user with the option to purchase a ticket for the selected sporting event, game, match, activity, competition, or tournament, or a ticket for a portion of the selected sporting event, game, match, activity, competition, or tournament. At step 1602, the individual or user can select to purchase one or more ticket options, to the selected sporting event, game, match, activity, competition, or tournament, on or regarding which the individual or user placed his or her bet, by transmitting a ticket option purchase request from his or her user communication device 20 to the ticket seller computer 99.

At step 1602, the individual or user can provide a payment identifier for making payment for the ticket option purchase. Thereafter, the ticket seller computer 99 can process payment for the ticket option or tickets options purchased and, in a preferred embodiment, can generate a ticket option purchase confirmation message, and can transmit the same to the user communication device 20. The ticket option purchase confirmation message can also be transmitted, as an email message, sent to the individual's or user's email server and/or as an email message sent to the individual's or user's email server and then forwarded or transmitted to the user's communication device 20, and/or as an instant message, or as an SMS message, transmitted to the user communication device 20 or to another user communication device 20 which can be used by the individual or user to receive the same.

In a preferred embodiment, the ticket option purchase confirmation message can contain, or can contain as an attachment, a copy or an electronic copy of each ticket option purchased by the individual or user. Thereafter, the individual or user can either print out his ticket option or tickets options in hard copy form and/or can store same on his or her user communication device 20 in electronic form. In a preferred embodiment, the individual or user can exercise a ticket option to purchase a ticket for the selected sporting event, game, match, activity, competition, or tournament, or to any portion of same, before the ticket option expires and/or before the conclusion or the completion of the selected sporting event, game, match, activity, competition, or tournament.

In a preferred embodiment, any ticket, tickets, ticket option, or ticket options, can be resold by the individual or user at any time before the conclusion or the completion of the selected sporting event, game, match, activity, competition, or tournament.

At step 1602, the central processing computer 10 can also generate a bet confirmation message containing information regarding the bet that was placed, the date and time of the bet, the amount of the bet, the date and time of the selected sporting event, game, match, activity, competition, or tournament, on or for which the bet was placed, and a link to an electronic forum, a chat room, or a webpage of a website, in or via which the individual or user can watch and/or listen to the sporting event, game, match, activity, competition, or tournament, in or via which the individual or user can interact with other individuals or users in a group or social networking environment, and/or in or via which the individual or user can engage in any of the other herein-described activities. In an instance where the individual or user purchases a ticket for, and attends, the sporting event, game, match, activity, competition, or tournament, he or she can access the electronic forum, a chat room, or a webpage of a website, via his or her user communication device 20.

In a preferred embodiment, the central processing computer 10 can be specially programmed and/or specially configured to provide multiple broadcasts simultaneously of the sporting event, game, match, activity, competition, or tournament, to any number of different and distinct social networking groups in or via any number of electronic forums, chat rooms, or webpages of websites, allow individuals or users to watch and/or listen to the sporting event, game, match, activity, competition, or tournament, with others, with friends or acquaintances, with social network group members, or while alone, and allow individuals or users to communicate and/or interact with other individuals or users or with one another, engage in a video conference or video chat with others or with one another, post messages, comments, and other postings, place additional bets on the sporting event, game, match, activity, competition, or tournament, place bets on other sporting events, matches, games, competitions, or tournaments, request and be provided with data and/or information or analytical data and/or information for the sporting event, game, match, activity, competition, or tournament, or for another sporting event, game, match, activity, competition, or tournament, and report instances of game fixing, match fixing, or cheating.

In instances in which the individual or user initially selected to watch and/or listen the sporting event, game, match, activity, competition, or tournament, by himself or herself, the individual or user can, at any time before or during the sporting event, game, match, activity, competition, or tournament, join any available electronic forum or chat room provided in the betting confirmation message. Links to any such electronic forums or chat rooms can also be provided along with a broadcast of the sporting event, game, match, activity, competition, or tournament provided on a website.

At step 1602, the bet confirmation message can be transmitted from the central processing computer 10 to the user communication device 20 used by the individual or user to place the bet, and/or the bet confirmation message can also be transmitted in or as an email message and be transmitted to the email server servicing the individual's or user's email account so that the individual or user can access the bet confirmation message from any user communication device 20. The betting confirmation message can also be transmitted, as an instant message or as an SMS message, to the user communication device 20 or to another user communication device 20 which can be used by the individual or user to receive the same and to access the sporting event, game, match, activity, competition, or tournament or the electronic forum, chat room, or webpage.

In another preferred embodiment, the individual or user can program, or request, at the time of the placing of the bet on the sporting event, game, match, activity, competition, or tournament, or upon registering an account with the apparatus 200 or the central processing computer 10, that the central processing computer 10 generate a sporting event message, containing information or containing reminder information regarding the sporting event, game, match, activity, competition, or tournament, on which the bet, or a bet, has been placed by the individual or user, and transmit the sporting event message to any user communication device 20 used by the individual or user, as a text message, as an instant message, or as an SMS message, or in or as an email message, transmitted to the email server servicing the individual's or user's email account, prior to the start of the sporting event, game, match, activity, competition, or tournament. In a preferred embodiment, the sporting event message can contain all of the information and link or links described herein as being included in the betting confirmation message, and can serve to remind the individual or user about the sporting event, game, match, activity, competition, or tournament. In a preferred embodiment, the sporting event message can be transmitted and/or retransmitted multiple times and/or at pre-defined time intervals in advance of the sporting event, game, match, activity, competition, or tournament, to serve to remind the individual or user of the same and provide the individual or user with a sufficient amount of time to be ready to watch and/or listen to the same.

In another preferred embodiment, the individual or user can program, or request, at the time of the placing of the bet on the sporting event, game, match, activity, competition, or tournament, or upon registering an account with the apparatus 200 or the central processing computer 10, that the central processing computer 10 generate and/or that the ticket seller computer 99 generate a ticket availability message, containing information regarding tickets available for purchase for the sporting event, game, match, activity, competition, or tournament, or a ticket option availability message, containing information regarding tickets available for purchase for the sporting event, game, match, activity, competition, or tournament, and transmit same to any user communication device 20 used by the individual or user, as a text message, as an instant message, or as an SMS message, or in or as an email message, transmitted to the email server servicing the individual's or user's email account, prior to the start of the sporting event, game, match, activity, competition, or tournament, and/or prior to the completing or conclusion of the sporting event, game, match, activity, competition, or tournament. The ticket availability message or the ticket option availability message can contain a link to the ticket seller computer 99 so that the individual or user can access the ticket seller computer 99 and purchase a ticket, tickets, a ticket option, or ticket options.

At step 1603, the individual or user, prior to the start of the sporting event, game, match, activity, competition, or tournament, or at any time thereafter, can access the respective electronic forum, chat room, or webpage of the website, in or via which the individual or user can watch and/or listen to the sporting event, game, match, activity, competition, or tournament, and, in the case of the individual or user accessing the electronic forum or chat room, interact with other individuals or users or interact with individuals or users in the individual's or user's social networking group or in the individual or user's group of friends, or, in the case of the webpage of the website, watch and/or listen to the sporting event, game, match, activity, competition, or tournament, by himself or herself. Thereafter, the individual or user can watch and/or listen to the respective sporting event, game, match, activity, competition, or tournament, and/or interact with any other individual(s) or user(s), and/or engage in any of activities described herein.

At step 1604, the individual or user can watch and/or listen to the sporting event, game, match, activity, competition, or tournament, which is the subject of the bet. In a preferred embodiment, the sporting event, game, match, activity, competition, or tournament, can be transmitted, broadcast, or "streamed" from or via a gaming facility computer 50 and/or a content provider computer 60 located at the venue of the sporting event, game, match, activity, competition, or tournament, to the central processing computer 10, or directly to the individual's or user's user communication device 20. In this regard, the sporting event, game, match, activity, competition, or tournament, which is the subject of the bet, can be transmitted, broadcast, or "streamed" to the user communication device 20 from either the central processing computer 10 or from the gaming facility computer 50 or the content provider computer 60 located at the venue of the sporting event, game, match, activity, competition, or tournament.

In a preferred embodiment, the respective electronic forum, chat room, of website, can transmit and provide, to the user communication 20, for display via the display device 20E of same, a live video or a streaming video and/or audio of the sporting event, game, match, activity, competition, or tournament, data and/or information and/or analytics data and/or information regarding the respective teams, players, or other competitors involved in or participating in the sporting event, game, match, activity, competition, or tournament, a listing of all available bets and their respective odds, and a listing of all private bets offered by any of the individuals or users who may be watching and/or listening to the sporting event, game, match, activity, competition, or tournament, via the respective electronic forum or chat room. In a preferred embodiment, in instances where the electronic forum or chat room is being used, any and all comments, messages, or postings, posted by any of the individuals or users who may be watching and/or listening to the sporting event, game, match, activity, competition, or tournament, via the respective electronic forum or chat room can also be displayed via the display device 20E of the user communication device 20. In a preferred embodiment, the individual or user can also engage in video conference calls or video chats with other individuals or users via the respective electronic forum or chat room. In a preferred embodiment, the individual or user watching and/or listening to the sporting event, game, match, activity, competition, or tournament, via the webpage of the website can also post comments in a comments section on the website.

In a preferred embodiment, the individual or user can also watch and/or listen to the sporting event, game, match, activity, competition, or tournament, in 360 degree video, in virtual reality (VR), or in augmented reality (AR). In a preferred embodiment, any data and/or information, and any functionalities and/or individual or user activities, described herein as being provided in and via the respective electronic forum, chat room, or website, can also be provided to the individual or user in and via a 360 degree video, a virtual reality (VR), or an augmented reality (AR), presentation and experience. In a preferred embodiment, the individual or user can download, from the central processing computer 10 to his or her user communication device, any needed or desired 360 degree video, virtual reality (VR), and/or augmented reality (AR), software or software applications (also referred to as “apps”). Any such downloading of any 360 degree video, virtual reality (VR), and/or augmented reality (AR), software or apps can take place during step 1601.

At step 1604, the individual or user can watch and/or listen to the sporting event, game, match, activity, competition, or tournament, via the respective electronic forum, chat room, or website. In the preferred embodiment, the respective electronic forum, chat room, or webpage of the website, via which the sporting event, game, match, activity, competition, or tournament, is being watch and/or listen to, can be specially designed to allow the individual or user, or any other individuals or users, to watch and/or listen to the sporting event, game, match, activity, competition, or tournament, and to communicate with other individuals or users in the electronic forum or chat room.

In a preferred embodiment, the respective electronic forum, chat room, or webpage of the website, on, in, or via, which the sporting event, game, match, activity, competition, or tournament, can be watched and/or listened to can also be specially designed and/or specially configured to, simultaneously with providing the sporting event, game, match, activity, competition, or tournament, allow the individual or user, or any other individuals or users, to post comments or messages regarding the sporting event, game, match, activity, competition, or tournament, and/or to communicate with any other individual(s) or user(s) watching and/or listening to the sporting event, game, match, activity, competition, or tournament, via the electronic forum or chat room, and/or to communicate with the central processing computer 10, and/or with any of the sport governing body computers 30, the governmental entity computers 40, the gaming facility computers 50, the content provider computers 60, the information/analytics provider computers 70, the social network computers 80, the financial institution computers 90, the escrow agent computers 95, the wearable devices 97, and the ticket seller computers 99, described herein as being utilized with the apparatus 200.

In the preferred embodiment, the respective electronic forum, chat room, or webpage of the website, on, in, or via, which the sporting event, game, match, activity, competition, or tournament, can be watched and/or listened to can also be specially designed and/or specially configured to, simultaneously with providing the sporting event, game, match, activity, competition, or tournament, allow the individual or user, or any other individuals or users, to view data and/or information and/or analytics and/or information regarding the sporting event, game, match, activity, competition, or tournament, and/or the teams, players, or participants, participating in the same, to view information obtained by of from any wearable devices 97 worn or used by any players or participants in the sporting event, game, match, activity, competition, or tournament, and/or to view any analytics data and/or information relating to any data and/or information obtained by or from any of the wearable devices 97 during the sporting event, game, match, activity, competition, or tournament.

In the preferred embodiment, the respective electronic forum, chat room, or webpage of the website, on, in, or via, which the sporting event, game, match, activity, competition, or tournament, can be watched and/or listened to can also be specially designed and/or specially configured to, simultaneously with providing the sporting event, game, match, activity, competition, or tournament, allow the individual or user, or any other individuals or users, to view information regarding available bets being offered by various book makers or other gaming or gambling entities or individuals or users, to view private bets being offered by other individuals or users participating in the electronic forum or chat room, and/or to view private bets being offered by other individuals or users who or which utilize the apparatus 200 and method of the present invention.

In the preferred embodiment, the respective electronic forum, chat room, or webpage of the website, on, in, or via, which the sporting event, game, match, activity, competition, or tournament, can be watched and/or listened to can also be specially designed and/or specially configured to, simultaneously with providing the sporting event, game, match, activity, competition, or tournament, allow the individual or user, or any other individuals or users, to place a bet or any number of bets on the outcome of the sporting event, game, match, activity, competition, or tournament, at any time prior to the conclusion of the sporting event, game, match, activity, competition, or tournament, and/or to place a bet or any numbers of bets on any plays, calls, occurrences, or events, which occur during the game (hereinafter referred to as “game events”, “match events”, or “micro-events”). Game events, match events, or micro-events, can include, for example, but are not limited to, any play, activity, action by a team, action by a player or participant, penalty call, type of penalty, infraction, type of infraction, violation, type of violation, scoring play, type of play, type of activity engaged in, a score at a particular time of the sporting event, game, match, activity, competition, or tournament, such as, for example, the score at the end of a quarter or at the half-time, or at any other specified time in or during the sporting event, game, match, activity, competition, or tournament, and/or any other play, activity, and/or call made by a game or match official, referee, or umpire, which can be the subject of a bet. Any bets on game events or match event can also be referred to herein as "game event bets" or "match event bets".

Private bets, which can be, or which can include, outcome bets or game event bets or match event bets, and which can be offered by the individual or user or by any other individual(s) or user(s), can also be offered via the electronic forum, chat room, or the webpage of the website. Betting odds for any bets described herein, as well as continuous updates to any betting odds for any of the bets described herein, can also be provided via the electronic forum, chat room, or the webpage of the website.

At step 1604, the individual or user, or any other individual(s) or user(s) watching and/or listening to the sporting event, game, match, activity, competition, or tournament, can place any number and/or types of bets, including outcome events and bets on game events ("game event bets) or match events ("match event bets") which can or may take place during the course of the sporting event, game, match, activity, competition, or tournament. Each time a bet is placed by the individual or user or by any other individual or user, the central processing computer 10 can process and store information regarding the bet placed, the individual or user who placed the bet, the sporting event, game, match, activity, competition, or tournament, on or during which the bet was placed, the amount of the bet, the time of the bet, the date of the bet, any counterparty to the event, the sports betting account, gaming account, or gambling account, used in placing the bet, and/or any information regarding whether or not any bet monies were instructed to be placed in escrow with the escrow agent computer 95, and/or any other information regarding the bet.

At step 1604, the individual or user, or any other individual(s) or user(s) watching and/or listening to the sporting event, game, match, activity, competition, or tournament, can request any data and/or information and/or analytics data and/or information at any time before, during, or after, the sporting event, game, match, activity, competition, or tournament. Any data and/or information and/or any analytics data and/or information requested, or any data and/or information and/or analytics data and/or information which is provided without request, can be transmitted from the information/analytics provider computer 70 and/or from the central processing computer 10 and can be viewed in or via the electronic forum, chat room, or webpage of the website.

At step 1604, the individual or user, or any other individual(s) or user(s) watching and/or listening to the sporting event, game, match, activity, competition, or tournament, can place any number of posts or comments in the electronic forum, chat room, or webpage of the website. At step 1604, the individual or user, or any other individual(s) or user(s) watching and/or listening to the sporting event, game, match, activity, competition, or tournament, can place any number of outcome bets, or game event bets or match event bets, before or during the sporting event, game, match, activity, competition, or tournament.

In a preferred embodiment, the individual or user can, at step 1604 or at any other time, place any bet while in, or via, the respective electronic forum, chat room, or webpage of the website, or via the central processing computer 10. In all instances when the individual or user places any bet, information regarding or pertaining to the bet can be transmitted from the user communication device 20 and can be received and processed by the central processing computer 10. At step 1604, each time a bet is placed by the individual or user, information regarding the same can be stored in his or her sports betting account, gaming account, or gambling account, which information can be stored and maintained at the central processing computer 10, the individual's or user's user communication device 20, the financial institution computer 90, and/or the escrow agent computer 95.

In a preferred embodiment, the central processing computer 10 can transmit information regarding any and/or all of the individual's or user's bets which are placed on the sporting event, game, match, activity, competition, or tournament, as well as any information regarding any and/or all of the individual's or user's bets which are placed on any other sporting event(s), game(s), match(es), activities, competition(s), or tournament(s), along with the playing time(s) of same, which might be occurring concurrently with, or which might overlap in time in any way with, the sporting event, game, match, activity, competition, or tournament watched and/or listened to. In another preferred embodiment, in instances when the individual or user has bet on, seeks to bet on, or simply wants to watch and/or listen to, another sporting event, game, match, activity, competition, or tournament, the individual or user can request a link to the respective electronic forum, chat room, or website, on or via which that other sporting event, game, match, activity, competition, or tournament can be watched or listened to.

With reference once again to FIG. 16, at any time during the sporting event, game, match, activity, competition, or tournament, the central processing computer 10 can, at step 1604, provide, via the respective electronic forum, chat room, or website, for each bet placed by the individual or user, an indication as to whether the individual or user is winning the bet or losing the bet at that point in time or at that point in the sporting event, game, match, activity, competition, or tournament. For example, information regarding a bet which is a winning bet at that point in time, or at that point in the sporting event, game, match, activity, competition, or tournament, can be provided or displayed in one color, such as, for example, green, while information regarding a bet which is losing bet at that point in time, or at that point in the sporting event, game, match, activity, competition, or tournament, can be provided or displayed in another color, such as, for example, red. In instances in which it cannot be determined whether a bet is a winning or a losing bet, that bet can be provided or displayed in a third and neutral color such as, for example yellow, white, or any other appropriate color.

In a preferred embodiment, at step 1604, the central processing computer 10 can also provide, via the electronic forum, chat room, or webpage of the website, and during the sporting event, game, match, activity, competition, or tournament, information regarding available new bets, betting odds for same, and/or any new or updated betting odds for bets corresponding to the sporting event, game, match, activity, competition, or tournament, as well as the availability of bets and/or betting odds for same which can provide the individual or user with an opportunity to increase his or her winnings, minimize his or her losses, or obtain any hedge position to protect his or her interests regarding any bets he or she has already placed. The individual or user can place any bet or bets using this above-described information.

At step 1604, the individual or user can also purchase a ticket, tickets, a ticket option, or ticket options, for any sporting event, game, match, activity, competition, or tournament. The sporting event, game, match, activity, competition, or tournament, can be any sporting event, game, match, activity, competition, or tournament, on or regarding which the individual or user has placed a bet or desires to place a bet, or which can be brought to the individual's or user's attention via the electronic forum, chat room, or webpage of the website, or via the sporting event, game, match, activity, competition, or tournament being watched or listened to. The individual or user can also become aware of the sporting event, game, match, activity, competition, or tournament, through or as the result of his or her own actions or activities.

At any time during step 1604, the individual or user can, using his or her user communication device 20, access the ticket seller computer 99, via a link provided in or via the electronic forum, chat room, or webpage of the website, and/or via the central processing computer 10. The individual or user can thereafter search for the sporting event, game, match, activity, competition, or tournament, of interest, and can search for and access ticket information for or regarding the same.

At step 1604, the individual or user can select to purchase one or more tickets, to the selected sporting event, game, match, activity, competition, or tournament, by transmitting a ticket purchase request from his or her user communication device 20 to the ticket seller computer 99. At step 1604, the individual or user can provide a payment identifier for making payment for the ticket purchase. Thereafter, the ticket seller computer 99 can process payment for the ticket or tickets purchased and, in a preferred embodiment, can generate a ticket purchase confirmation message, and can transmit same to the user communication device 20. In a preferred embodiment, the ticket purchase confirmation message, or information contained therein, can be provided to the individual or user via the electronic forum, chat room, or webpage of the website. The ticket purchase confirmation message can also be transmitted, as an email message, sent to the individual's or user's email server and/or as an email message sent to the individual's or user's email server and then forwarded or transmitted to the user's communication device 20, and/or as an instant message, or as an SMS message, transmitted to the user communication device 20 or to another user communication device 20 which can be used by the individual or user to receive the same.

In a preferred embodiment, the ticket purchase confirmation message can contain, or can contain as an attachment, a copy or an electronic copy of each ticket purchased by the individual or user. Thereafter, the individual or user can either print out his ticket or tickets in hard copy form and/or can store same on his or her user communication device 20 in electronic form.

At any time during step 1604, the individual or user can also, using his or her user communication device 20, access the ticket seller computer 99, via a link provided in or via the electronic forum, chat room, or webpage of the website, and/or via the central processing computer 10. The individual or user can thereafter search for the sporting event, game, match, activity, competition, or tournament, of interest, and can search for and access ticket option information for or regarding the same.

At step 1604, the individual or user can select to purchase one or more ticket options for the selected sporting event, game, match, activity, competition, or tournament, by transmitting a ticket option purchase request from his or her user communication device 20 to the ticket seller computer 99. At step 1604, the individual or user can provide a payment identifier for making payment for the ticket option purchase. Thereafter, the ticket seller computer 99 can process payment for the ticket option or ticket options purchased and, in a preferred embodiment, can generate a ticket option purchase confirmation message, and can transmit same to the user communication device 20. In a preferred embodiment, the ticket option purchase confirmation message, or information contained therein, can be provided to the individual or user via the electronic forum, chat room, or webpage of the website.

The ticket option purchase confirmation message can also be transmitted, as an email message, sent to the individual's or user's email server and/or as an email message sent to the individual's or user's email server and then forwarded or transmitted to the user's communication device 20, and/or as an instant message, or as an SMS message, transmitted to the user communication device 20 or to another user communication device 20 which can be used by the individual or user to receive the same.

In a preferred embodiment, the ticket option purchase confirmation message can contain, or can contain as an attachment, a copy or an electronic copy of each ticket option purchased by the individual or user. Thereafter, the individual or user can either print out his ticket option or ticket options in hard copy form and/or can store same on his or her user communication device 20 in electronic form.

In a preferred embodiment, if the individual or user is utilizing a headset as or with the user communication device 20, he or she can purchase any ticket or ticket option, or any tickets or ticket options verbally via the microphone of the video and/or audio recording device(s) 20J of the user communication device 20.

In a preferred embodiment, any ticket, tickets, ticket option, or ticket options can be resold by the individual or user at any time before the conclusion or the completion of the selected sporting event, game, match, activity, competition, or tournament, associated with the respective ticket or ticket option.

In a preferred embodiment, at step 1604, the central processing computer 10 can also provide, via the electronic forum, chat room, or webpage of the website, and during the sporting event, game, match, activity, competition, or tournament, information regarding a gaming insurance product or any number of gaming insurance products, and/or a gaming derivative product or any number of gaming derivative products, which the individual or user can purchase in order to minimize his or her losses.

If the individual or user chooses to purchase any gaming insurance product(s) or any gaming derivative product(s), the individual or user can enter the purchase request(s) at step 1604 and the same can be transmitted to the central processing computer 10 for processing and information storage regarding the same. Thereafter, any information regarding the individual's or user's purchase of any gaming insurance product(s) or any gaming derivative product(s) can be stored at the central processing computer 10 and, in particular, in the database 10H of same and in the individual's or user's sports betting account, gaming account, or gambling account.

Any information regarding any bets placed by the individual or user can be displayed to the individual or user in an appropriate location or section of the electronic forum, chat room, or webpage of the website. Any information regarding any gaming insurance product(s) or any gaming derivative product(s) can also be displayed to the individual or user in an appropriate location or section of the electronic forum, chat room, or webpage of the website.

In a preferred embodiment, at step 1604, the individual or user, can also decide to sell his position in a bet, or purchase another individual's or user's position in a bet. In such instances, bets available for sale can be displayed to the individual or user in an appropriate location or section of the electronic forum, chat room, or webpage of the website.

In a preferred embodiment, at step 1604, the individual or user, as well any other individual(s) or user(s) watching and/or listening to the sporting event, game, match, activity, competition, or tournament, can report suspected instances of match fixing, game fixing, cheating, play irregularities, officiating irregularities, or any other instances which may call into question the integrity of the sporting event, game, match, activity, competition, or tournament. Information, postings, or comments, can be posted by the individual or user, or any other individual(s) or user(s) watching and/or listening to the sporting event, game, match, activity, competition, or tournament, in a section of the electronic forum, chat room, or webpage of the website, dedicated for same, and the information, postings, or comments, can be time stamped. This allows for information, postings, or comments, relating to the integrity of the respective sporting event, game, match, activity, competition, or tournament, to be posted by the individual or user, and by any other individual(s) or user(s) watching and/or listening to the respective sporting event, game, match, activity, competition, or tournament, during the same. The posted information, postings, or comments can be transmitted to the central processing computer 10 for dissemination to the appropriate entities and/or authorities.

In this regard, the apparatus 200 of the present invention can be utilized to obtain and report instances of suspected game fixing, match fixing, or cheating, as reported by the individuals or users who use the apparatus 200 of the present invention to watch and/or listen to sporting events, games, matches, activities, competitions, or tournaments, on which they have placed bets.

The central processing computer 10 can receive the submitted information or comments received from the individual or user, or from any other individuals or users, store the same in a file associated with the sporting event, game, match, activity, competition, or tournament, and automatically transmit the same to the sport governing body computer 30 of the sport governing body for the sport associated with, or which governs, the sporting event, game, match, activity, competition, or tournament, or the league, team, players, or participants, participating in the sporting event, game, match, activity, competition, or tournament. In this manner, the apparatus 200 can be utilized to report instances of suspected game fixing, match fixing, or cheating, activity, or any other issues pertaining to game integrity or match integrity, to the sport governing body computer 30 of the respective sport. In this regard, an international federation, the International Olympic Committee, a nation federations, and/or any national Olympic Committee, can be apprised of the suspected game fixing, match fixing, or cheating, activity, or any other game integrity or match integrity issue.

The central processing computer 10 can also automatically transmit information regarding suspected game fixing, match fixing, or cheating, activity, or any other game integrity or match integrity issue, to the respective governmental entity computer 40 for each government which may have an interest in receiving the same. In this regard, each government having an interest in receiving this information can be apprised of the suspected game fixing, match fixing, or cheating, activity, or any other game integrity or match integrity issue.

In a preferred embodiment, at step 1604, the individual or user, as well any other individuals or users watching and/or listening to the sporting event, game, match, activity, competition, or tournament, can also report any complaints regarding the placing of any bets, the payment or satisfaction regarding any bets, and/or any suspected betting fraud, and/or any other problems encountered in using via the apparatus 200. Information regarding any such complaints can be transmitted from the user communication device 20 to the central processing computer 10.

In a preferred embodiment, if the individual or user is utilizing a headset as or with the user communication device 20, and any all data or information inputs, postings, comments, information requests, placing of bets, ticket purchases, ticket option purchases, or reportings of any kind, can be input verbally via the microphone of the video and/or audio recording device(s) 20J of the user communication device 20. Any voice inputs can also translated into text and displayed in the electronic forum, chat room, or webpage of the website. The present invention can also be equipped with any needed software for translating text from one language into another language and/or translating verbal information into text and then translating the text into another language.

In a preferred embodiment, any and all interactions between the individual or user and/or any other individuals or users which take place in or via the electronic forum, chat room, or webpage of the website, can be recorded and stored by and at the central processing computer 10 in a file associated with the electronic forum, chat room, or webpage of the website, and/or in a file associated with the sporting event, game, match, activity, competition, or tournament.

In a preferred embodiment, at step 1604, any sport governing body computer 30, any governmental entity computer 40, any gaming facility computer 50, and/or any escrow agent computer 95, can be used by an authorized operator of same to monitor any and/or all activity occurring or transpiring in or via one or more electronic forums, chat rooms, or web pages of any websites, associated with any watching and/or listening to the sporting event, game, match, activity, competition, or tournament.

In a preferred embodiment, the sporting event, game, match, activity, competition, or tournament, and the streaming broadcast or transmission of same, will end at step 1605. Thereafter, the operation of the apparatus 200 will cease at step 1606.

In another preferred embodiment, the central processing computer 10 can also perform any and/or all of the processing routines described herein as being performed by, and can, therefore, also serve as, a ticket seller computer 99, so that individuals or users of the apparatus of the present invention can purchase a ticket, tickets, a ticket option, or ticket options, directly from the central processing computer 10.

In another preferred embodiment, as well as in any and/or all of the embodiments described herein the apparatus 100 and methods of the present invention can be utilized in gaming or gambling activities involving bets placed on fantasy sports teams, leagues, events, or other activities. In another preferred embodiment, as well as in any and/or all of the embodiments described herein, the apparatus 100 and methods of the present invention can also be utilized in gaming or gambling activities involving bets placed on esports teams, leagues, events, or activities. In any and/or all of the embodiments described herein, each of the central processing computer(s) 10, the user communication device(s) 20, the sport governing body computer(s) 30, the governmental entity computer(s) 40, the gaming facility computer(s) 50, the information/analytics provider computer(s) 70, the social network computer(s) 80, the financial institution computer(s) 70, the escrow agent computer(s) 95, and the wearable device(s) 97, can each be specially programmed and/or specially configured to perform of all of their respective functionalities whether either explicitly disclosed or implicitly disclosed.

The apparatus 100 and methods of the present invention provides and facilitates a global sports betting platform whereby individuals, users, or entities, can place bets on various sporting events, games, matches, activities, competitions, or tournaments, in a safe and secure manner, and in a socially enjoyable environment, and provides a platform whereby governmental entities can regulate and oversee sports betting activities while sports governing bodies can regulate and oversee sports betting activities to maintain the integrity of their sport.

While the present invention has been described and illustrated in various preferred and alternate embodiments, such descriptions are merely illustrative of the present invention and are not to be construed to be limitations thereof. In this regard, the present invention encompasses all modifications, variations, and/or alternate embodiments, with the scope of the present invention being limited only by the claims which follow.

What is claimed is:

1. A sports betting apparatus, comprising:

a processor, wherein the processor is specially programmed to provide, and provides, an electronic forum, wherein the electronic forum provides a video or audio broadcast of a first sporting event to a plurality of users, wherein the electronic forum allows at least some of the plurality of users to communicate with one another before, during, or after, the first sporting event via text messaging or via video conferencing or audio conferencing, post comments or messages in the electronic forum before, during, or after, the video or audio broadcast, place a bet or any number of bets on an outcome of, or on an event which occurs during, the first sporting event, receive or be provided with information regarding bets available, betting odds, changes in betting odds, or analytics information, before, during, or after, the video or audio broadcast, and purchase a ticket or a ticket option for the first sporting event or for a second sporting event;

a transmitter, wherein the transmitter transmits the electronic forum to a first user communication device associated with a user of the plurality of users; and a receiver, wherein the receiver receives a ticket purchase request or receives a ticket option purchase request transmitted from the first user communication device, wherein the ticket purchase request contains information regarding a request to purchase a ticket for the first sporting event or for the second sporting event, or wherein the ticket option purchase request contains information regarding a request to purchase a ticket option for a ticket for the first sporting event or for the second sporting event, wherein the sports betting apparatus processes information regarding a purchase of a ticket for the first sporting event or for the second sporting event or the sports betting apparatus processes information regarding a purchase of a ticket option for a ticket for the first sporting event or for the second sporting event, wherein the sports betting apparatus generates a ticket purchase confirmation message containing information regarding a ticket for the first sporting event or for the second sporting event, or the sports betting apparatus generates a ticket option purchase confirmation message containing information regarding a ticket option for a ticket for the first sporting event or for the second sporting event, and further wherein the sports betting apparatus transmits the ticket purchase confirmation message or the ticket option purchase confirmation message to the first user communication device or to a second user communication device, wherein the second user communication device is associated with the user of the plurality of users.

2. The sports betting apparatus of claim 1, wherein the processor processes information for a placement of a bet for or on behalf of the user of the plurality of users on an outcome of the first sporting event, and further wherein the processor processes information for determining if the bet is a winning bet or a losing bet, and further wherein the processor processes information for settling the bet or for withholding a settlement of the bet.

3. The sports betting apparatus of claim 1, wherein the sports betting apparatus processes information for placing a bet on the first sporting event, wherein the bet is placed for or on behalf of the user of the plurality of users, and further wherein the sports betting apparatus generates a bet confirmation message containing information regarding a date and time of the bet, an amount of the bet, a date and time of the first sporting event, and a link to the electronic forum, and further wherein the sports betting apparatus transmits the bet confirmation message to the first user communication device or to the second user communication device.

4. The sports betting apparatus of claim 1, wherein the sports betting apparatus processes information for placing a bet on the second sporting event, wherein the bet is placed for or on behalf of the user of the plurality of users, and further wherein the sports betting apparatus generates a bet confirmation message containing information regarding a date and time of the bet, an amount of the bet, a date and time of the second sporting event, and a link to the electronic forum, and further wherein the sports betting apparatus transmits the bet confirmation message to the first user communication device or to the second user communication device.

5. The sports betting apparatus of claim 1, wherein the electronic forum is capable of allowing at least some of the plurality of users to report an instance of suspected game fixing, match fixing, or cheating, involving the first sporting event.

6. The sports betting apparatus of claim 1, wherein the sports betting apparatus processes search information for identifying a sporting event, game, match, activity, competition, or tournament, on or for which a second bet or any number of second bets can be placed, and further wherein the sports betting apparatus generates a search results message, and further wherein the sports betting apparatus transmits the search results message to the first user communication device, to the second user communication device, or to a third user communication device.

7. The sports betting apparatus of claim 1, wherein the ticket purchase confirmation message is transmitted as an email message, and further wherein the ticket purchase confirmation message contains, or contains as an attachment, a copy of the ticket or an electronic copy of the ticket.

8. The sports betting apparatus of claim 1, wherein the ticket purchase confirmation message is transmitted as an instant message or as an SMS message, and further wherein the ticket purchase confirmation message contains, or contains as an attachment, a copy of the ticket or an electronic copy of the ticket.

9. The sports betting apparatus of claim 1, wherein the sports betting apparatus receives a ticket option purchase message for a ticket option for a ticket for the first sporting event or for the second sporting event, wherein the sports betting apparatus processes information regarding the purchase of the ticket option for the first sporting event or for the second sporting event, and further wherein the sports betting apparatus generates a ticket option purchase confirmation message, wherein the ticket option purchase confirmation message is transmitted as an email message, and further wherein the ticket option purchase confirmation message contains, or contains as an attachment, a copy of the ticket option or an electronic copy of the ticket option.

10. A sports betting apparatus, comprising:

a processor, wherein the processor provides an electronic forum, wherein the electronic forum provides a video or audio broadcast of a first sporting event to a plurality of users, and further wherein the electronic forum allows at least some of the plurality of users to purchase a ticket or a ticket option for the first sporting event or for a second sporting event;

a transmitter, wherein the transmitter transmits the electronic forum to a first user communication device associated with a user of the plurality of users; and a receiver, wherein the receiver receives a ticket purchase request or receives a ticket option purchase request transmitted from the first user communication device, wherein the ticket purchase request contains information regarding a request to purchase a ticket for the first sporting event or for the second sporting event, or wherein the ticket option purchase request contains information regarding a request to purchase a ticket option for a ticket for the first sporting event or for the second sporting event, wherein the sports betting apparatus processes information regarding a purchase of a ticket for the first sporting event or for the second sporting event or the sports betting apparatus processes information regarding a purchase of a ticket option for a ticket for the first sporting event or for the second sporting event, wherein the sports betting apparatus generates a ticket purchase confirmation message containing information regarding a ticket for the first sporting event or for the second sporting event, or the sports betting apparatus generates a ticket option purchase confirmation message containing information regarding a ticket option for a ticket for the first sporting event or for the second sporting event, and further wherein the sports betting apparatus transmits the ticket purchase confirmation message or the ticket option purchase confirmation message to the first user communication device or to a second user communication device, wherein the second user communication device is associated with the user of the plurality of users.

11. The sports betting apparatus of claim 10, wherein the processor processes information for a placement of a bet for or on behalf of the user of the plurality of users on an outcome of the first sporting event, and further wherein the processor processes information for determining if the bet is a winning bet or a losing bet, and further wherein the processor processes information for settling the bet or for withholding a settlement of the bet.

12. The sports betting apparatus of claim 10, wherein the sports betting apparatus processes information for placing a bet on the first sporting event, wherein the bet is placed by or on behalf of the user of the plurality of users, and further wherein the sports betting apparatus generates a bet confirmation message containing information regarding a date and time of the bet, an amount of the bet, a date and time of the first sporting event, and a link to the electronic forum, and further wherein the sports betting apparatus transmits the bet confirmation message to the first user communication device or to the second user communication device.

13. The sports betting apparatus of claim 10, wherein the sports betting apparatus processes search information for identifying a sporting event, game, match, activity, competition, or tournament, on or for which a bet or any number of bets can be placed, and further wherein the sports betting apparatus generates a search results message, and further wherein the sports betting apparatus transmits the search results message to the first user communication device, to the second user communication device, or to a third user communication device.

14. The sports betting apparatus of claim 10, wherein the ticket purchase confirmation message is transmitted as an email message, and further wherein the ticket purchase confirmation message contains, or contains as an attachment, a copy of the ticket or an electronic copy of the ticket.

15. The sports betting apparatus of claim 10, wherein the ticket option purchase confirmation message is transmitted as an email message, and further wherein the ticket option purchase confirmation message contains, or contains as an attachment, a copy of the ticket option or an electronic copy of the ticket option.

16. A computer-implemented method, comprising:

transmitting, with or using a transmitter, an electronic forum to a first user communication device associated with a user of the plurality of users, wherein the electronic forum provides a video or audio broadcast of a first sporting event to a plurality of users, wherein the electronic forum allows at least some of the plurality of users to communicate with one another before, during, or after, the first sporting event via text messaging or via video conferencing or audio conferencing, post comments or messages in the electronic forum before, during, or after, the video or audio broadcast, place a bet or any number of bets on an outcome of, or on an event which occurs during, the first sporting event, receive or be provided with information regarding bets available, betting odds, changes in betting odds, or analytics information, before, during, or after, the video or audio broadcast, and purchase a ticket or a ticket option for the first sporting event or for a second sporting event;

receiving, with or using a receiver, a ticket purchase request or a ticket option purchase request transmitted from the first user communication device, wherein the ticket purchase request contains information regarding a request to purchase a ticket for the first sporting event or for the second sporting event, or wherein the ticket option purchase request contains information regarding a request to purchase a ticket option for a ticket for the first sporting event or for the second sporting event;

processing, with or using a processor or a computer, information regarding a purchase of a ticket for the first sporting event or for the second sporting event or processing, with the processor or the computer, information regarding a purchase of a ticket option for a ticket for the first sporting event or for the second sporting event;

generating, with or using the processor or the computer, a ticket purchase confirmation message containing information regarding a ticket for the first sporting event or for the second sporting event, or generating, with or using the processor or the computer, a ticket option purchase confirmation message containing information regarding a ticket option for a ticket for the first sporting event or for the second sporting event; and transmitting, with or using the transmitter, the processor, or the computer, the ticket purchase confirmation message or the ticket option purchase confirmation message to the first user communication device or to a second user communication device, wherein the second user communication device is associated with the user of the plurality of users.

17. The computer-implemented method of claim 16, further comprising:

processing, with or using the processor or the computer, information for placing a bet on the first sporting event, wherein the bet is placed by or on behalf of the user of the plurality of users;

generating, with or using the processor or the computer, a bet confirmation message containing information regarding a date and time of the bet, an amount of the bet, a date and time of the first sporting event, and a link to the electronic forum; and transmitting, with or using the transmitter, the processor, or the computer, the bet confirmation message to the first user communication device or to the second user communication device.

18. The computer-implemented method of claim 16, further comprising:

processing information for placing a bet on the second sporting event;

generating a bet confirmation message containing information regarding a date and time of the bet, an amount of the bet, a date and time of the second sporting event, and a link to the electronic forum; and transmitting the bet confirmation message to the first user communication device or to the second user communication device.

19. The computer-implemented method of claim 16, further comprising:

processing search information for identifying a sporting event, game, match, activity, competition, or tournament, on or for which a second bet or any number of second bets can be placed;

generating a search results message; and transmitting the search results message to the first user communication device, to the second user communication device, or to a third user communication device.

20. The computer-implemented method of claim 16, further comprising:

transmitting the ticket purchase confirmation message as an email message, as an instant message, or as an SMS message, and further wherein the ticket purchase confirmation message contains, or contains as an attachment, a copy of the ticket or an electronic copy of the ticket.

21. The computer-implemented method of claim 16, further comprising:

receiving a ticket option purchase message for a ticket option for a ticket for the first sporting event or for the second sporting event;

processing information regarding the purchase of the ticket option for the first sporting event or for the second sporting event;

generating a ticket option purchase confirmation message;

transmitting the ticket option purchase confirmation message, wherein the ticket option purchase confirmation message contains, or contains as an attachment, a copy of the ticket option or an electronic copy of the ticket option.

* * * * *